United States Patent [19]
Sakurai et al.

[11] Patent Number: 6,128,898
[45] Date of Patent: Oct. 10, 2000

[54] EXHAUST GAS PURIFYING APPARATUS FOR INTERNAL COMBUSTION ENGINE

[75] Inventors: Kazuhiro Sakurai, Gotenba; Takaaki Itou, Mishima; Yukio Kinugasa, Susono; Koichi Hoshi, Susono; Koichi Takeuti, Susono, all of Japan

[73] Assignee: Toyota Jidosha Kabushiki Kaisha, Toyota, Japan

[21] Appl. No.: 09/188,359

[22] Filed: Nov. 10, 1998

[30] Foreign Application Priority Data

Nov. 19, 1997 [JP] Japan ................................. 9-318719

[51] Int. Cl.⁷ ........................................... F01N 3/00
[52] U.S. Cl. .................. 60/277; 60/291; 60/285; 60/287
[58] Field of Search .............. 60/277, 285, 291, 60/287, 286, 276

[56] References Cited

U.S. PATENT DOCUMENTS

| | | | |
|---|---|---|---|
| 4,875,336 | 10/1989 | Hayashi et al. | 60/286 |
| 5,052,178 | 10/1991 | Clerc et al. | 60/274 |
| 5,105,619 | 4/1992 | Arai | 60/286 |
| 5,357,755 | 10/1994 | Gillingham et al. | 60/288 |
| 5,419,876 | 5/1995 | Usui et al. | |
| 5,477,676 | 12/1995 | Benson et al. | |
| 5,651,248 | 7/1997 | Kawamura et al. | 60/286 |

FOREIGN PATENT DOCUMENTS 35 37 080 C1  6/1987  Germany .
A-59-79025   5/1984  Japan .
U-5-21121    3/1993  Japan .
U-5-38314    5/1993  Japan .

OTHER PUBLICATIONS

Burch, Steven D. et al., "Thermal Analysis and Testing of a Vacuum Insulated Catalytic Converter," SAE Technical Paper Series, No. 941998, 1994, pp. 137–142.

Burch, Steven D. et al., "Reducing Cold–Start Emissions by Catalytic Converter Thermal Management," SAE Technical Paper Series, No. 950409, pp. 1–6.

Burch, Steven D. et al., "Applications and Benefits of Catalytic Converter Thermal Management," SAE Technical Paper Series, No. 961134.

Primary Examiner—Thomas Denion
Assistant Examiner—Binh Tran
Attorney, Agent, or Firm—Oliff & Berridge, PLC

[57] ABSTRACT

Disclosed is a technology of diagnosing an exhaust gas purifying apparatus about a fault in its temperature control function of controlling a temperature of an exhaust gas purifying catalyst. The exhaust gas purifying apparatus for an internal combustion engine includes the exhaust gas purifying catalyst, and a temperature control means for controlling the temperature of this exhaust gas purifying catalyst. The exhaust gas purifying apparatus is judged to be faulted, wherein at least one of a state of the temperature control means and a state of the exhaust gas purifying catalyst serves as a parameter.

20 Claims, 36 Drawing Sheets

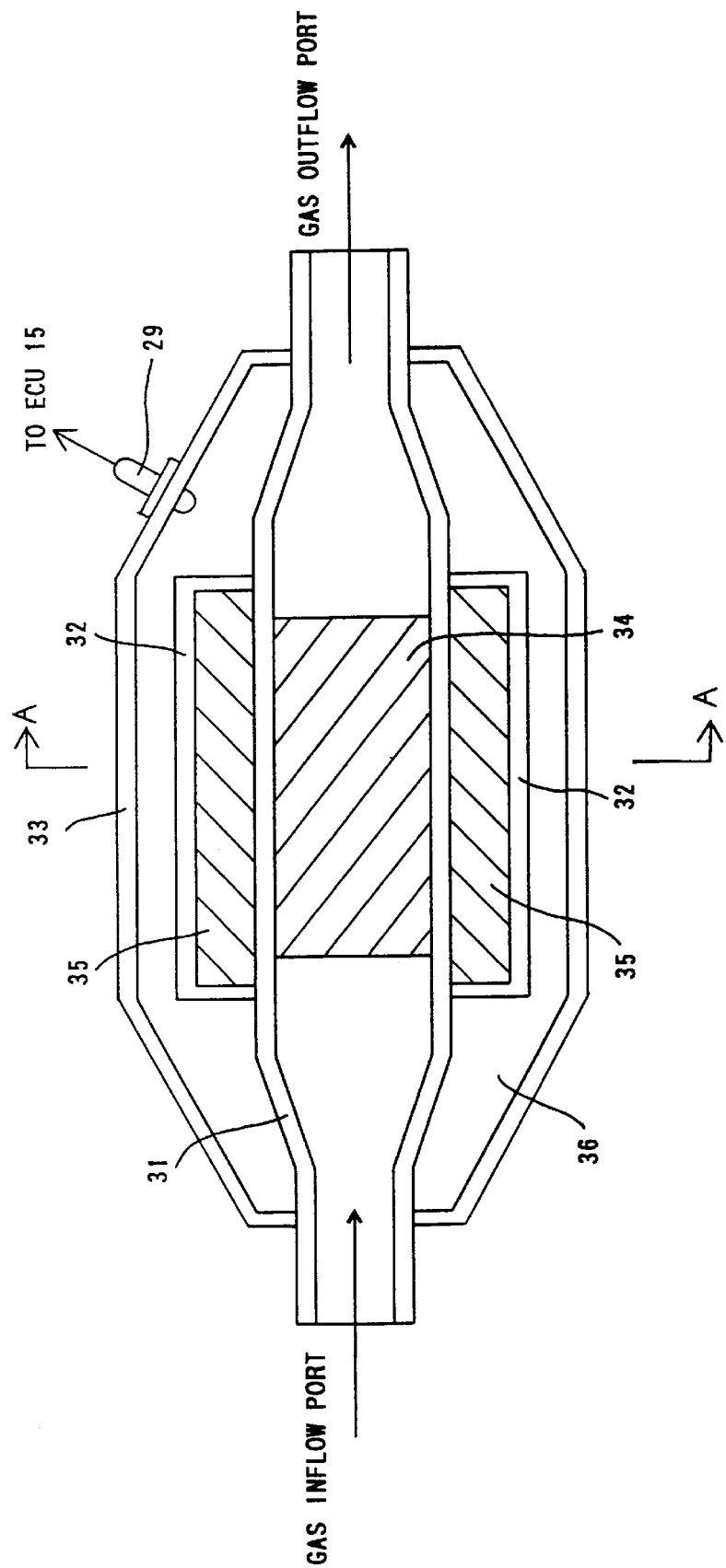

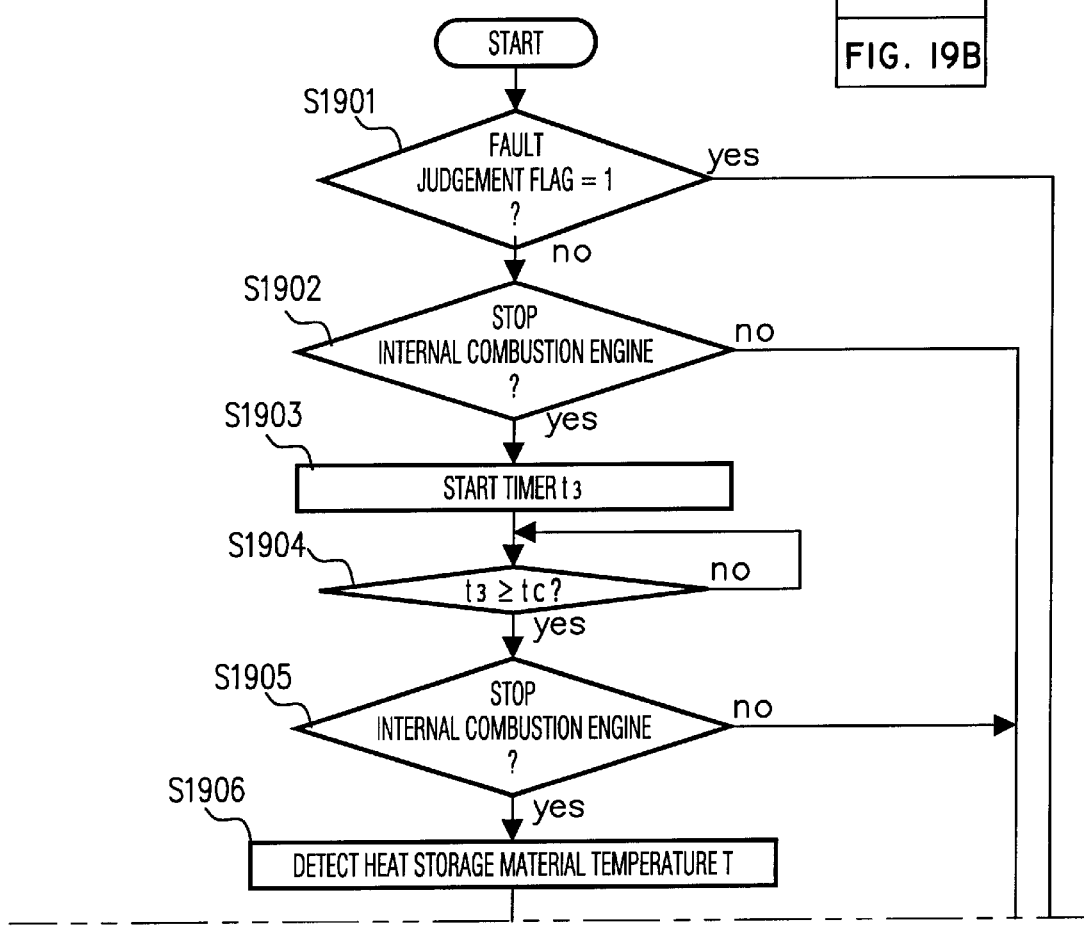

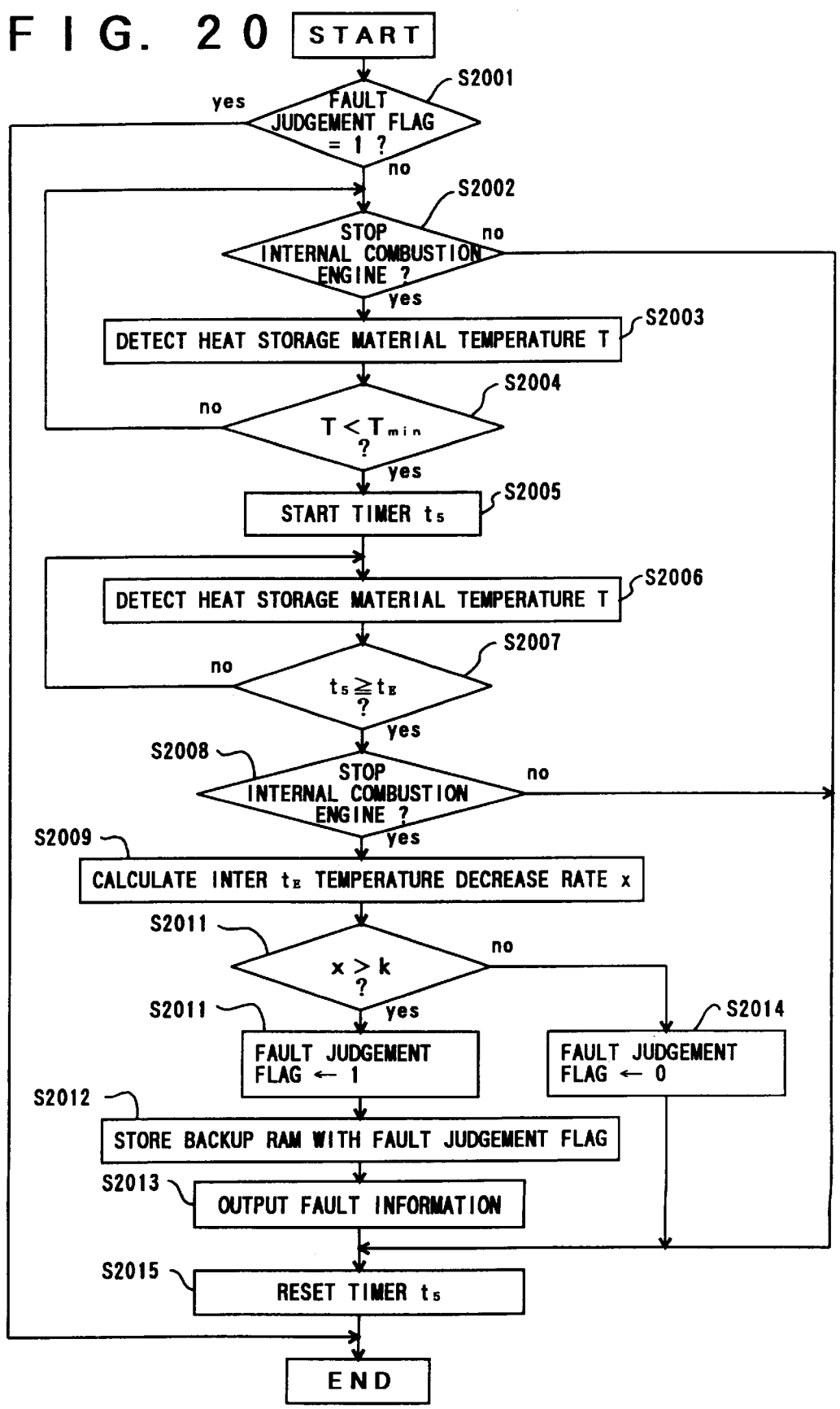

F I G. 2 1
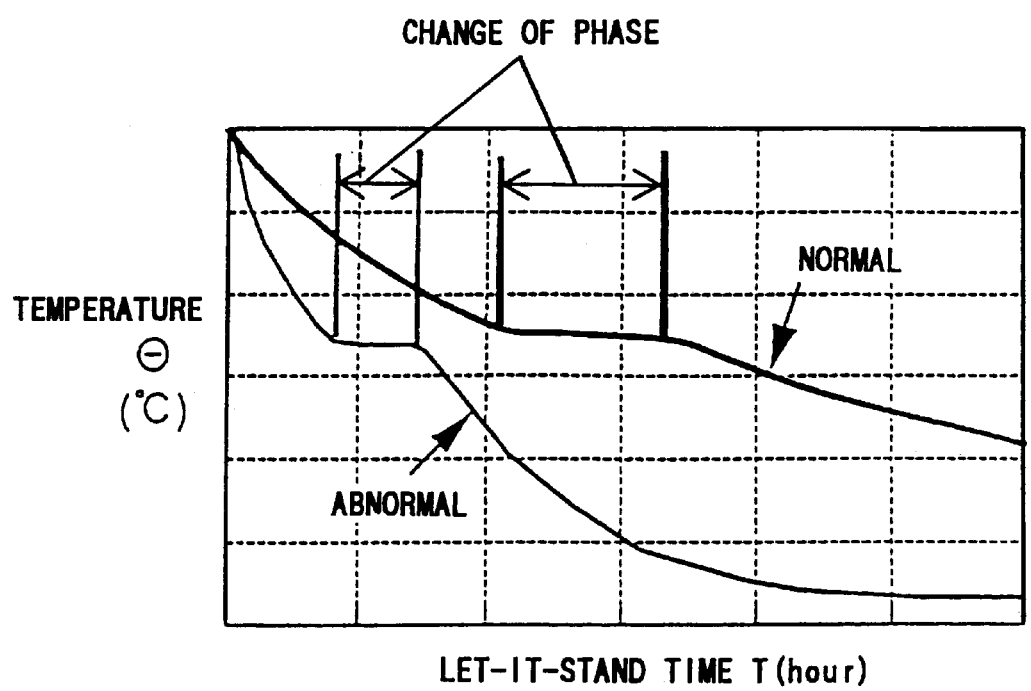

EXHAUST GAS PURIFYING APPARATUS FOR INTERNAL COMBUSTION ENGINE

BACKGROUND OF THE INVENTION

The present invention relates generally to a technology of making a judgement about a fault in an exhaust gas purifying catalyst of an internal combustion engine of an automobile and the like and, more particularly, to a technology of making a judgement about a fault in an exhaust gas purifying apparatus which includes an exhaust gas purifying catalyst covered with an adiabatic material and a heat storage material.

The internal combustion engine of the automobile and the like has an exhaust gas purifying catalyst carrying as a catalyst a precious metal such as a platinum, palladium and the like in order to purify harmful components contained in the exhaust gas discharged, such as, e.g., carbon monoxide (CO), nitrogen oxide (Nox) and hydro carbon (HC) before these components are discharged into the atmospheric air.

The exhaust gas purifying catalyst makes, for example, HC and CO contained in the exhaust gas react to oxygen $O_2$ in the exhaust gas, which are thus oxidized into $H_2O$ and $CO_2$. At the same time, the exhaust gas purifying catalyst makes Nox in the exhaust gas react to HC and CO in the exhaust gas, which are thus reduced to $H_2O$, $CO_2$ and $N_2$.

The exhaust gas purifying catalyst is activated at a predetermined temperature or higher and brought into an inactive state when lower than the predetermined temperature. Therefore, when a temperature of the exhaust gas purifying catalyst is lower than the predetermined temperature as in the case of the internal combustion engine being cold-started up, there might be such a problem that the harmful components in the exhaust gas can not be completely eliminated.

What is known as a device for obviating such a problem is the catalyst device disclosed in SAE Technical Paper #961134, #950409, #941998. This catalyst device includes a flame tube incorporating the exhaust gas purifying catalyst, a heat storage material covering the flame tube, an intermediate tube covering the heat storage material, an outer casing covering the flame tube and the inter mediate tube, a vacuum spatial portion formed between the flame tube, the intermediate tube and the outer casing, and a hydrogen absorbing alloy disposed in the vacuum spatial portion. During an operation of the internal combustion engine, the vacuum spatial portion is set in a non-vacuum state by emitting the hydrogen out of the hydrogen absorbing alloy, thereby transmitting heat of the exhaust gas purifying catalyst via the hydrogen to the outer casing and restraining an excessive rise in temperature of the exhaust gas purifying catalyst. After a halt of the operation of the internal combustion engine, the hydrogen is absorbed by the hydrogen absorbing alloy, thereby setting the vacuum spatial portion in a vacuum state. Heat radiations from the exhaust gas purifying catalyst and the heat storage material are thus cut off by the vacuum spatial portion, and the activated state of the exhaust gas purifying catalyst is maintained till the engine is started next time.

In the thus constructed catalyst device, it is also of importance to precisely diagnose a fault in the catalyst device. For example, if a hole or a crack is caused in the outer casing or the intermediate tube or the flame tube, and if the hydrogen absorbing alloy is deteriorated, there might be a decrease in degree of vacuum of the vacuum spatial portion, a deterioration and an outflow of the heat storage material or deteriorations of a hydrogen absorbing performance and a hydrogen emitting performance, resulting in declines of an adiabatic performance and a heat radiating performance of the catalyst device.

If the adiabatic performance of the catalyst device declines, it is impossible to cut off the heat radiations from the exhaust gas purifying catalyst and of the heat storage material, and it is difficult to keep the exhaust gas purifying catalyst at the activation temperature or higher after the halt of the internal combustion engine, with the result that an exhaust emission worsens when started next time.

Further, if the heat radiation performance of the catalyst device declines, the heat of the exhaust gas purifying catalyst and of the heat storage material can not be transmitted to the outer casing and the like, which leads to an excessive rise in temperature of the exhaust gas purifying catalyst with a decrease in durability of the exhaust gas purifying catalyst.

SUMMARY OF THE INVENTION

It is a primary object of the present invention, which was contrived to overcome the problems described above, to provide a technology of diagnosing a fault in a temperature control function in an exhaust gas purifying apparatus incorporating a function of controlling a temperature of an exhaust gas purifying catalyst.

For accomplishing the above object, the present invention adopts constructions described below.

According to the present invention, an exhaust gas purifying apparatus for an internal combustion engine comprises:

an exhaust gas purifying catalyst disposed in an exhaust passageway of an internal combustion engine;

temperature control means disposed around the exhaust gas purifying catalyst for controlling a temperature of the exhaust gas purifying catalyst, thereby to maintain the temperature of the exhaust gas purifying catalyst within a predetermined temperature range;

state detecting means for detecting a state of the exhaust gas purifying catalyst and a state of the temperature control means; and fault judging means for making a judgement about a fault in the temperature control means on the basis of the states detected by the state detecting means.

In the thus constructed exhaust gas purifying apparatus, the state detecting means detects the state of the exhaust gas purifying catalyst and/or the state of the temperature control means. Then, the fault judging means refers to the state detected by the state detecting means and makes the judgement about the fault in the temperature control means.

Herein, the temperature control means is to utilize, for example, the heat contained in the exhaust gas discharged from the internal combustion engine to maintain the temperature of the exhaust gas purifying catalyst within a predetermined temperature range.

In addition, the state detecting means may be adapted to detect a state relating to a pressure of the temperature control means, and the fault judging means may be adapted to judge a fault of the temperature control means based on the pressure state detected by the state detecting means.

This arrangement is effective in the case where the temperature control means is comprising an outer casing for covering the exhaust gas purifying catalyst, and a vacuum spatial portion formed between the outer casing and the exhaust gas purifying catalyst for insulating a heat transmission from the exhaust gas purifying catalyst to the outer casing.

In this case, the state detecting means includes pressure detecting means for detecting a pressure in the vacuum spatial portion, and the fault judging means performs judgment of a fault based on a detection value of the pressure detecting means.

Herein, if a degree of vacuum in the vacuum spatial portion is normal, the heat radiation from the exhaust gas purifying catalyst is cut off by the vacuum spatial portion, and hence, after a halt of the operation of the internal combustion engine, a decrease in temperature of the exhaust gas purifying catalyst is restrained. On the other hand, if the degree of vacuum in the vacuum spatial portion decreases, the heat of the exhaust gas purifying catalyst is transmitted to the outer casing, and therefore, after the halt of the operation of the internal combustion engine, there is caused the decrease in temperature of the exhaust gas purifying catalyst.

Then, the fault judging means, when detecting from the pressure detected by the pressure detecting means that the degree of vacuum in the vacuum spatial portion decreases, can judge that the exhaust gas purifying apparatus is faulted, and, if the degree of vacuum in the vacuum spatial portion is normal, the exhaust gas purifying apparatus is normal.

Thus, according to the present invention, in the exhaust gas purifying apparatus including the vacuum spatial portion for cutting off the heat radiation from the exhaust gas purifying catalyst, it is feasible to judge from a magnitude of the pressure in the vacuum spatial portion that the degree of vacuum decreases, i.e., that the adiabatic function is faulted.

Note that in the case where the temperature control means further includes heat radiation/insulation control means for cutting off a heat radiation from the exhaust gas purifying catalyst by setting the vacuum spatial portion in a vacuum state, and for permitting the heat radiation from the exhaust gas purifying catalyst by setting the vacuum spatial portion in a non-vacuum state, the fault judging means may be adapted to make the judgement about the fault on condition that the heat radiation/insulation control means performs the control to set the vacuum spatial potion in the vacuum state.

Next, the state detecting means may be adapted to detect a state of temperature of the exhaust gas purifying catalyst and/or a state of temperature of the temperature control means, and the fault judging means may be adapted to make a judgment of a fault of the temperature control means based on the temperature state detected by the state detecting means.

This arrangement is effective in the case where the temperature control means includes adiabatic means for insulating the heat radiation from the exhaust gas purifying catalyst.

In this case, the state detecting means includes temperature detecting means for detecting the temperature of the exhaust gas purifying catalyst, and the fault judging means calculates a temperature decrease rate per predetermined time after a halt of the internal combustion engine from a detected value by the temperature detecting means, and makes a judgement about a fault in an adiabatic function on the basis of a magnitude of this temperature decrease rate.

Here, if the adiabatic means is normal, the heat radiation from the exhaust gas purifying catalyst is cut off, and hence decrease of the temperature of the exhaust gas purifying catalyst is restrained. If an abnormal state occurs in the adiabatic means, however, the heat radiation from the exhaust gas purifying catalyst is not cut off. Therefore, a temperature decrease velocity of the exhaust gas purifying catalyst becomes faster than at the normal time, and as a result the temperate decrease rate of the exhaust gas purifying catalyst per predetermined time becomes greater than at the time of normal state.

Thus, the fault judging means calculates the temperature decrease rate of the exhaust gas purifying catalyst per predetermined time from the detected value of the temperature detecting element, and, if the temperature decrease rate is larger than a predetermined judgement criterion, the fault judging means can judge that the adiabatic function is faulted.

As described above, according to the present invention, in the exhaust gas purifying apparatus including the adiabatic means for cutting off the heat radiation from the exhaust gas purifying catalyst, the adiabatic function can be judged to be faulted based on the magnitude of the temperature decrease rate of the exhaust gas purifying catalyst after the halt of the operation of the internal combustion engine.

In another aspect of the invention, the temperature control means may be adapted to include a heat storage member for supplying the heat to the exhaust gas purifying catalyst.

In this case, the state detecting means includes temperature detecting means for detecting a temperature of the exhaust gas purifying catalyst, and the fault judging means is adapted to calculate the temperature decrease rate per predetermined time after a halt of the internal combustion engine, and to make a judgement about a fault of a heat storage function on the basis of a magnitude of the temperature decrease rate.

Herein, the heat storage member absorbs and stores the heat of the exhaust gas during operation of the internal combustion engine, and supplies the exhaust gas purifying catalyst with the stored heat in order to maintain the exhaust gas purifying catalyst at an activation temperature or higher after a halt of the operation of the internal combustion engine or during a low-load operation.

In the thus constructed exhaust gas purifying apparatus, if the heat storage member is normal, the heat storage member supplies the heat to the exhaust gas purifying catalyst, so that the decrease in temperature of the exhaust gas purifying catalyst is restrained. Whereas if the abnormal state occurs in the heat storage member, the heat of the heat storage member cannot be supplied to the exhaust gas purifying catalyst with no heat, and hence the temperature decrease velocity of the exhaust gas purifying catalyst becomes faster than at the normal time. As a result, the temperature decrease rate of the exhaust gas purifying catalyst per predetermined time becomes larger than at the normal time.

Then, the fault judging means calculates the temperature decrease rate of the exhaust gas purifying catalyst per predetermined time from the detected value of the temperature detecting means after the halt of the operation of the internal combustion engine, and the fault judging means can judge that a heat storage function is faulted, if the temperature decrease rate is larger than the predetermined judgement criterion.

Thus, according to the present invention, in the exhaust gas purifying apparatus including the heat storage member for supplying the exhaust gas purifying catalyst with the heat, a fault in the heat storage function can be judged in terms of the magnitude of the temperature decrease rate of the exhaust gas purifying catalyst after the halt of the operation of the internal combustion engine.

In a further aspect of the invention, the temperature control means may be adapted to include a heat storage member for supplying the heat to the exhaust purifying catalyst and adiabatic means for cut off the heat radiations from the exhaust gas purifying catalyst and the heat storage member.

In this case, the state detecting means include temperature detecting means for detecting a temperature of the heat storage member, and the fault judging means calculates, from the detected value of the temperature detecting means, a temperature decrease rate per predetermined time after a halt of the internal combustion engine, and makes a judgement about a fault of an adiabatic function on the basis of a magnitude of the temperature decrease rate.

In the thus constructed exhaust gas purifying apparatus, if the adiabatic element is normal, the heat radiation from the heat storage member is cut off, and consequently, the temperature decrease rate of the heat storage member is restrained. Whereas if the abnormal state occurs in the adiabatic means, the heat radiation from the heat storage member is not cut off, and hence the temperature decrease velocity of the heat storage member becomes faster than at the normal time. As a result, the temperature decrease rate of the heat storage member per predetermined time becomes larger than at the normal time.

Then, the fault judging means calculates the temperature decrease rate of the heat storage member per predetermined time from the detected value of the temperature detecting means after the halt of the operation of the internal combustion engine, and, if the temperature decrease rate is larger than the predetermined judgement criterion, the fault judging means can judge that the adiabatic function is faulted.

Thus, according to the present invention, in the exhaust gas purifying apparatus including the adiabatic means for cutting off the heat radiations from the exhaust gas purifying catalyst and the heat storage member, the adiabatic function can be judged to be faulted in terms of the magnitude of the temperature decrease rate of the heat storage member after the halt of the operation of the internal combustion engine.

Note that when the heat storage member is composed of a change-of-phase substance, it is preferable that the fault judging means makes the judgement about the fault before a start of a change-of-phase state or after an end of the change-of-phase state, in which state the temperature of the heat storage member is kept constant.

In another aspect of the invention, the temperature control means may be adapted to include a heat storage member formed by a change-of-phase substance for supplying the heat to the exhaust gas purifying catalyst.

In this case, the state detecting means include temperature detecting means for detecting a temperature of the heat storage member, and the fault judging means counts, from the detected value of the temperature control means, a duration of the change-of-phase state, in which state the temperature of the heat storage member is kept constant, and makes a judgement about a fault on the basis of a length of this counted duration.

In the thus constructed exhaust gas purifying apparatus, the heat storage member at the normal time assumes the change-of-phase state at a substantially constant temperature, and the duration of the change-of-phase state also becomes a substantially constant period of time. The change-of-phase time of the heat storage member at an abnormal time is shorter than at the normal time.

Then, the fault judging means refers to the temperature of the heat storage member which has been detected by the temperature detecting element, and makes a judgement with respect to the change-of-phase state of the heat storage member, and counts a duration of this change-of-phase state. Subsequently, the fault judging means, if the duration of the change-of-phase state is shorter than a predetermined judgement criterion, can judge that a heat storage function is faulted.

As described above, according to the present invention, in the exhaust gas purifying apparatus including the heat storage member formed by the change-of-phase substance, the adiabatic function and the heat storage function can be judged to be faulted based on a length of the duration of the change-of-phase state, in which state the temperature of the heat storage member is kept constant.

In another aspect of the invention, the temperature control means may be adapted to include an outer casing for covering the exhaust purifying catalyst, and adiabatic means, which is disposed between the outer casing and the exhaust gas purifying catalyst, for cutting off a heat transmission from the exhaust gas purifying catalyst to the outer casing.

In this case, the state detecting means includes first temperature detecting means for detecting a temperature of the exhaust gas purifying catalyst and second temperature detecting means for detecting a temperature of the outer casing, and the fault judging means makes a judgement about a fault of an adiabatic function of the exhaust gas purifying apparatus on the basis of a difference between a detected value of the first temperature detecting means and a detected value of the second temperature detecting means.

In the thus constructed exhaust gas purifying apparatus, if the adiabatic means is normal, the heat transmission from the exhaust gas purifying catalyst to the outer casing is cut off, and hence there will be a noticeable temperature difference between the outer casing and the exhaust gas purifying catalyst. Whereas if an abnormal state occurs in the adiabatic means, in which case the heat transmission from the exhaust gas purifying catalyst to the outer casing is not cut off, the temperature difference between the exhaust gas purifying catalyst and the outer casing becomes smaller than at the normal time.

Thus, the fault judging means, if a difference between the detected values of the first and second temperature detecting means is smaller than the judgement criterion, can judge that the adiabatic function is faulted.

As described above, according to the present invention, in the exhaust gas purifying apparatus having the outer casing for covering the exhaust gas purifying catalyst and the adiabatic means for cutting off the heat transmission from the exhaust gas purifying catalyst to the outer casing, the judgement that the adiabatic function is faulted can be made based on the difference between the temperature of the exhaust gas purifying catalyst and the temperature of the outer casing.

In another aspect of the invention, the temperature control means may be adapted to include an outer casing for covering the exhaust gas purifying catalyst, and heat radiation/insulation switching means, disposed between the outer casing and the exhaust gas purifying catalyst, for cutting off a heat transmission from the exhaust gas purifying catalyst to the outer casing when a temperature of the exhaust gas purifying catalyst is lower than a predetermined temperature, and for permitting the heat transmission from the exhaust gas purifying catalyst to the outer casing when the temperature of the exhaust gas purifying catalyst is over the predetermined temperature.

In this case, the state detecting means includes first temperature detecting means for detecting a temperature of the exhaust gas purifying catalyst, and second temperature detecting means for detecting a temperature of the outer casing, and fault judging means makes, at a timing when the heat radiation/insulation switching means should cut off the heat transmission from the exhaust gas purifying catalyst to the outer casing, a judgement about a fault of an adiabatic function on the basis of a difference between a detected value of the first temperature detecting means and a detected value of the second temperature detecting means.

In the thus constructed exhaust gas purifying apparatus, the heat radiation/insulation switching means, if normal, operates to cut off the heat transmission from the exhaust gas purifying catalyst to the outer casing when the temperature of the exhaust gas purifying catalyst is lower than the predetermined temperature, and hence there is produced the temperature difference between the exhaust gas purifying catalyst and the outer casing. The heat radiation/insulation switching means, whereas if abnormal, does not operate to cut off the heat transmission from the exhaust gas purifying catalyst to the outer casing when the temperature of the exhaust gas purifying catalyst is lower than the predetermined temperature, and hence the temperature difference between the exhaust gas purifying catalyst and the outer casing becomes smaller than at the normal time.

Then, the fault judging means can judge that the adiabatic function is faulted, if the difference between the detected values of the first and second temperature detecting means is smaller than the predetermined judgement criterion at the timing when the heat radiation/insulation switching means should cut off the heat radiation from the exhaust gas purifying catalyst.

As described above, according to the present invention, in the exhaust gas purifying apparatus including the outer casing for covering the exhaust gas purifying catalyst and the heat radiation/insulation switching means for cutting off the heat transmission from the exhaust gas purifying catalyst to the outer casing when the temperature of the exhaust gas purifying catalyst is lower than the predetermined temperature, and permitting the heat transmission from the exhaust gas purifying catalyst to the outer casing when the temperature of the exhaust gas purifying catalyst is over the predetermined temperature, the adiabatic function can be judged to be faulted from the difference between the temperature of the outer casing and the temperature of the exhaust gas purifying catalyst at the timing when the heat radiation/insulation switching means should cut off the heat transmission from the exhaust gas purifying catalyst to the outer casing.

In another aspect of the invention, the temperature control means may be adapted to include an outer casing for covering the exhaust gas purifying catalyst, and heat radiation/insulation switching means, which is disposed between the outer casing and the exhaust gas purifying catalyst, for cutting off a heat transmission from the exhaust gas purifying catalyst to the outer casing when a temperature of the exhaust gas purifying catalyst is lower than a predetermined temperature, and for permitting the heat transmission from the exhaust gas purifying catalyst to the outer casing when the temperature of the exhaust gas purifying catalyst is over the predetermined temperature, In this case, the state detecting means includes first temperature detecting means for detecting a temperature of the exhaust gas purifying catalyst, and second temperature detecting means for detecting a temperature of the outer casing, and fault judging means makes, at a timing when the heat radiation/insulation switching means should permit the heat transmission from the exhaust gas purifying catalyst to the outer casing, a judgement about a fault of a heat radiating function on the basis of a difference between a detected value of the first temperature detecting means and a detected value of the second temperature detecting means.

In the thus constructed exhaust gas purifying apparatus, the heat radiation/insulation switching means, if normal, operates to permit the heat transmission from the exhaust gas purifying catalyst to the outer casing when the temperature of the exhaust gas purifying catalyst is over the predetermined temperature, and therefore the temperature difference between the exhaust gas purifying catalyst and the outer casing decreases. The heat radiation/insulation switching means, whereas if abnormal, does not operate to permit the heat transmission from the exhaust gas purifying catalyst to the outer casing when the temperature of the exhaust gas purifying catalyst is over the predetermined temperature, and hence the temperature difference between the exhaust gas purifying catalyst and the outer casing becomes greater than at the normal time.

Then, the fault judging means judges that the heat radiating function is faulted, if the difference between the detected values of the first and second temperature detecting means is larger than the predetermined judgement criterion at the timing when the heat radiation/insulation switching means should permit the heat radiation from the exhaust gas purifying catalyst.

As described above, according to the present invention, in the exhaust gas purifying apparatus including the outer casing for covering the exhaust gas purifying catalyst and the heat radiation/insulation switching means for cutting off the heat transmission from the exhaust gas purifying catalyst to the outer casing when the temperature of the exhaust gas purifying catalyst is lower than the predetermined temperature, and permitting the heat transmission from the exhaust gas purifying catalyst to the outer casing when the temperature of the exhaust gas purifying catalyst is over the predetermined temperature, the heat radiating function can be judged to be faulted from the difference between the temperature of the outer casing and the temperature of the exhaust gas purifying catalyst at the timing when the heat radiation/insulation switching means should permit the heat transmission from the exhaust gas purifying catalyst to the outer casing.

In another aspect of the invention, the temperature control means may be adapted to include a heat storage member for supplying the heat to the exhaust gas purifying catalyst, an outer casing for covering the exhaust gas purifying catalyst and the heat storage member, and adiabatic means, disposed between the outer casing and the exhaust gas purifying catalyst or the heat storage member, for cutting off heat radiations from the exhaust gas purifying catalyst and from the heat storage member.

In this case, state detecting means includes second temperature detecting means for detecting a temperature of the outer casing, and third temperature detecting means for detecting a temperature of the heat storage member, and fault judging means makes a judgement about a fault of an adiabatic function of the exhaust gas purifying apparatus on the basis of a difference between a detected value of the second temperature detecting means and a detected value of the third temperature detecting means.

In the thus constructed exhaust gas purifying apparatus, if the adiabatic means is normal, the heat transmission from the heat storage member to the outer casing is cut off, and consequently there is produced a temperature difference between the outer casing and the heat storage member. Whereas if the abnormal state occurs in the adiabatic means, the heat transmission from the heat storage member to the outer casing is not cut off, and therefore the temperature difference between the heat storage member and the outer casing gets smaller than at the normal time.

Then, the fault judging means, if the difference between the detected values of the second and third temperature detecting means is smaller than the predetermined judgement criterion, can judge that the adiabatic function falls into the fault.

As described above, according to the present invention, in the exhaust gas purifying apparatus including the heat storage member for supplying the exhaust gas purifying catalyst with the heat, the outer casing for covering the exhaust gas purifying catalyst and the heat storage member, and the adiabatic means for cutting off the heat radiations from the exhaust gas purifying catalyst and from the heat storage member, the adiabatic function can be judged to be faulted from the temperature difference between the heat storage member and the outer casing.

In another aspect, temperature control means may be adapted to include a heat storage member for supplying the heat to the exhaust gas purifying catalyst, an outer casing for covering the exhaust gas purifying catalyst and the heat storage member, heat radiation/insulation switching means, disposed between the outer casing and the exhaust gas purifying catalyst or the heat storage member, for cutting off heat transmissions from the exhaust gas purifying catalyst and from the heat storage member to the outer casing when a temperature of the exhaust gas purifying catalyst is lower than a predetermined temperature, and for permitting the heat transmissions from the exhaust gas purifying catalyst and from the heat storage member to the outer casing when the temperature of the exhaust gas purifying catalyst is over the predetermined temperature.

In this case, state detecting means includes second temperature detecting means for detecting a temperature of the outer casing and third temperature detecting means for detecting a temperature of the heat storage member, and fault judging means makes, at a timing when the heat radiation/insulation switching means should cut off the heat transmissions from the exhaust gas purifying catalyst and from the heat storage member to the outer casing, a judgement about a fault of an adiabatic function on the basis of a difference between a detected value of the second temperature detecting means and a detected value of the third temperature detecting means.

In thus constructed exhaust gas purifying apparatus, the heat radiation/insulation switching means, if normal, operates to cut off the heat transmissions from the exhaust gas purifying catalyst and the heat storage member to the outer casing when the temperature of the exhaust gas purifying catalyst is lower than the predetermined temperature, and hence there is produced the temperature difference between the heat storage member and the outer casing.

On the other hand, if the heat radiation/insulation switching means is abnormal, it does not operate to cut off the heat transmissions from the exhaust gas purifying catalyst and the heat storage member to the outer casing when the temperature of the exhaust gas purifying catalyst is lower than the predetermined temperature, and hence the temperature difference between the heat storage member and the outer casing becomes smaller than at the normal time.

Then, the fault judging means can judge that the adiabatic function is faulted, if the difference between the detected values of the second and third temperature detecting means is smaller than the predetermined judgement criterion at the timing when the heat radiation/insulation switching means should cut off the heat radiations from the exhaust gas purifying catalyst and the heat storage member.

As described above, according to the present invention, in the exhaust gas purifying apparatus including the heat storage member for supplying the exhaust gas purifying catalyst with the heat, the outer casing for covering the exhaust gas purifying catalyst and the heat storage member, and the heat radiation/insulation switching means for cutting off the heat transmissions from the exhaust gas purifying catalyst and the heat storage member to the outer casing when the temperature of the exhaust gas purifying catalyst is lower than the predetermined temperature, and permitting the heat transmissions from the exhaust gas purifying catalyst and the heat storage member to the outer casing when the temperature of the exhaust gas purifying catalyst is over the predetermined temperature, the adiabatic function can be judged to be faulted from the difference between the temperature of the outer casing and the temperature of the heat storage member at the timing when the heat radiation/insulation switching means should cut off the heat transmissions from the exhaust gas purifying catalyst and the heat storage member to the outer casing.

In further aspect of the invention, temperature control means may be adapted to include a heat storage member for supplying the heat to the exhaust gas purifying catalyst, an outer casing for covering the exhaust gas purifying catalyst and the heat storage member, and heat radiation/insulation switching means, disposed between the outer casing and the exhaust gas purifying catalyst or the heat storage member, for cutting off heat transmissions from the exhaust gas purifying catalyst and from the heat storage member to the outer casing when a temperature of the exhaust gas purifying catalyst is lower than a predetermined temperature, and for permitting the heat transmissions from the exhaust gas purifying catalyst and from the heat storage member to the outer casing when the temperature of the exhaust gas purifying catalyst is over the predetermined temperature.

In this case, state detecting means includes second temperature detecting means for detecting a temperature of the outer casing and third temperature detecting means for detecting a temperature of the heat storage member, and fault judging means makes, at a timing when the heat radiation/insulation switching means should permit the heat transmissions from the exhaust gas purifying catalyst and from the heat storage member to the outer casing, a judgement about a fault of a heat radiating function on the basis of a difference between a detected value of the second temperature detecting means and a detected value of the third temperature detecting means.

In thus constructed exhaust gas purifying apparatus, the heat radiation/insulation switching means, if normal, operates to permit the heat transmissions from the exhaust gas purifying catalyst and the heat storage member to the outer casing when the temperature of the exhaust gas purifying catalyst is over the predetermined temperature, and hence the temperature difference between the heat storage member and the outer casing decreases. On the other hand, if the heat radiation/insulation switching means is in the abnormal state, it does not operate to permit the heat transmissions from the exhaust gas purifying catalyst and the heat storage member to the outer casing when the temperature of the exhaust gas purifying catalyst is over the predetermined temperature, and hence the temperature difference between the heat storage member and the outer casing becomes larger than at the normal time.

Then, the fault judging means can judge that the heat radiating function is faulted, if the difference between the detected values of the second and third temperature detecting means is larger than the predetermined judgement criterion at the timing when the heat radiation/insulation switching means should permit the heat radiation from the exhaust gas purifying catalyst.

As described above, according to the present invention, in the exhaust gas purifying apparatus including the heat storage member for supplying the exhaust gas purifying catalyst with the heat, the outer casing for covering the exhaust gas purifying catalyst and the heat storage member, and the heat radiation/insulation switching means for cutting off the heat transmissions from the exhaust gas purifying catalyst and the heat storage member to the outer casing when the temperature of the exhaust gas purifying catalyst is lower than the predetermined temperature, and permitting the heat transmissions from the exhaust gas purifying catalyst and the heat storage member to the outer casing when the temperature of the exhaust gas purifying catalyst is over the predetermined temperature, the heat radiating function can be judged to be faulted from the difference between the temperature of the outer casing and the temperature of the heat storage member at the timing when the heat radiation/insulation switching means should permit the heat transmissions from the exhaust gas purifying catalyst and the heat storage member to the outer casing.

It is to be noted that the exhaust gas purifying apparatus according to the present invention may be adapted to further comprise fault information outputting means for outputting, when the fault judging means judges that the exhaust gas purifying apparatus is faulted, information for indicating the fault in the exhaust gas purifying apparatus.

Further, the exhaust gas purifying apparatus according to the present invention may be adapted to The fault judging means may be adapted to correct a judgement criterion in accordance with a temperature of the outside air in the case of making the fault-judgement by utilizing the temperature of the exhaust gas purifying catalyst, the temperature of the heat storage member or the temperature of the outer casing.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 2 is a vertical sectional view showing a construction of a catalyst device;

FIG. 20 is a flowchart (part 2) showing a fault judgement control routine in the fifth embodiment;

FIG. 21 is a diagram showing a relationship between a temperature and a change-of-phase time of a heat storage material;

DETAILED DESCRIPTION OF THE PREFERRED EMBODIMENTS

Embodiment 1

A first embodiment of an exhaust gas purifying apparatus according to the present invention will hereinafter be described with reference to the accompanying drawings.

Figure 1:
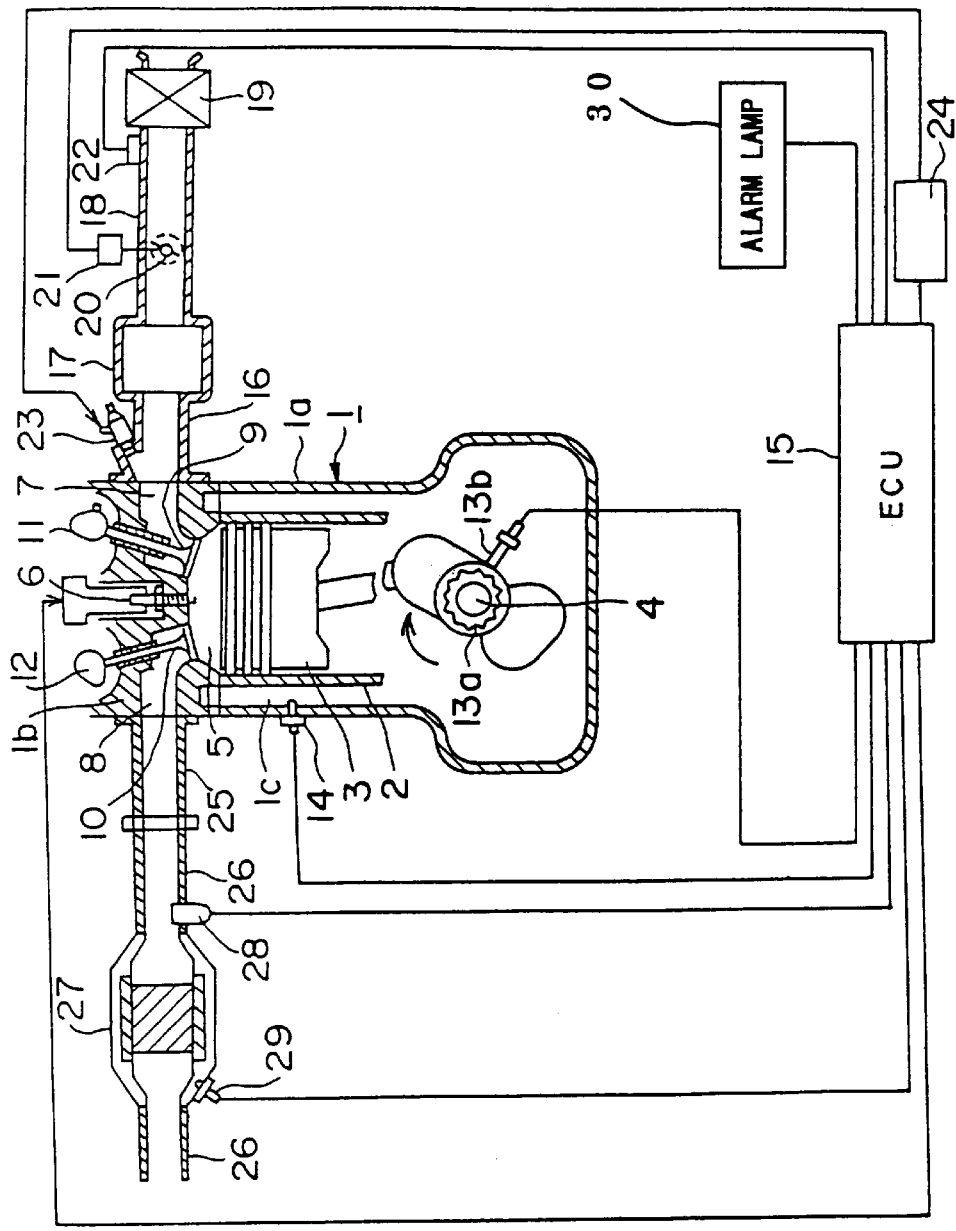
FIG. 1 is a view schematically illustrating a construction of an internal combustion engine to which an exhaust gas purifying apparatus according to the present invention is applied.

FIG. 1 is a view illustrating constructions of an internal combustion engine to which the exhaust gas purifying apparatus of the present invention is applied, and of a suction/discharge system thereof. The internal combustion engine shown in FIG. 1 is classified as a 4-cycle multi-cylinder internal combustion engine 1. This internal combustion engine 1 includes a cylinder block 1a formed with a plurality of cylinders 2, and a cylinder head 1b fixed to an upper portion of the cylinder block 1a. A piston 3 is so inserted into each cylinder 2 of the cylinder block 1a as to be slidable in an axial direction. This piston 3 is linked to a crank shaft 4 serving as an engine output shaft. Then, a combustion chamber 5 defined by a top surface of the piston 3 and by the cylinder head 1b, is formed upwardly of the piston 3.

The cylinder head 1b is fitted with a spark plug 6 facing to the combustion chamber 5, and is formed with an intake port 7 and an exhaust port 8, of which aperture edges face to the combustion chamber 5. Further, the cylinder head 1b supports a suction valve 9 and an discharge valve 10 for opening and closing the aperture edges of the intake and exhaust ports 7, 8 in such a way that the valves 9, 10 are capable of advancing and retreating. An intake-side cam shaft 11 and an exhaust-side cam shaft 12 for opening and closing these suction and discharge valves 9, 10 are rotatably supported on the cylinder head 1b.

The intake-side cam shaft 11 and the exhaust-side cam shaft 12 are connected via an unillustrated timing belt to the crank shaft 4, and a rotary force of the crank shaft 4 is transmitted via the timing belt to the intake-side cam shaft 11 and the exhaust-side cam shaft 12 as well.

Further, the internal combustion engine 1 includes a crank position sensor 13 constructed of a timing rotor 13a secured to an edge of the crank shaft 4 and of an electromagnetic pick-up 13b attached to the cylinder block 1a.

Attached further to the cylinder block 1a is a water temperature sensor 14 for outputting an electric signal corresponding to a temperature of cooling water flowing through inside a cooling water passageway 1c formed within the cylinder block 1a.

Next, the intake port 7 communicates with a suction branch pipe 16 fitted to the cylinder head 1b, and this suction branch pipe 16 is connected to a surge tank. Then, the surge tank 17 is connected via a suction pipe 18 to an air cleaner box 19.

The suction pipe 18 is provided with a throttle valve 20 for opening and closing a suction passageway within the suction pipe 18, interlocking with an unillustrated an accelerator. This throttle valve 20 is fitted with a throttle position sensor 21 for outputting an electric signal corresponding to an aperture of the throttle valve 20.

Subsequently, a portion, positioned upstream of the throttle valve 20, of the suction pipe 18 is fitted with an air flow meter for outputting an electric signal corresponding to a mass of fresh air (suction air mass) flowing inside the suction pipe 18.

Moreover, the suction branch pipe 16 is attached with a fuel injection valve 23, of which an injection hole faces to the intake port 7. This fuel injection valve 23, which is connected to a driving circuit 24, opens upon an application of a driving current from the driving circuit 24, and jets out the fuel into the suction branch pipe 16.

Next, the exhaust port 8 communicates with a discharge branch pipe 25 fitted to the cylinder head 1b, and this discharge branch pipe 25 is connected to a discharge pipe 26. Subsequently, the discharge pipe 26 is connected downstream to an unillustrated silencer.

A catalyst device 27 is provided halfway of the discharge pipe 26. A portion, positioned upstream of this catalyst device 27, of the discharge pipe 26 is fitted with an air/fuel ratio sensor 28 for outputting an electric signal corresponding to an air/fuel ratio of the exhaust gas flowing inside the discharge pipe 26.

Figure 3:
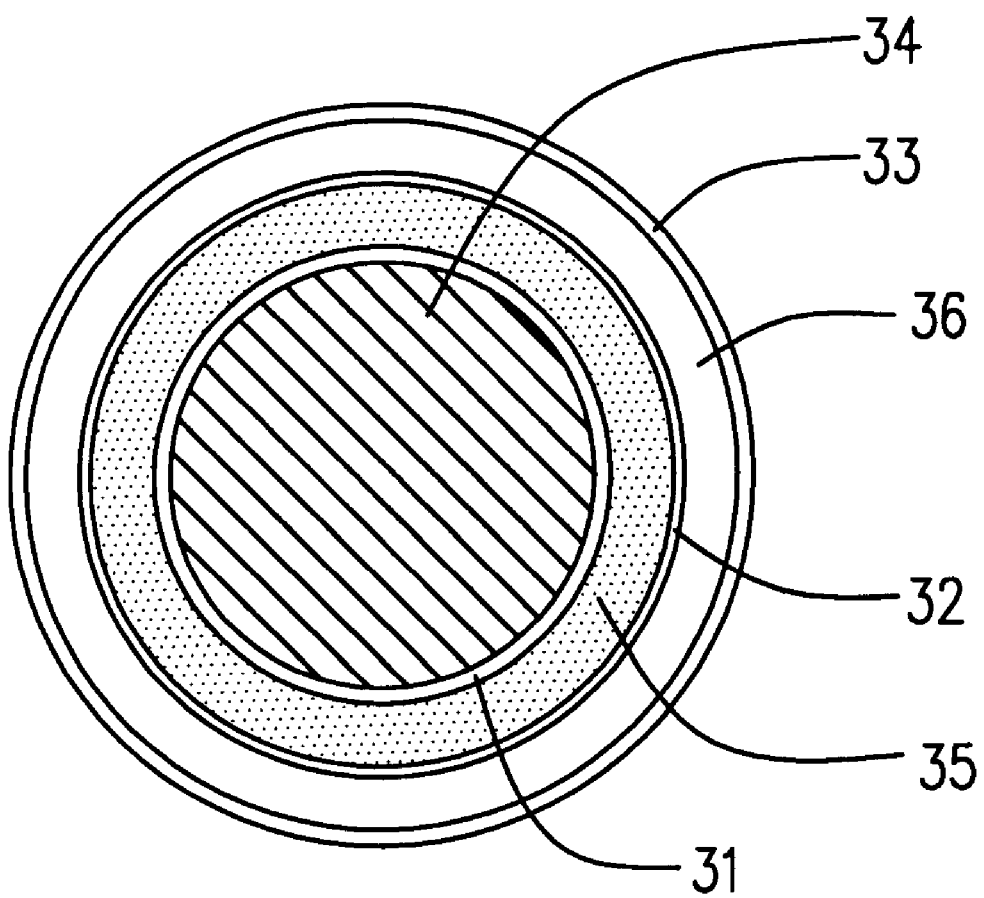
FIG. 3 is a sectional view taken along the arrow line A—A in FIG. 2, showing the catalyst device.

Herein, the catalyst device 27 is, as illustrated in FIGS. 2 and 3, constructed of a triple-structured cylindrical body including an flame tube 31 and an intermediate tube 32 and an outer casing 33. An interior of the flame tube 31 is filled with an exhaust gas purifying catalyst 34 activated at a temperature above a predetermined temperature so as to purify carbon monoxide (CO), nitrogen oxide (Nox), hydro carbon (HC) etc in the exhaust gas passing through inside the flame tube 31. Exemplified as the exhaust gas purifying catalyst 34 are a three way catalyst, an oxidation catalyst, a reduction catalyst or a Nox purifying catalyst.

A space defined by the flame tube 31 and the intermediate tube 32 is filled with a heat storage material 35 the base material of which is a change-of-phase substance such as lithium chloride and sodium chloride etc. This heat storage material 35 and the intermediate tube 32 serve to actualize a heat storage member according to the present invention.

Subsequently, a space defined by the flame tube 31, the intermediate tube 32 and the outer casing 33 is so formed as to be evacuated (hereinafter, the space 36 is refereed to as a vacuum layer 36). This vacuum layer 36 actualizes a vacuum spatial portion according to the present invention. Note that a degree of vacuum connoted herein shall be properly set corresponding to a demand for an adiabatic state of the exhaust gas purifying catalyst 34.

Then, the outer casing 33 is fitted with a pressure sensor 29 for outputting an electric signal corresponding to an absolute pressure within the vacuum layer 36. This pressure sensor 29 actualizes a pressure detecting means according to the present invention.

In the thus constructed catalyst device 27, the exhaust gas purifying catalyst 34 rises in temperature upon receiving heat of the exhaust gas when the internal combustion engine 1 is operated, and, after stopping the operation of the internal combustion engine 1, a radiation of heat of the exhaust gas purifying catalyst 34 is cut off by the vacuum layer 36. Therefore, the temperature of the exhaust gas purifying catalyst 34 is hard to decrease less than an activation temperature.

Herein, referring back to FIG. 1, the variety of sensors such as the crank position sensor 13, the water temperature sensor 14, the throttle position sensor 21, the air flow meter 22, the air/fuel ratio sensor 28 and the pressure sensor 29, are connected via electric wires to an engine control electronic control means (ECU) 15. Output signals of the respective sensors are inputted to the ECU 15. Further, the ECU 15 is connected via the electric wire to an alarm lamp 30 disposed inside the room of an unillustrated vehicle. The alarm lamp 30 is one example of a fault information outputting means according to the present invention, and is lit up when the catalyst device 27 falls into a fault.

Then, the ECU 15 makes a judgement about an operation state of the internal combustion engine 1, wherein the output signals from the variety of sensors are used as parameters. The ECU 15 performs various control operations of the spark plug 6 or the driving circuit 24 etc in accordance with the operation state of the internal combustion engine 1, and executes a fault judging process, which is an essential point of the present invention.

Figure 4:
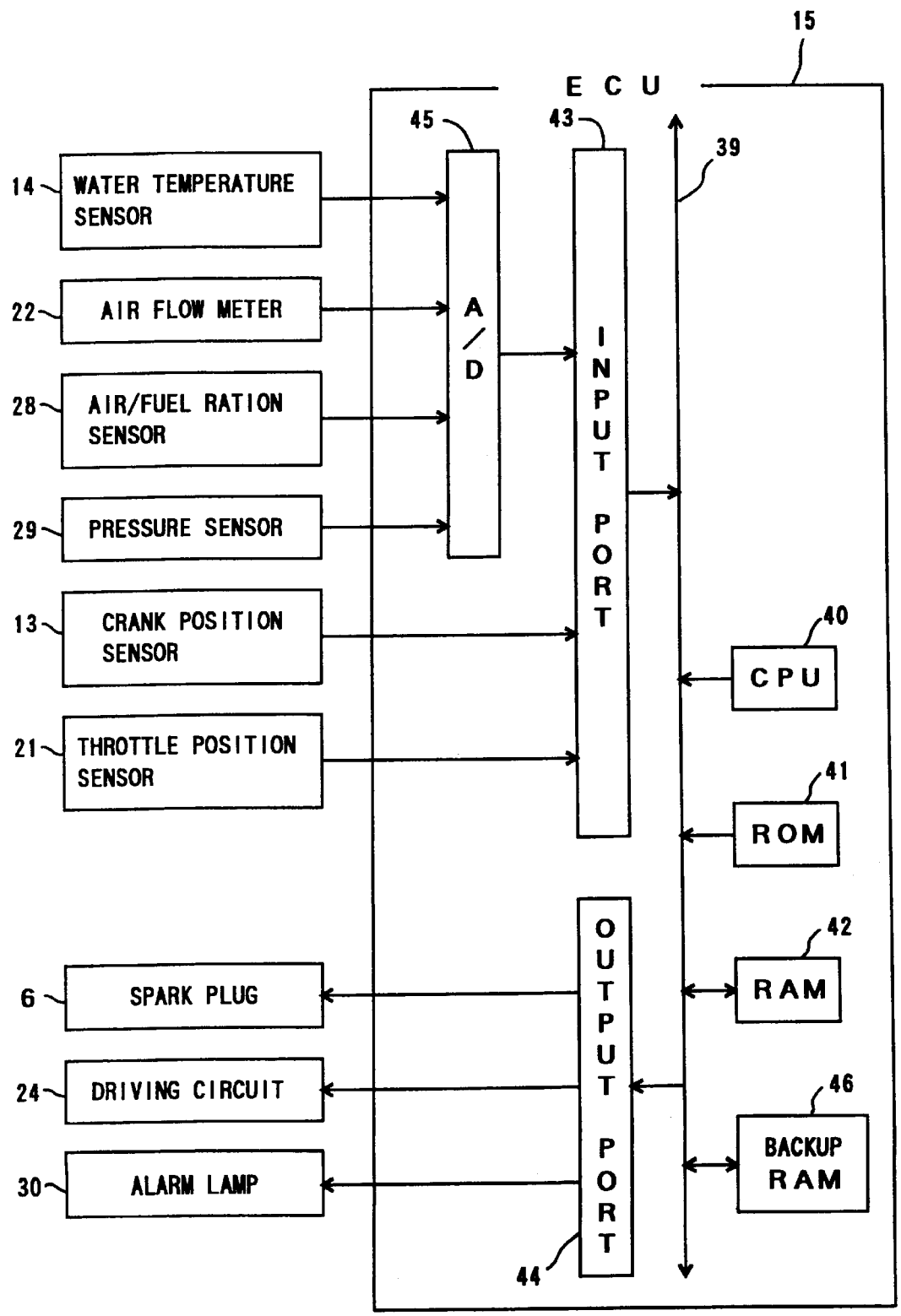
FIG. 4 is a diagram showing an internal construction of an ECU.

Herein, the ECU 15 includes, as illustrated in FIG. 4, has a CPU 40, a ROM 41, a RAM 42, a backup RAM 46, an input port 43, an output port 44, and an A/D converter (A/D) 45 connected to the input port 43.

The input port 43 inputs signals from the crank position sensor 13 and from the throttle position sensor 21, and transmits these signals to the CPU 40 or the RAM 42. Further, the input port 43 inputs via the A/D converter 45 signals from the water temperature sensor 14, the air flow meter 22, the air/fuel ratio sensor 28 and the pressure sensor 29, and transmits these signals to the CPU 40 or the RAM 42.

The output port 44 outputs a control signal given from the CPU 40 to the spark plug 6 and the driving circuit 24 or the alarm lamp 30.

The ROM 41 is stored with application programs such as a fuel injection quantity control routine for determining a fuel injection quantity, a fuel injection timing control routine for a fuel injection timing, an ignition timing control routine for determining an ignition timing or a fault diagnosing control routine for diagnosing a fault in the exhaust gas purifying catalyst 34, a variety of control maps, and a judgement value P0 for making a judgement about a fault.

The control maps are a fuel injection quantity control map for indicating a relationship between the operation state of the internal combustion engine 1 and the fuel injection quantity, a fuel injection timing control map for indicating a relationship between the operation state of the internal combustion engine 1 and the fuel injection timing, and an ignition timing control map for indicating a relationship between the operation state of the internal combustion engine 1 and the ignition timing.

Subsequently, the RAM 42 is stored with the output signals from the respective sensors and with an arithmetic result of the CPU 40. The arithmetic result is, e.g., the number of rotations of the engine, which is calculated from the output signal of the crank position sensor 13. Then, the output signal from each sensor and the arithmetic result of the CPU 40 are rewritten into update data every time the crank position sensor 13 outputs a signal.

Further, the RAM 42 is provided with a region for storing a variety of flags such as a fault judging flag (fault time: 1, normal time: 0) for distinguishing whether or not the catalyst device 27 falls into a fault.

The backup RAM 46 is a non-volatile memory for retaining the data even after the internal combustion engine 1 has been stopped, and is stored with a value of the fault judging flag in the embodiment 1.

Next, the CPU 40 operates in accordance with the application program stored in the ROM 41, then judges, from the output signals of the respective sensors, which operation state the internal combustion engine 1 is in, and calculates a fuel injection quantity, a fuel injection timing and an ignition timing etc from the operation state thereof and the respective control maps. Then, the CPU 40 controls the driving circuit 24 and the spark plug 6 in accordance with the calculated fuel injection quantity, fuel injection timing and ignition timing.

Further, the CPU 40 inputs an output signal P1 of the pressure sensor 29 at a predetermined timing, and judges whether or not this signal value P1 is smaller than the judgement value P0 of the ROM 41, i.e., whether or not the vacuum layer 36 is in the vacuum state.

If the signal value P1 is over the predetermined value P0, the CPU 40 judges that the vacuum layer 36 is a non-vacuum state, and infers that the degree of vacuum of the vacuum layer 36 decreases due to a crack in the flame tube 31 or the intermediate tube 32 or the outer casing 33. Then, the CPU 40 writes "1" to the fault judgement flag storage regions of the RAM 42 and of the backup RAM 46, and outputs the control signal in order to light up the alarm lamp 30.

Thus, the ECU 15 actualizes a fault judging means according to the present invention.

Hereinafter, the operation and the effect in the embodiment 1 will be explained.

Figure 5:
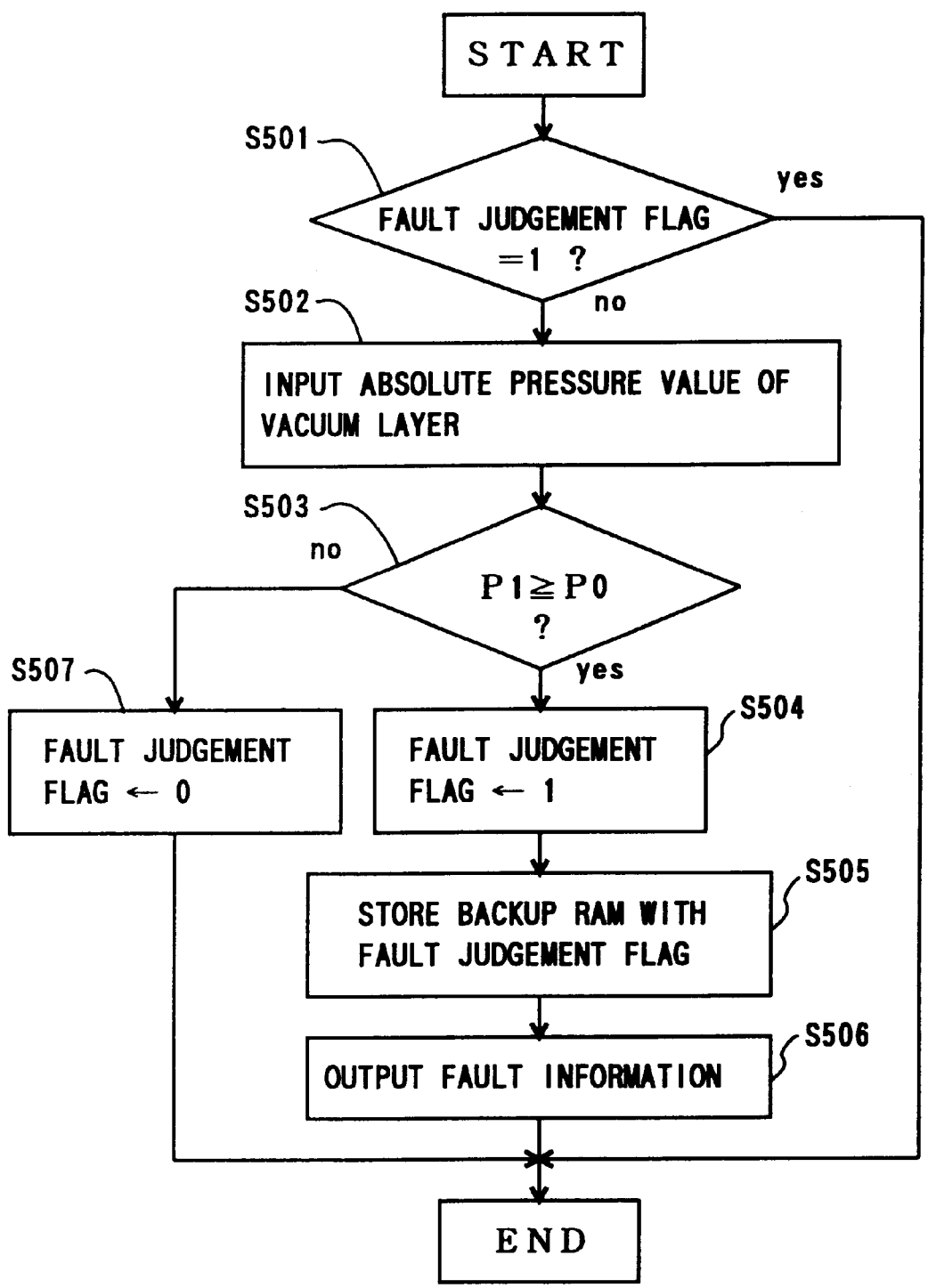
FIG. 5 is a flowchart showing a fault judgement control routine.

The CPU 40 repeatedly executes a fault diagnostic control routine as shown in FIG. 5 at an interval of a predetermined time (e.g., each time the crank position sensor 13 outputs the signal) during the operation of the internal combustion engine 1.

In the fault diagnostic control routine, the CPU 40 accesses the fault judgement flag storage regions of the RAM 42 and of the backup RAM 46 in S501, and judges whether "1" is stored therein or not.

The CPU 40, when judging in S501 that "1" is stored in the fault judgement flag storage region of at least one of the RAM 42 and the backup RAM 46, infers that the catalyst device 27 has already been judged to be faulted, and finishes executing the fault diagnostic control routine.

While on the other hand, the CPU 40, when judging in S501 that "0" is stored in the fault judgement flag storage regions of the RAM 42 and the backup RAM 46, advances to S502, wherein the CPU 40 inputs the output signal value P1 of the pressure sensor 29.

Subsequently, the CPU 40 goes forward to S503 and reads therein the judgement value P0 from the ROM 41. Then, the CPU 40 judges whether or not the signal value P1 inputted in S501 is over the judgement value P0.

The CPU 40, when judging in S503 that the signal value P1 is over the judgement value P0, infers that the degree of vacuum of the vacuum layer 36 decreases and that the catalyst device 27 falls into the fault, and advances to S504.

In S504, the CPU 40 writes "1" to the fault judgement flag storage region of the RAM 42. Subsequently, the CPU 40 goes to S505 and writes therein "1" to the fault judgement flag storage region of the backup RAM 46.

Then, the CPU 40, when advancing to S506, outputs the control signal in order to light up the alarm lamp 30, and finishing the execution of this routine. The control signal outputted from the CPU 40 is transmitted via the output port 44 to the alarm lamp 30, and as a result the alarm lamp 30 is lit up.

While on the other hand, the CPU 40, when judging in S503 that the signal value P1 is less than the judgement value P0, infers that the vacuum layer is in the vacuum state and that the catalyst device 27 is normal, and advances to S507.

In S507, the CPU 40 writes "0" to the fault judgement flag storage regions of the RAM 42 and the backup RAM 46, and finishes executing this routine.

As discussed above, according to the exhaust gas purifying apparatus in the embodiment 1, in the catalyst device 27 contrived such that the radiation of the heat of the exhaust gas purifying catalyst 34 is cut off by the vacuum layer 36, the fault in the adiabatic function of the catalyst device 27 can be diagnosed based on the pressure of the vacuum layer 36. Then, the CPU 40, when judging that the catalyst device 27 falls into a fault of adiabatic function, makes a driver recognize the fault in the catalyst device 27 by lighting up the alarm lamp 30, and may prompt the driver to repair and replace the catalyst device 27.

It is to be noted that the embodiment 1 has exemplified the execution of the fault diagnostic control routine when the internal combustion engine 1 is operated, however, the same routine may also be executed when stopping the operation of the internal combustion engine 1.

Embodiment 2

A second embodiment of the exhaust gas purifying apparatus according to the present invention will be described with reference to FIGS. 6 and 7. Herein, the explanation is concentrated upon a construction different from the one in the first embodiment discussed above, and the description of the like components is omitted.

Figure 6:
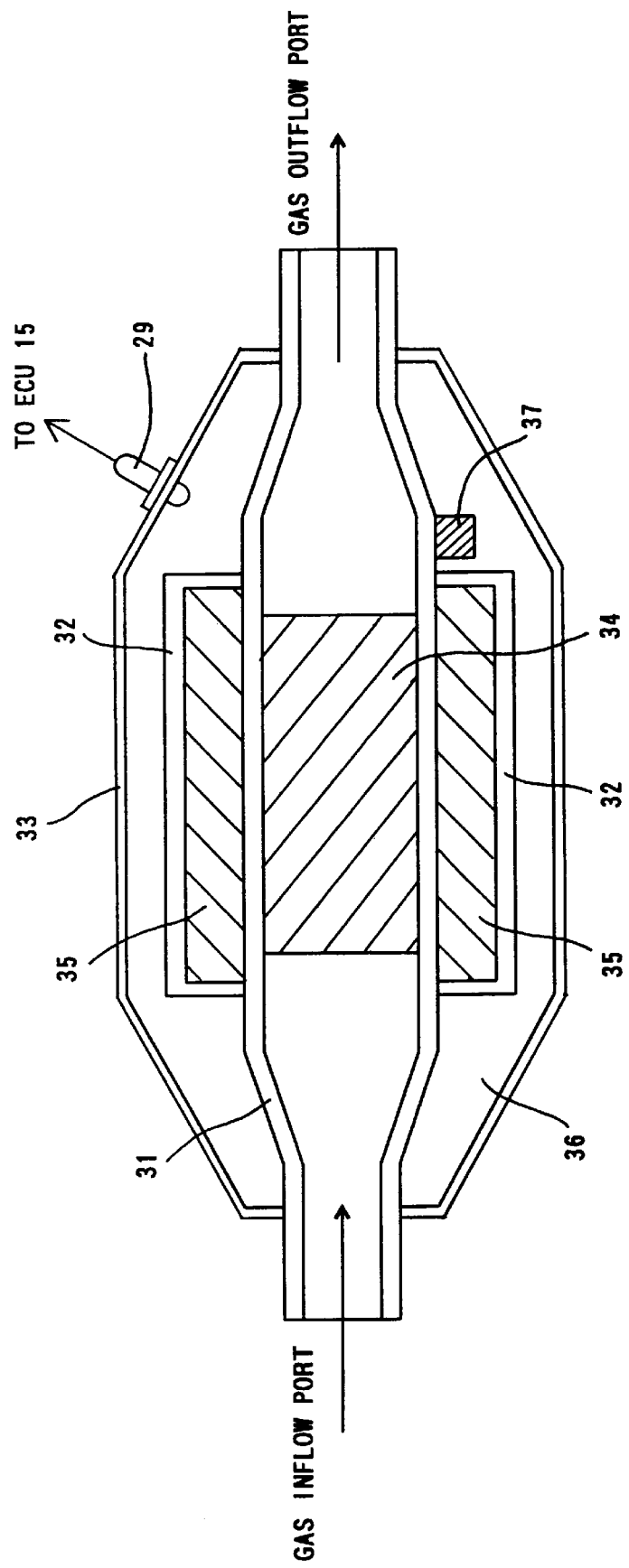
FIG. 6 is a vertical sectional view showing a construction of the catalyst device in a second embodiment.

The catalyst device 27 in the second embodiment includes, as shown in FIG. 6, a hydrogen absorbing alloy 37 incorporated into the vacuum layer 36, which absorbs hydrogen when lower than a predetermined temperature and emits the hydrogen when over the predetermined temperature described above. It is desirable that the hydrogen absorbing alloy 37 be disposed in the vicinity of the exhaust gas purifying catalyst 34 in order to substantially equalize a temperature of the hydrogen absorbing alloy 37 to a temperature of the exhaust gas purifying catalyst 34.

In the thus constructed catalyst device 27, the exhaust gas purifying catalyst 34 and the heat storage material 35 rise in their temperatures upon receiving the heat of the exhaust gas during the operation of the internal combustion engine 1. In particular, when the internal combustion engine 1 is operated with high rotations and a high load, a large quantity of high-temperature exhaust gas passes through the catalyst device 27, and hence the exhaust gas purifying catalyst 34 and the heat storage material 35 rises up to higher temperatures. On this occasion, the temperature of the hydrogen absorbing alloy 37 rises corresponding to the increase in temperature of the exhaust gas purifying catalyst 34.

Then, when the exhaust gas purifying catalyst 34 and the hydrogen absorbing alloy 36 rises over the predetermined temperature, the hydrogen is discharged from the hydrogen absorbing alloy 37, and the vacuum layer 36 is brought into the non-vacuum state. At this time, the heat of the heat storage material 35 and of the exhaust gas purifying catalyst 34 is transmitted via the hydrogen to the outer casing 33, and therefore excessive rises in temperatures of the exhaust gas purifying catalyst 34 and of the heat storage material 35 are restrained.

Thereafter, when the temperatures of the exhaust gas purifying catalyst 34 and of the heat storage material 35 decrease under the predetermined temperature, the hydrogen in the vacuum layer 36 is again absorbed by the hydrogen absorbing alloy 37, and the vacuum layer 36 is brought into the vacuum state.

When the vacuum layer 36 is kept in the vacuum state, the heat radiations from the exhaust gas purifying catalyst 34 and of the heat storage material 35 are cut off by the vacuum layer 36, and hence it is feasible to restrain the decreases in the temperatures of the exhaust gas purifying catalyst 34 and of the heat storage material 35. Since such an effect continues even after the halt of the operation of the internal combustion engine 1, the exhaust gas purifying catalyst 34 can me kept at a temperature higher than an activation temperature till the internal combustion engine 1 is started next time, and the emission of the exhaust gas at the start-up time can be prevented from worsening.

As described above, the hydrogen absorbing alloy 37 actualizes a heat radiation/insulation control means according to the present invention.

Next, the CPU 40 of the ECU 15, as in the first embodiment discussed above, diagnoses a fault based on the pressure of the vacuum layer 36. If the CPU 40 diagnoses the fault when the hydrogen is emitted out of the hydrogen absorbing alloy 37, i.e., when the vacuum layer 36 is in the non-vacuum state, however, there might be a possibility of misjudging that the fault is caused despite of the vacuum layer 36 being normal.

Such being the case, the CPU 40 diagnoses the fault on condition that the hydrogen is absorbed by the hydrogen absorbing alloy 37. To be specific, the CPU 40 infers that the hydrogen is absorbed by the hydrogen absorbing alloy 37 on condition that the internal combustion engine 1 is operated neither with the high rotations nor in the high-load state and that a predetermined time tA or longer has elapsed since the high-rotation/high-load operation was ended.

Note that the predetermined time tA is a time required till the hydrogen once emitted from the hydrogen absorbing alloy 37 is again absorbed by the hydrogen absorbing alloy 37 during the high-rotation/high-load operation.

Other constructions are the same as those in the first embodiment discussed above.

The operation and the effect in the second embodiment will hereinafter be explained.

Figure 7:
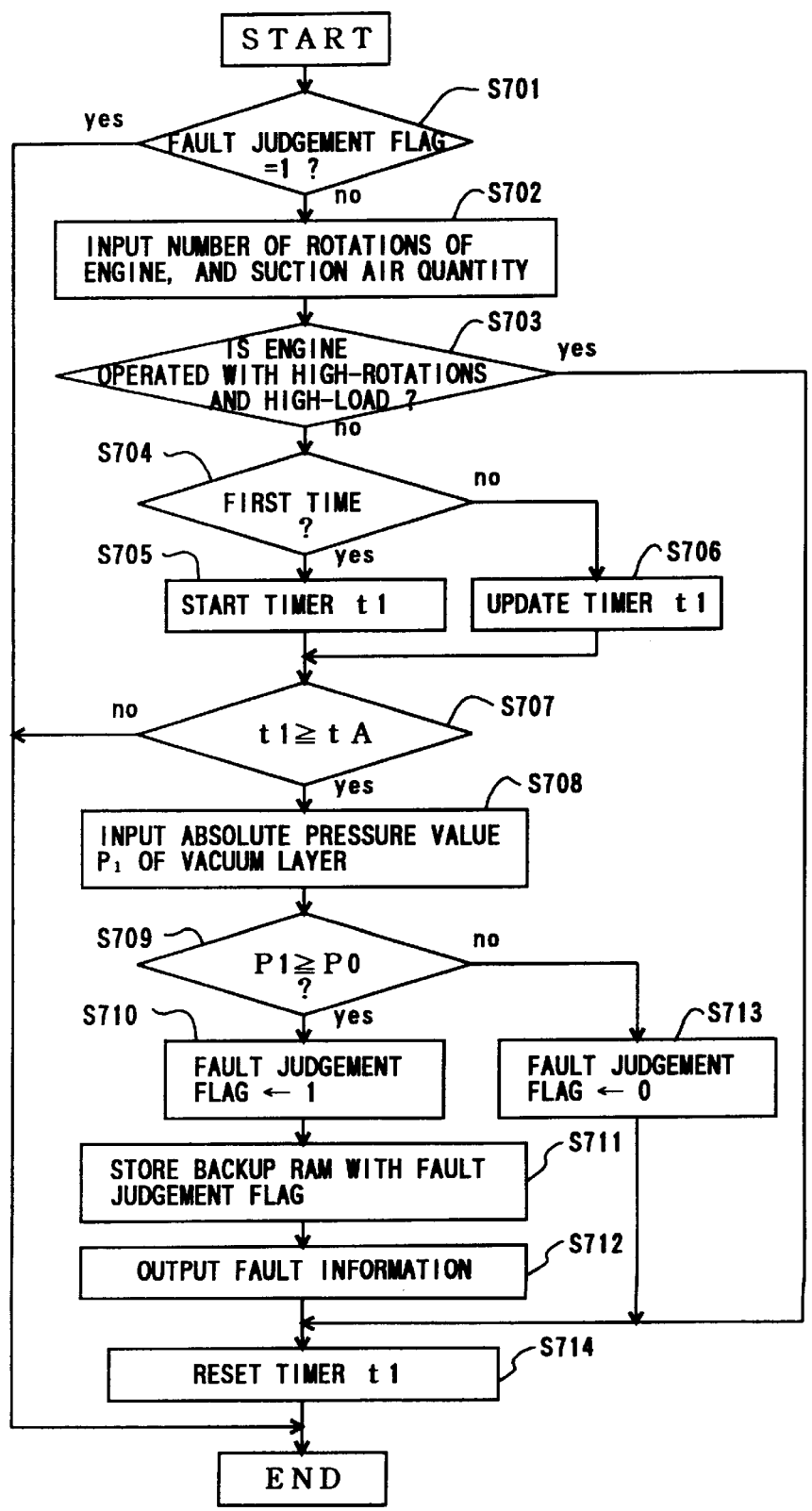
FIG. 7 is a flowchart showing a fault judgement control routine in the second embodiment.

The CPU 40 repeatedly executes a fault diagnostic control routine as shown in FIG. 7 at an interval of a predetermined time during the operation of the internal combustion engine 1.

In the fault diagnostic control routine, the CPU 40 accesses the fault judgement flag storage regions of the RAM 42 and of the backup RAM 46 in S701, and judges whether "1" is stored therein or not.

The CPU 40, when judging in S701 that "1" is stored in the fault judgement flag storage region of at least one of the RAM 42 and the backup RAM 46, infers that the catalyst device 27 has already been judged to be faulted, and finishes executing the fault diagnostic control routine.

While on the other hand, the CPU 40, when judging in S701 that "0" is stored in the fault judgement flag storage regions of the RAM 42 and the backup RAM 46, advances to S702, wherein the CPU 40 inputs the output signals of the crank position sensor 13 and of the air flow meter 22, and calculates the number of rotations of the engine from the output signal of the crank position sensor 13.

Subsequently, the CPU 40 goes forward to S703, wherein the CPU 40 judges whether or not the number of rotations of the engine that is calculated in S702 is over a predetermined number of rotations and whether or not a suction air quantity inputted in S702 is over a predetermined quantity, i.e., whether or not the operation state of the internal combustion engine 1 is in a high-rotation/high-load region.

The CPU 40, when judging in S703 that the operation state of the internal combustion engine 1 is in the high-rotation/high-load region, resets a measuring timer t1 in S714, and thereafter finishes the execution of this routine.

The CPU 40, whereas if it is judged in S703 that the operation state of the internal combustion engine 1 is not in the high-rotation/high-load region, advances to S704, in which the CPU 40, after judging that the operation state of the internal combustion engine 1 is not in the high-rotation/high-load region, judges whether the number of executions of the present routine is the first time or not.

The CPU 40, when judging in S704 that the number of executions of the present routine is the first time, goes forward to S705 and starts up the measuring timer t1. This measuring timer t1 counts an elapse time since the CPU 40 judged that the operation state of the internal combustion engine 1 is not in the high-rotation/high-load region.

On the other hand, the CPU 40, when judging in S704 that the number of executions of the present routine is the second time or thereafter, advances to S706 and updates a count time of the measuring timer t1.

The CPU 40 having finished executing the processes in S705 and S706 moves forward to S707, and judges whether or not the count time of the measuring timer t1 is over a predetermined time tA, i.e., whether or not there elapses a time enough to make the hydrogen absorbing alloy 37 re-absorb the hydrogen emitted out of the hydrogen absorbing alloy 37 during the high-rotation/high-load operation of the internal combustion engine 1.

The CPU 40, when judging in S707 that the count time of the measuring timer ti is less than the predetermined time tA, infers that there is not finished the absorption of the hydrogen emitted out of the hydrogen absorbing alloy 37 during the high-rotation/high-load operation of the internal combustion engine 1 (that the vacuum layer 36 is in the non-vacuum state), and temporarily finishes the execution of the present routine.

While on the other hand, the CPU 40, when judging in S707 that the count time of the measuring timer t1 is over the predetermined time tA, infers that there is finished the absorption of the hydrogen emitted out of the hydrogen absorbing alloy 37 during the high-rotation/high-load operation of the internal combustion engine 1, and advances to S708.

In S708, the CPU 40 inputs the output signal value P1 of the pressure sensor 29. Subsequently, in S709, the CPU 40 reads the judgement value P0 from the ROM 41, and judges whether or not the signal value P1 is over the judgement value P0.

The CPU, when judging in S709 that the signal value P1 is over the judgement value P0, infers that the degree of vacuum of the vacuum layer 36 decreases and that the catalyst device 27 becomes faulted, and advances to S710.

In S710, the CPU 40 writes "1" to the fault judgement flag storage region of the RAM 42. Subsequently, the CPU 40 moves forward to S711 and writes "1" to the fault judgement flag storage region of the backup RAM 46.

Then, the CPU 40 advances to S712 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up. The driver is thereby able to recognize the fault in the catalyst device 27.

The CPU 40, whereas if it is judged in S709 that the signal value P1 is less than the judgement value P0, infers that the vacuum layer 36 is in the vacuum state and that the catalyst device 27 is normal, and goes forward to S713.

In S713, the CPU 40 writes "0" to the fault judgement flag storage regions of the RAM 42 and of the backup RAM 46.

The CPU 40 having finished executing the processes in S712 and S713 resets the measuring timer t1 in S714 and thereafter finishes the execution of the present routine.

According to the exhaust gas purifying apparatus in the embodiment 2 discussed above, in the catalyst device 27 including the vacuum layer 36 and the hydrogen absorbing alloy 37, it is feasible to implement the accurate fault-diagnosis in terms of the heat radiating function and the adiabatic function of the catalyst device 27 by specifying the timing when the hydrogen is absorbed by the hydrogen absorbing alloy 37, i.e., the timing when the vacuum layer 36 is brought into the vacuum state from the operation state of the internal combustion engine, and detecting the pressure of the vacuum layer 36 at the specified timing.

Note that in the embodiment 2 the hydrogen absorbing alloy 37 has been exemplified as an means for controlling the heat radiations of the exhaust gas purifying catalyst 34 and of the heat storage material 35, however, this means is not limited to the alloy 37. The heat radiation control means may involve the use of, for example, a bimetal compressed when lower than a predetermined temperature in order to bring the flame tube 31 or the intermediate tube 32 and the outer casing 33 into a non-contact state and expanded when over the predetermined temperature in order to bring the flame tube 31 or the intermediate tube 32 and the outer casing 33 into a contact state, and serves to transmit the heat of the exhaust gas purifying catalyst 34 or the heat storage material 35 to the outer casing 33.

In this case, the vacuum layer 36 is always kept in the vacuum state irrespective of the state of the bimetal, and therefore the CPU 40 diagnoses the fault in the catalyst device 27 in accordance with the fault diagnostic control routine as explained in the first embodiment discussed above.

Embodiment 3

Figure 8:
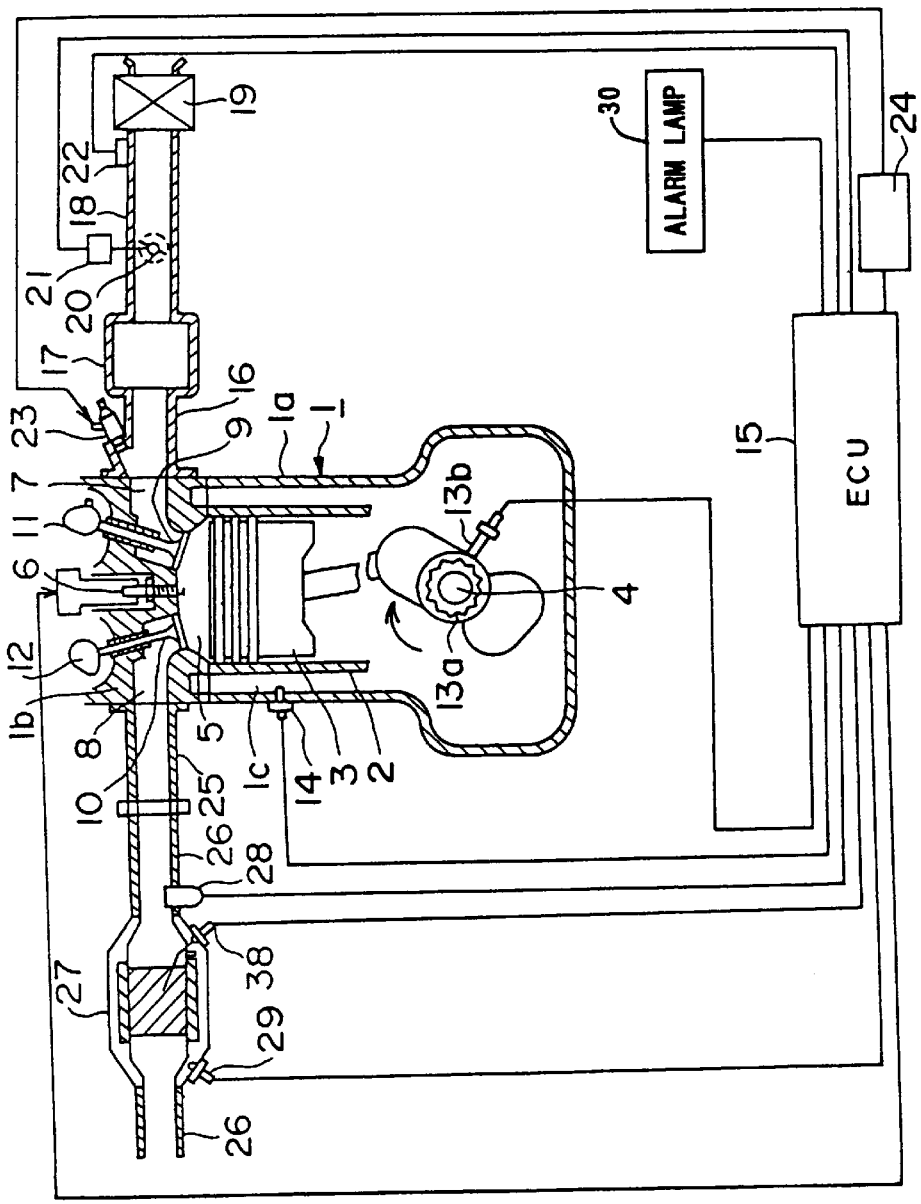
FIG. 8 is a view schematically illustrating a construction of the internal combustion engine to which the exhaust gas purifying apparatus in a third embodiment is applied.
Figure 9:
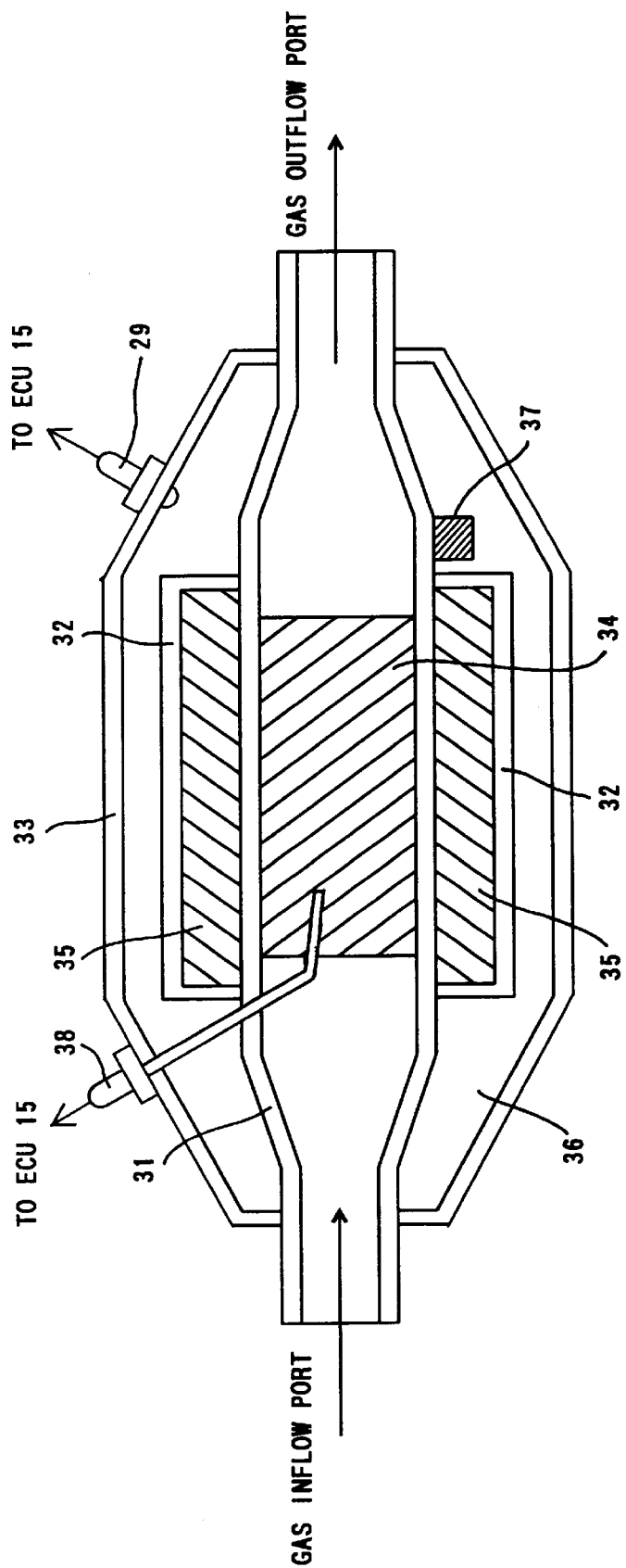
FIG. 9 is a vertical sectional view showing a construction of the catalyst device in the third embodiment.

A third embodiment of the exhaust gas purifying apparatus according to the present invention will be described with reference to FIGS. 8 and 9. Herein, the explanation is concentrated upon a construction different from the one in the second embodiment discussed above, and the description of the like components is omitted.

Figure 10:
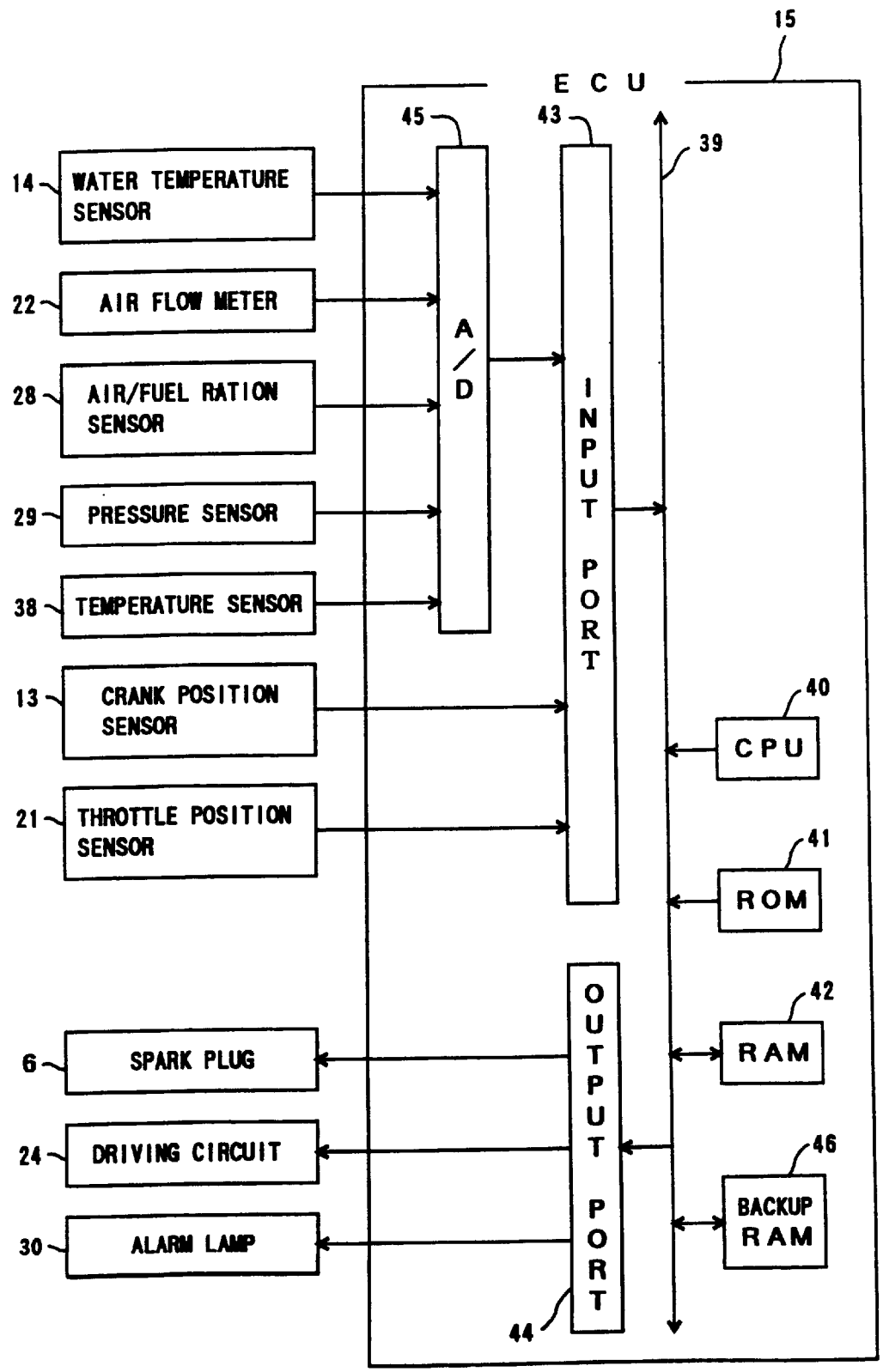
FIG. 10 is a diagram showing an internal construction of the ECU in the third embodiment.

The catalyst device 27 in the third embodiment includes, as shown in FIG. 10, in addition to the construction described in the second embodiment, a temperature sensor 38 for outputting an electric signal corresponding to a bed temperature of the exhaust gas purifying catalyst 34.

The temperature sensor 38 is, as shown in FIG. 10, connected via an electric wire to the A/D converter 45 of the ECU 15. Then, an output signal of the temperature sensor 38 is, after being converted from an analog signal into a digital signal by the A/D converter 45, inputted to the input port 43 and subsequently to the CPU 40 and the RAM 42 etc.

Next, the CPU 40 of the ECU 15, as in the second embodiment discussed above, detects a pressure of the vacuum layer 36 and diagnoses the fault based on this pressure value on condition that the hydrogen is absorbed by the hydrogen absorbing alloy 37. However, the output signal value (the bed temperature of the exhaust gas purifying catalyst 34, which is hereinafter referred to as a catalyst bed temperature) of the temperature sensor 38, is used as a parameter for judging that the hydrogen is absorbed by the hydrogen absorbing alloy 37.

That is, the hydrogen absorbing alloy 37 is disposed in such a position as to be substantially equalized to the temperature of the exhaust gas purifying catalyst 34, and starts emitting the hydrogen when rising over a predetermined temperature T0. Hence, if the operation state of the internal combustion engine 1 is not in the high-rotation/high-load region and the catalyst bed temperature T is lower than the predetermined temperature T0, it can be inferred that the hydrogen is absorbed by the hydrogen absorbing alloy 37, and the predetermined temperature T0 is previously stored in the ROM 41 of the ECU 15.

Other constructions are the same as those in the second embodiment discussed above.

The operation and the effect in the embodiment 3 will be explained.

Figure 11:
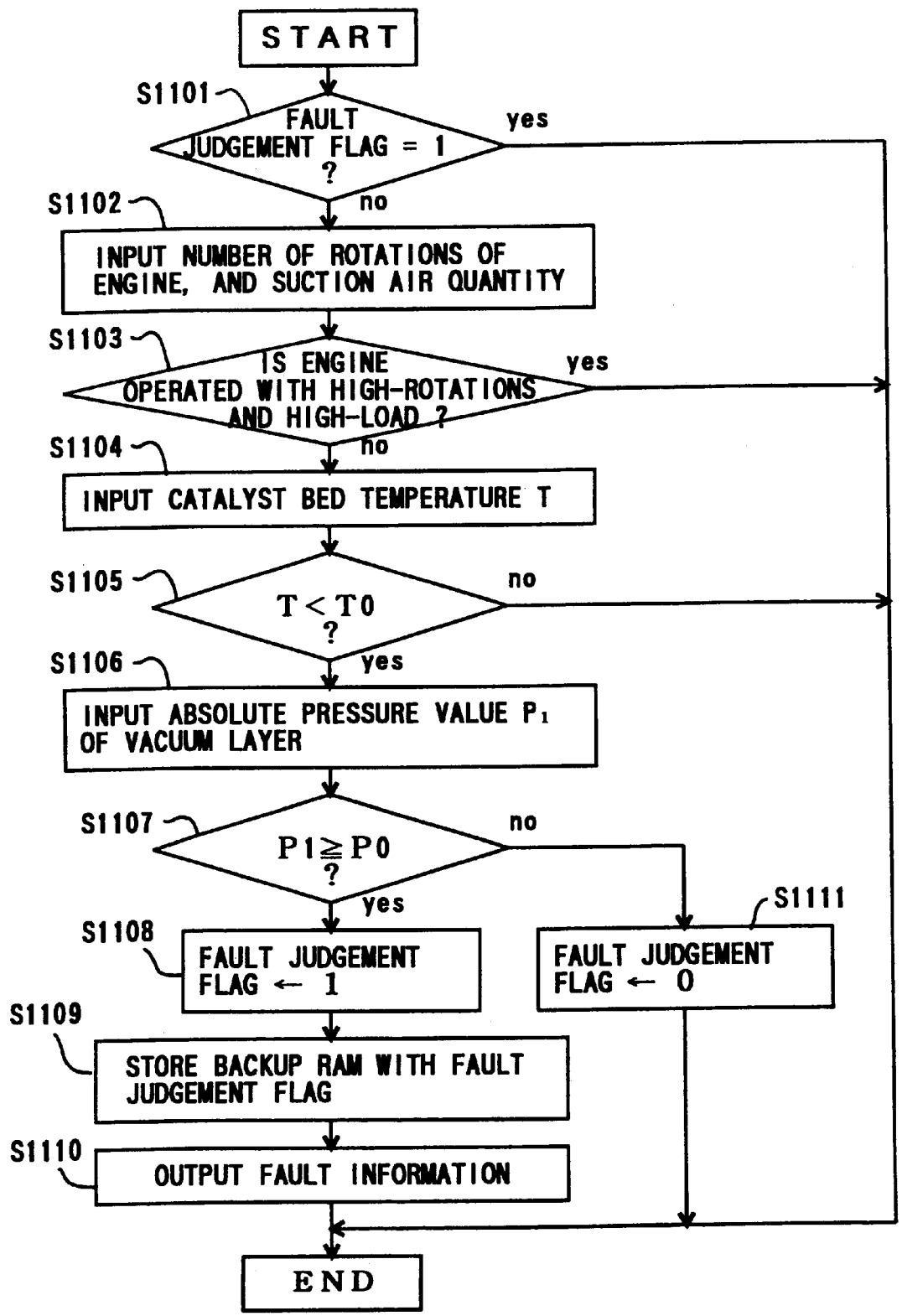
FIG. 11 is a flowchart showing a fault judgement control routine in the third embodiment.

The CPU 40 repeatedly executes a fault diagnostic control routine as shown in FIG. 11 at an interval of a predetermined time (e.g., each time the crank position sensor 13 outputs the signal) during the operation of the internal combustion engine 1.

In the fault diagnostic control routine, the CPU 40 accesses the fault judgement flag storage regions of the RAM 42 and of the backup RAM 46 in S1101, and judges whether "1" is stored therein or not.

The CPU 40, when judging in S1101 that "1" is stored in the fault judgement flag storage region of at least one of the RAM 42 and the backup RAM 46, infers that the catalyst device 27 has already been judged to be faulted, and finishes executing this fault diagnostic control routine.

While on the other hand, the CPU 40, when judging in S1101 that "0" is stored in the fault judgement flag storage regions of the RAM 42 and the backup RAM 46, advances to S1102, wherein the CPU 40 inputs the output signals of the crank position sensor 13 and of the air flow meter 22, and calculates the number of rotations of the engine from the output signal of the crank position sensor 13.

Subsequently, the CPU 40 goes forward to S1103, wherein the CPU 40 judges whether or not the number of rotations of the engine that is calculated in S1102 is over a predetermined number of rotations and whether or not a suction air quantity inputted in S1102 is over a predetermined quantity, i.e., whether or not the operation state of the internal combustion engine 1 is in the high-rotation/high-load region.

The CPU 40, when judging in S1103 that the operation state of the internal combustion engine 1 is in the high-rotation/high-load region, finishes executing the present routine.

The CPU 40, whereas if it is judged in S1103 that the operation state of the internal combustion engine 1 is not in the high-rotation/high-load region, advances to S1104, in which the CPU 40 inputs the output signal value (catalyst bed temperature) T of the temperature sensor 38. Subsequently, the CPU 40 advances to S1105, wherein the CPU 40 reads the predetermined temperature T0 stored in the ROM 41 and judges whether or not the catalyst bed temperature T inputted in S1104 is lower than the predetermined temperature T0, i.e., whether or not the temperature of the hydrogen absorbing alloy 37 falls within a temperature region in which to absorb the hydrogen.

The CPU 40, when judging S1105 that the catalyst bed temperature T is not lower than the predetermined temperature T0, finishes the execution of the present routine. The CPU 40, whereas if the catalyst bed temperature T is judged to be less than the predetermined temperature T0, goes forward to S1106.

In S1106, the CPU 40 inputs the output signal value P1 (an absolute pressure value P1 of the vacuum layer 36) of the pressure sensor 29. Then, the CPU 40 reads in S1107 the judgement value P0 stored in the ROM 41, and judges whether or not the signal value P1 is over the judgement value P0.

The CPU, when judging in S1107 that the signal value P1 is over the judgement value P0, infers that the degree of vacuum of the vacuum layer 36 decreases and that the catalyst device 27 is faulted, and advances to S1108.

In S1108, the CPU 40 writes "1" to the fault judgement flag storage region of the RAM 42. Subsequently, the CPU 40 moves forward to S1109 and writes "1" to the fault judgement flag storage region of the backup RAM 46.

Then, the CPU 40 advances to S1110 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up. The driver is thereby able to recognize the fault in the catalyst device 27.

The CPU 40, whereas if the signal value P1 is judged in S1107 to be less than the judgement value P0, infers that the vacuum layer 36 is in the vacuum state and that the catalyst device 27 is normal, and goes forward to S1111.

In S1111, the CPU 40 writes "0" to the fault judgement flag storage regions of the RAM 42 and of the backup RAM 46.

The CPU 40 having finished executing the processes in S1110 and S1111 finishes the execution of the present routine.

As explained above, according to the exhaust gas purifying apparatus in the embodiment 3 discussed above, in the catalyst device 27 including the hydrogen absorbing alloy 37, it is feasible to effect the precise fault-diagnosis in terms of the heat radiating function and the adiabatic function of the catalyst device 27 by specifying the timing when the hydrogen is absorbed by the hydrogen absorbing alloy 37, i.e., the timing when the vacuum layer 36 is brought into the vacuum state from the bed temperature of the exhaust gas purifying catalyst 34, and detecting the pressure of the vacuum layer 36 at the specified timing.

Note that in the embodiment 3 the bed temperature of the exhaust gas purifying catalyst 34 has been exemplified as a parameter for making the judgement about the hydrogen absorbing state, however, a temperature of the heat storage material 35 and a surface temperature of the flame tube 31 or a temperature of the hydrogen absorbing alloy 37 may also be used.

Embodiment 4

A fourth embodiment of the exhaust gas purifying apparatus according to the present invention will be described with reference to FIGS. 12–15. Herein, the explanation is concentrated upon a construction different from the one in the first embodiment discussed above, and the description of the like components is omitted.

Figure 12:
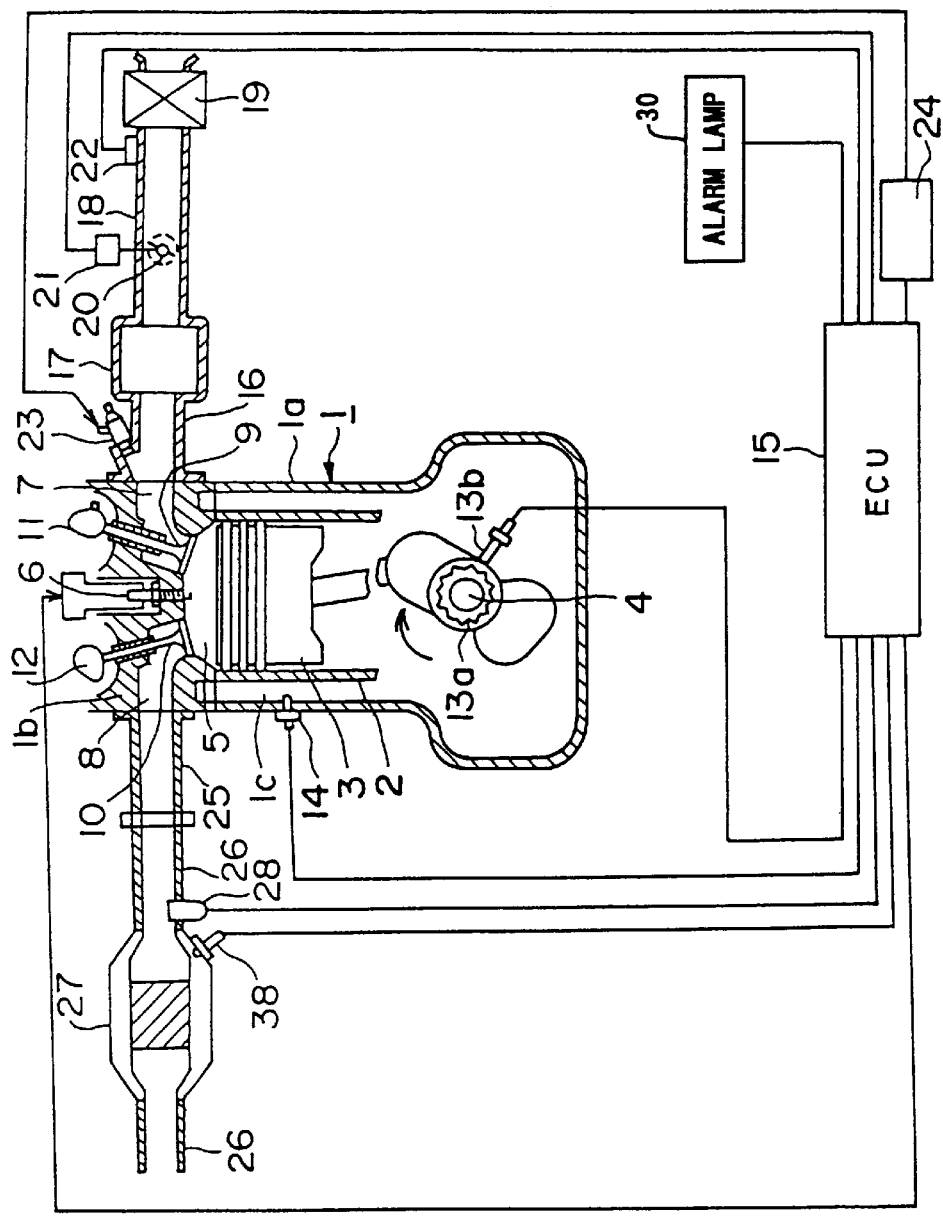
FIG. 12 is a view schematically illustrating a construction of the internal combustion engine to which the exhaust gas purifying apparatus in a fourth embodiment is applied.
Figure 13:
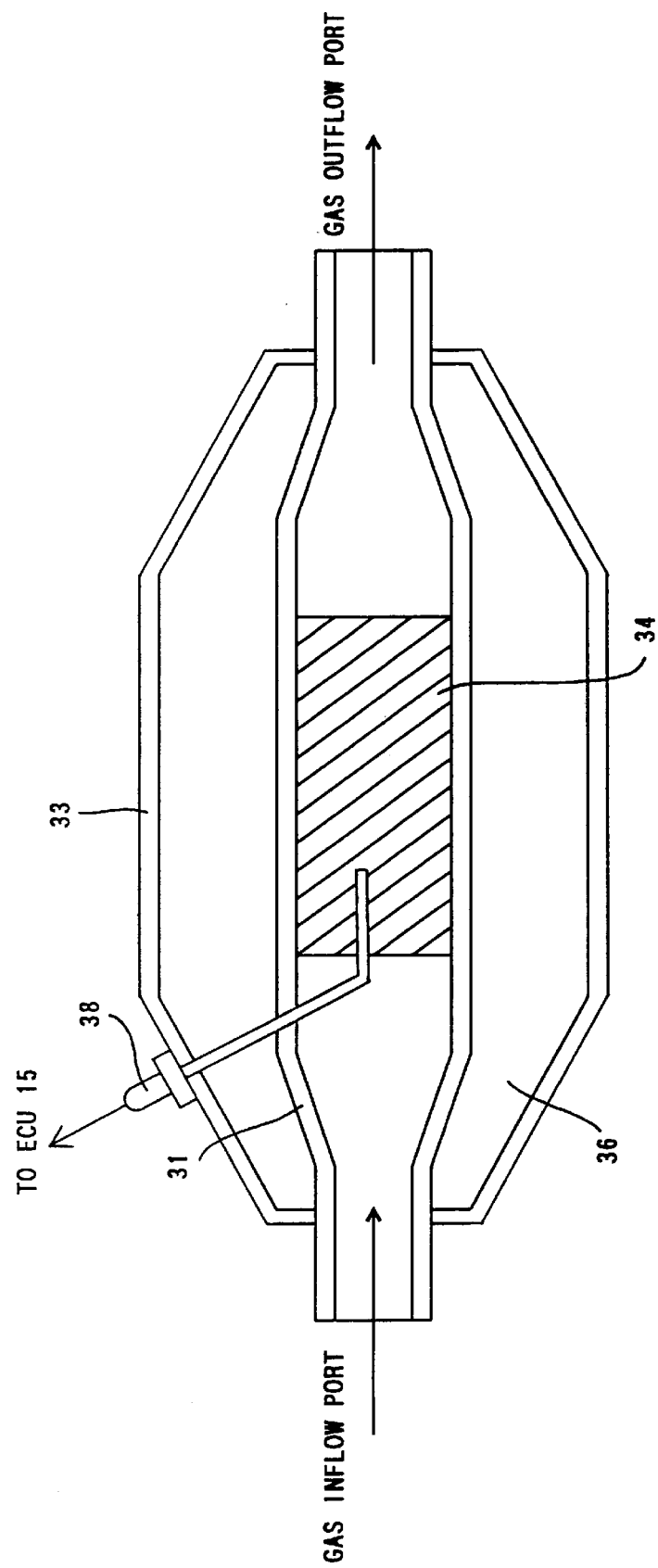
FIG. 13 is a vertical sectional view showing a construction of the catalyst device in the fourth embodiment.

The catalyst device 27 in the fourth embodiment is, as shown in FIGS. 12 and 13, constructed of a double-structured cylindrical body including the flame tube 31 and the outer casing 33, and the vacuum layer 36 serving as an adiabatic means according to the present invention is formed between the flame tube 31 and the outer casing 33.

Then, the outer casing 33 is fitted with the temperature sensor 38 for outputting an electric signal corresponding to a bed temperature of the exhaust gas purifying catalyst 34. This temperature sensor 38 actualizes a temperature detecting means according to the present invention.

Figure 14:
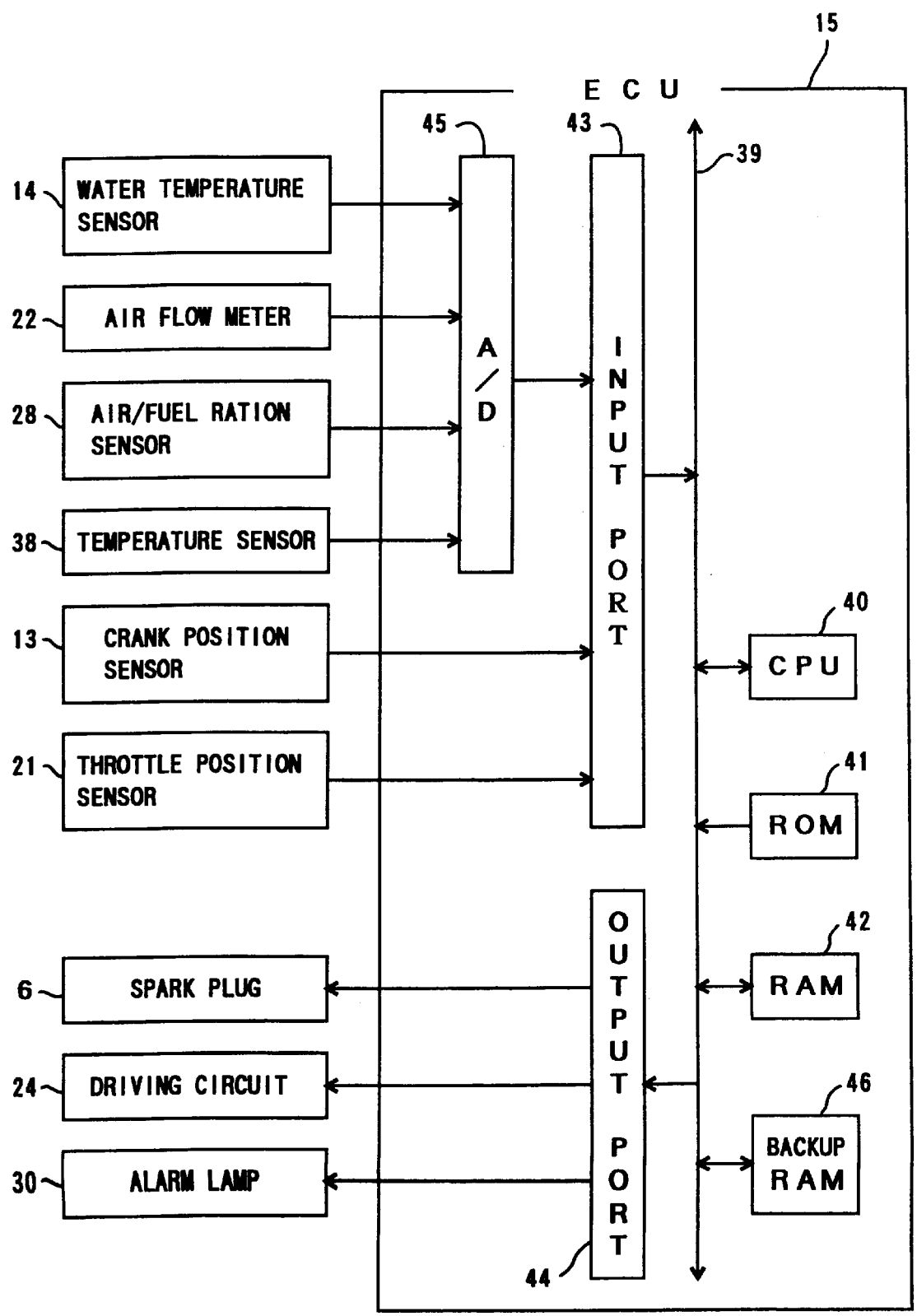
FIG. 14 is a diagram showing an internal construction of the ECU in the fourth embodiment.

Subsequently, the temperature sensor 38 is, as illustrated in FIG. 14, connected via the electric wire to the A/D converter 45, and the output signal of the temperature sensor 38 is, after being converted from the analog signal into the digital signal by the A/D converter 45, inputted to the input port 43 and then to the CPU 40 and the RAM 42 etc.

The CPU 40 of the ECU 15, after stopping the operation of the internal combustion engine 1, calculates a decrease rate (temperature decrease rate) of the bed temperature of the exhaust gas purifying catalyst 34 from the output signal of the temperature sensor 38, and diagnoses the fault in the catalyst device 27 on the basis of the thus calculated temperature decrease rate.

To be specific, the CPU 40 collects a plurality of output signal values of the temperature sensor 38 within a predetermined time tB after stopping the operation of the internal combustion engine 1. Subsequently, the CPU 40 calculates a temperature decrease rate X of the exhaust gas purifying catalyst 34 within the predetermined time tB by use of the plurality of output signal values collected.

Herein, if an abnormal state occurs in the vacuum layer 36 of the catalyst device 27, there declines a performance of cutting off the heat radiation from the exhaust gas purifying catalyst 34, and the temperature decrease rate of the exhaust gas purifying catalyst 34 becomes large. Hence, the temperature decrease rate of the exhaust gas purifying catalyst 34 becomes larger than at the normal time.

This being the case, a contrivance is that the ROM 41 is previously stored with a judgement value K determined based on the temperature decrease rate of the exhaust gas purifying catalyst 34 when in the normal state of the catalyst device 27 and on an initial tolerance etc of the temperature sensor 38, and that the CPU 40 judges, if the temperature decrease rate X is larger than the judgement value K, that the catalyst device 27 is faulted.

Thus, the ECU 15 actualizes a fault judging device according to the present invention.

Other constructions are the same as those in the first embodiment described above.

The operation and the effect in the embodiment 4 will be explained.

Figure 15:
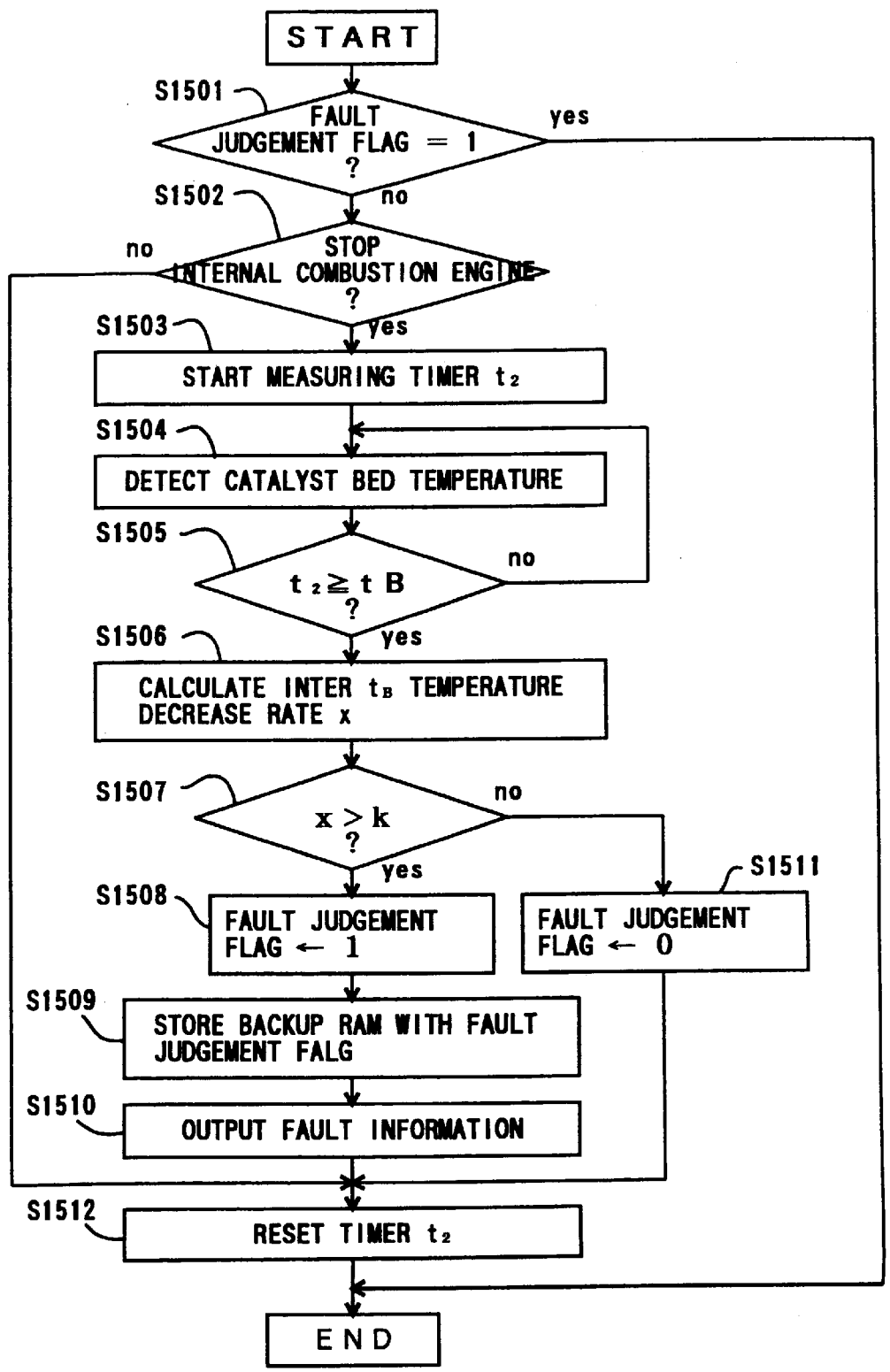
FIG. 15 is a flowchart showing a fault judgement control routine in the fourth embodiment.

The CPU 40 executes a fault diagnostic control routine as shown in FIG. 15, thereby diagnosing the fault in the catalyst device 27. Note that the above fault diagnostic control routine is repeatedly executed at an interval of a predetermined time during the operation of the internal combustion engine 1 and executed only once after the operation of the internal combustion engine 1 has been stopped.

In the fault diagnostic control routine, the CPU 40 accesses the fault judgement flag storage regions of the RAM 42 and of the backup RAM 46 in S1501, and judges whether "1" is stored therein or not.

The CPU 40, when judging in S1501 that "1" is stored in the fault judgement flag storage region of at least one of the RAM 42 and the backup RAM 46, infers that the catalyst device 27 has already been judged to be faulted, and finishes executing this fault diagnostic control routine.

While on the other hand, the CPU 40, when judging in S1501 that "0" is stored in the fault judgement flag storage regions of the RAM 42 and the backup RAM 46, advances to S1502, wherein the CPU 40 judges from an ON/OFF state of an unillustrated ignition switch whether or not the internal combustion engine 1 is in an operation stop state.

The CPU 40, when judging in S1502 that the internal combustion engine 1 is not in the operation stop state, diverts to S1512 and resets a measuring timer t2 which will be mentioned later on, thus finishing the execution of this routine.

While on the other hand, the CPU 40, when judging in S1502 that the internal combustion engine 1 is in the operation stop state, advances to S1503 and starts up the measuring timer t2. This measuring time t2 counts an elapse time since the operation of the internal combustion engine 1 has been stopped.

Then, the CPU 40, when advancing to S1504, inputs the output signal value (catalyst bed temperature) of the temperature sensor 38, and makes this output signal value stored in a predetermined region of the RAM 42.

Subsequently, the CPU 40 goes forward to S1505 and judges whether or not a count time t2 of the measuring timer t2 is over a predetermined time tB.

The CPU 40, when judging in S1505 that the count time t2 of the measuring timer t2 is less than the predetermined time tB, repeatedly executes the processes from S1504 onward till the count time of the measuring timer t2 becomes the predetermined time tB or more. The RAM 42 becomes thereby stored with a plurality of catalyst bed temperatures.

Then, the CPU 40, when judging in S1505 that the count time t2 of the measuring timer t2 is over the predetermined time tB, advances to S1506 and calculates the temperature decrease rate X of the exhaust gas purifying catalyst 34 within the predetermined time tB from the plurality of catalyst bed temperatures stored in the RAM 42.

Next, the CPU 40, upon advancing to S1507, reads the judgement K from the ROM 41 and judges whether or not the temperature decrease rate X calculated in S1506 is larger than the judgement value K.

The CPU 40, when judging that the temperature decrease rate X is larger than the judgement value K, infers that the adiabatic performance of the vacuum layer 36 decreases and that the catalyst device 27 becomes faulted, and advances to S1508.

In S1508, the CPU 40 writes "1" to the fault judgement flag storage region of the RAM 42. Subsequently, the CPU 40 moves forward to S1509 and writes "1" to the fault judgement flag storage region of the backup RAM 46.

Then, the CPU 40 advances to S1510 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up. The driver is thereby able to recognize the fault in the catalyst device 27.

The CPU 40, whereas if the temperature decrease rate X is judged in S1507 to be under the judgement value K, infers that the catalyst device 27 is normal, and goes forward to S1510.

In S1510, the CPU 40 writes "0" to the fault judgement flag storage regions of the RAM 42 and of the backup RAM 46.

The CPU 40 having finished executing the processes in S1509 and S1510 resets the measuring timer t2 in S1512 and thereafter finishes the execution of the present routine.

As explained above, according to the exhaust gas purifying apparatus in the embodiment 4 discussed above, it is feasible to diagnose the catalyst device 27 about the fault in the adiabatic function thereof on the basis of the temperature decrease rate of the exhaust gas purifying catalyst 34 after stopping the operation of the internal combustion engine 1. Then, when judging that the adiabatic function of the catalyst device 27 falls into the fault, the driver is made to recognize the fault in the catalyst device 27 by lighting up the alarm lamp 30, and is prompted to repair and replace the catalyst device 27.

Note that the vacuum layer 36 has been exemplified as an means for cutting off the heat radiation from the exhaust gas purifying catalyst 34 in the embodiment 4, however, whatever means may also be adopted on condition that it exhibits the adiabatic property.

Further, the catalyst device 27 including the vacuum layer 36 has been exemplified in the embodiment 4, however, a catalyst device having the heat storage material as a substitute for the vacuum layer may also be adopted. In this type of catalyst device, it is feasible to make a judgement about the fault in the heat storage material on the basis of the temperature decrease rate of the exhaust gas purifying catalyst.

Embodiment 5

A fifth embodiment of the exhaust gas purifying apparatus according to the present invention will be described with reference to FIGS. 16–20. Herein, the explanation is concentrated upon a construction different from the one in the fourth embodiment discussed above, and the description of the like components is omitted.

Figure 16:
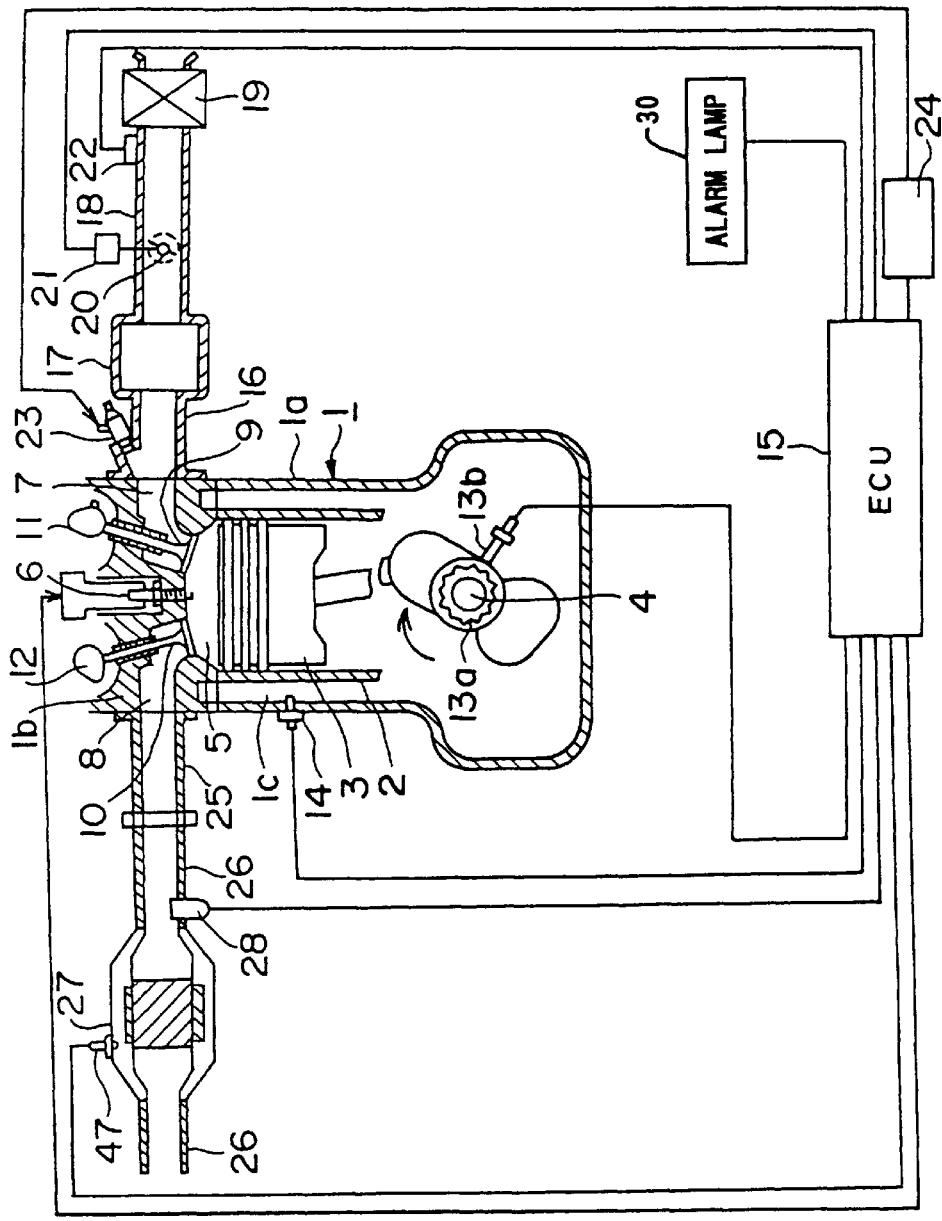
FIG. 16 is a view schematically illustrating a construction of the internal combustion engine to which the exhaust gas purifying apparatus in a fifth embodiment is applied.
Figure 17:
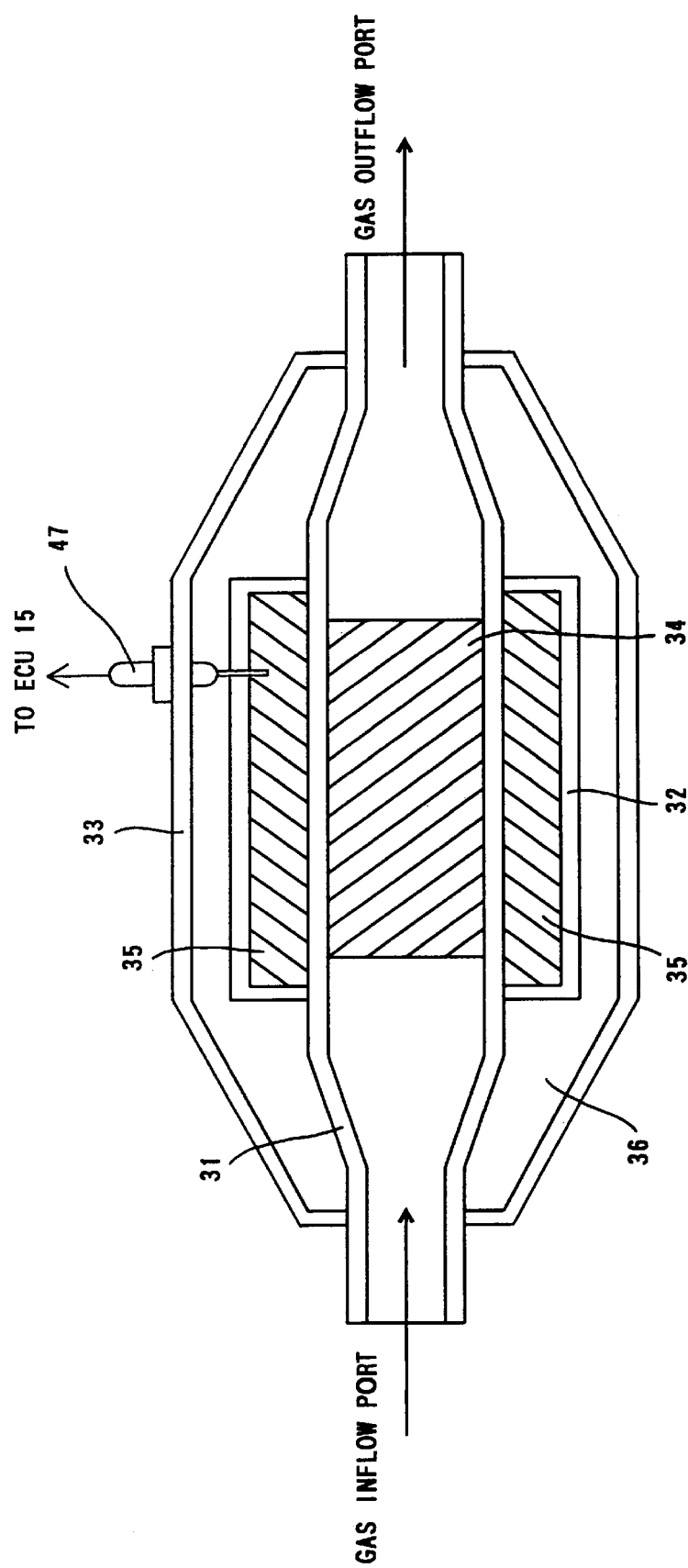
FIG. 17 is a vertical sectional view showing a construction of the catalyst device in the fifth embodiment.

The catalyst device 27 in the fifth embodiment is, as shown in FIGS. 16 and 17, constructed of a triple-structured cylindrical body including the flame tube 31, the intermediate tube 32 and the outer casing 33, and the vacuum layer 36 is formed between the flame tube 31 and the outer casing 33. Then, a space between the flame tube 31 and the intermediate tube 32 is filled with the heat storage material 35 composed of a change-of-phase substance assuming a change-of-phase state in a predetermined temperature region. The heat storage material 35 actualizes a heat storage member according to the present invention.

Then, the outer casing 33 is fitted with a temperature sensor 47 for outputting an electric signal corresponding to a temperature of the heat storage material 35. This temperature sensor 47 actualizes a third temperature detecting means according to the present invention.

Figure 18:
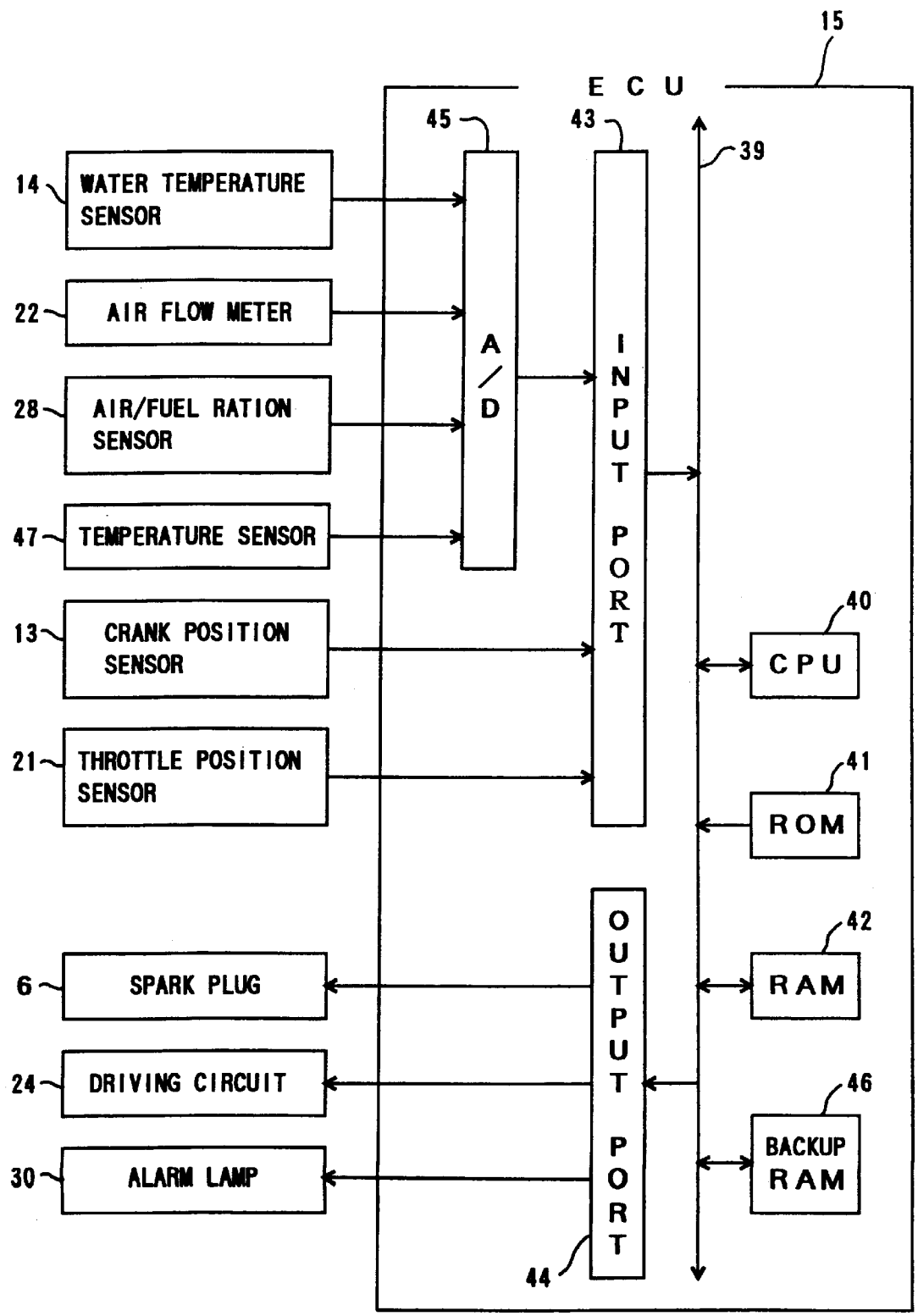
FIG. 18 is a diagram showing an internal construction of the ECU in the fifth embodiment.

Subsequently, the temperature sensor 47 is, as illustrated in FIG. 18, connected via the electric wire to the A/D converter 45 of the ECU 15, and the output signal of the temperature sensor 47 is, after being converted from the analog signal into the digital signal by the A/D converter 45, inputted to the input port 43 and next to the CPU 40 and the RAM 42 etc.

Then, the CPU 40 of the ECU 15, after stopping the operation of the internal combustion engine 1, calculates a temperature decrease rate of the heat storage material 35 within a predetermined time from the output signal of the temperature sensor 47, and diagnoses fault in the catalyst device 27 on the basis of the thus calculated temperature decrease rate.

To be specific, the CPU 40 continues to input the output signal values of the temperature sensor 47 within a predetermined time tD after stopping the operation of the internal combustion engine 1. Then, the CPU 40 calculates the temperature decrease rate of the heat storage material 35 within the predetermined time tD by use of the output signal values inputted within the predetermined time tD.

Herein, if an abnormal state occurs in the vacuum layer 36 and the heat storage material 35 of the catalyst device 27, there decline a performance of cutting off the heat radiation from the exhaust gas purifying catalyst 34 and a performance of transmitting the heat to the exhaust gas purifying catalyst 34, and the temperature decrease rate of the exhaust gas purifying catalyst 34 becomes larger than at the normal time. Corresponding thereto, the temperature decrease rate of the heat storage material 35 also increases.

Hence, the ROM 41 is previously stored with the judgement value K determined based on the temperature decrease rate of the heat storage material 35 when in the normal state of the catalyst device 27 and on the initial tolerance etc of the temperature sensor 47, and the CPU 40 may judge, if the temperature decrease rate of the heat storage material 35 is larger than the judgement value K, that the catalyst device 27 is faulted.

Incidentally, the heat storage material 35 has a large thermal capacity and is slower in terms of a temperature rising velocity than the exhaust gas purifying catalyst 34, and therefore it takes a relatively long time till the temperature thereof becomes substantially equal to the temperature of the exhaust gas purifying catalyst 34. This being the case, the heat storage material 35 might continue to rise in temperature even after stopping the operation of the internal combustion engine 1, and, if the temperature of the heat storage material 35 is detected in such a state, a misjudgment might probably be made.

Furthermore, the heat storage material 35, when in a predetermined temperature region (hereinafter referred to as a change-of-phase temperature region), assumes a change-of-phase state, and the temperature of this heat storage material 35 becomes substantially fixed. Hence, the misjudgment might probably be caused if the temperature of the heat storage material 35 is detected in such a state.

Under such circumstances, a contrivance in the fifth embodiment is that the temperature of the heat storage material 35 is detected when a predetermined time tC elapses since the operation of the internal combustion engine 1 has been stopped and when the temperature of the heat storage material 35 is not in the change-of-phase temperature region (before or after a change of phase of the heat storage material 35).

Other constructions are the same as those in the fourth embodiment described above.

The operation and the effect in the embodiment 5 will be explained.

Figure 19B:
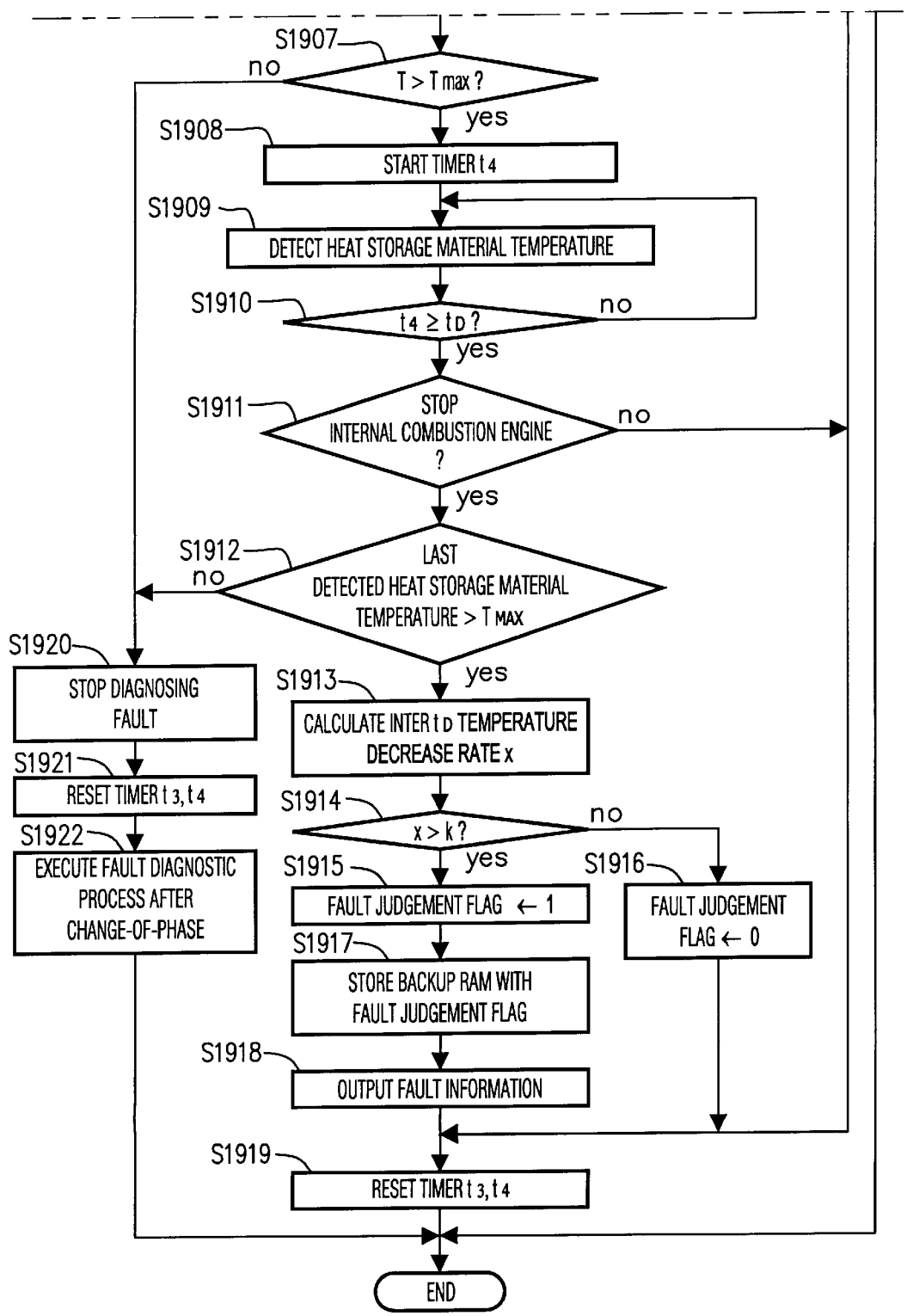
FIG. 19 is a flowchart (part 1) showing a fault judgement control routine in the fifth embodiment.

The CPU 40 executes a fault diagnostic control routine as shown in FIG. 19, thereby diagnosing the fault in the catalyst device 27. Note that the above fault diagnostic control routine is repeatedly executed at an interval of a predetermined time during the operation of the internal combustion engine 1 and executed only once after the operation of the internal combustion engine 1 has been stopped.

In the fault diagnostic control routine, the CPU 40 accesses the fault judgement flag storage regions of the RAM 42 and of the backup RAM 46 in S1901, and judges whether "1" is stored therein or not.

The CPU 40, when judging in S1901 that "1" is stored in the fault judgement flag storage region of at least one of the RAM 42 and the backup RAM 46, infers that the catalyst device 27 has already been judged to be faulted, and finishes executing this fault diagnostic control routine.

While on the other hand, the CPU 40, when judging in S1901 that "0" is stored in the fault judgement flag storage regions of the RAM 42 and the backup RAM 46, advances to S1902, wherein the CPU 40 judges from an ON/OFF state of the ignition switch whether or not the internal combustion engine 1 is in an operation stop state.

The CPU 40, when judging in S1902 that the internal combustion engine 1 is not in the operation stop state, diverts to S1919 and resets measuring timers t3, t4 which will be mentioned later on, thus finishing the execution of this routine.

While on the other hand, the CPU 40, when judging in S1902 that the internal combustion engine 1 is in the operation stop state, advances to S1903 and starts up the measuring timer t3. This measuring time t3 counts an elapse time since the operation of the internal combustion engine 1 has been stopped.

Then, the CPU 40 advances to S1904 and judges whether or not the count time t3 of the measuring timer t3 is over the predetermined time tC.

The CPU 40, when judging in S1904 that the count time t3 of the measuring timer t3 is less than the predetermined time tC, repeatedly executes the process in S1905 till the count time t3 of the measuring timer t3 becomes the predetermined time tC or greater.

Then, the CPU 40, when judging in S1904 that the count time t3 of the measuring timer t3 is over the predetermined time tC, advances to S1905 and judges whether or not the operation stop state of the internal combustion engine 1 continues.

The CPU 40, when judging in S1905 that the operation stop state of the internal combustion engine 1 does not continue, diverts to S1919 and resets the measuring timer t3, thus finishing the execution of this routine.

While on the other hand, the CPU 40, when judging in S1905 that the operation stop state of the internal combustion engine 1 continues, advances to S1906 and inputs the output signal value (temperature of the heat storage material 35) of the temperature sensor 47.

Subsequently, the CPU 40 goes forward to S1907, in which the CPU 40 reads from the RAM 42 an upper limit value Tmax in the change-of-phase temperature region of the heat storage material 35, and judges whether or not the output signal value T inputted in S1906 is larger than Tmax, i.e., whether or not the temperature of the heat storage material 35 is higher than the change-of-phase temperature region.

The CPU 40, when judging in S1907 that the output signal value T is larger than Tmax, infers that the heat storage material 35 is in a state before the change of phase, and advances to S1908.

In S1908, the CPU 40 starts up the measuring timer t4. This measuring timer t4 counts an elapse time since a point of time of detecting the temperature of the heat storage material 35.

Then, the CPU 40 goes forward to S1909, wherein the CPU 40 inputs the output signal value of the temperature sensor 47 and writes this value to a predetermined region of the RAM 42.

Subsequently, the CPU 40 advances to S1910 and judges whether or not a count time t4 of the measuring timer t4 is over the predetermined time tD.

The CPU 40, when judging in S1910 that the count time t4 of the measuring timer t4 is less than the predetermined time tD, repeatedly executes the processes from S1909 onward till the count time t4 of the measuring timer t4 becomes over the predetermined time tD. The RAM 42 is thereby stored with a plurality of temperatures of the heat storage material.

Then, the CPU 40, when judging in S1910 that the count time t4 of the measuring timer t4 is over the predetermined time tD, advances to S1911 and judges whether or not the operation stop state of the internal combustion engine 1 continues.

The CPU, when judging in S1911 that the operation stop state of the internal combustion engine 1 does not continue, diverts to S1919 and resets the measuring timers t3, t4, thus finishing the execution of the present routine.

While on the other hand, the CPU, when judging in S1911 that the operation stop state of the internal combustion engine 1 continues, moves to S1912 and judges whether or not the heat storage material temperature detected last time within the predetermined time tD is larger than the upper limit value Tmax.

The CPU 40, when judging in S1912 that the heat storage material temperature detected last time within the predetermined time tD is larger than the upper limit value Tmax, infers that the heat storage material 35 is in a state before the change of phase, and advances to S1913.

In S1913, the CPU 40 calculates the temperature decrease rate X of the heat storage material 35 within the predetermined time tD from the plurality of heat storage material temperatures stored in the RAM 42.

Subsequently, the CPU 40 goes forward to S1914, in which the CPU 40 reads the judgement value K from the RAM 42 and judges whether or not the temperature decrease rate X calculated in S1913 is larger than the judgement value K.

The CPU, when judging in S1914 that the temperature decrease rate X is larger than the judgement value X, infers that an abnormal state occurs in the vacuum layer 36 or in the heat storage material 35 and that the catalyst device 27 is faulted, and advances to S1915.

In S1915, the CPU 40 writes "1" to the fault judgement flag storage region of the RAM 42. Subsequently, in S1916, the CPU 40 writes "1" to the fault judgement flag storage region of the backup RAM 46.

Then, the CPU 40 advances to S1917 and outputs the control signal in order to light up the alarm lamp 30. Then, the CPU 40 finishes executing the present routine. The control signal is transmitted via the output port 44 to the alarm lamp 30, with the result that the alarm lamp 30 is lit up. The driver is thereby able to recognize the fault in the catalyst device 27.

The CPU 40, whereas if the temperature decrease rate X is judged in S1914 to be under the judgement value K, infers that the catalyst device 27 is normal, and goes forward to S1918.

In S1918, the CPU 40 writes "0" to the fault judgement flag storage regions of the RAM 42 and of the backup RAM 46.

The CPU 40 having finished executing the process in S1917 or S1918 resets the measuring timers t3, t4 in S1919 and thereafter finishes the execution of the present routine.

It is to be noted that the CPU 40, when judging in S1912 that the heat storage material temperature detected last time is under the upper limit value Tmax in the change-of-phase temperature region, infers that the heat storage material 35 is in the change-of-phase state, and advances to S1920.

In S1920, the CPU 40 discontinues the fault diagnostic process and subsequently resets in S1921 the measuring timers t3, t4. Then, the CPU 40 moves to S1922 and executes the fault diagnostic process after the change of phase.

The fault diagnostic process after the change of phase is actualized by the CPU 40 executing a fault diagnostic control routine as shown in FIG. 20.

In the fault diagnostic control routine, the CPU 40 accesses the fault judgement flag storage regions of the RAM 42 and of the backup RAM 46 in S2001, and judges whether "1" is stored therein or not.

The CPU 40, when judging in S2001 that "1" is stored in the fault judgement flag storage region of at least one of the RAM 42 and the backup RAM 46, infers that the catalyst device 27 has already been judged to be faulted, and finishes executing the fault diagnostic control routine.

While on the other hand, the CPU 40, when judging in S2001 that "0" is stored in the fault judgement flag storage regions of the RAM 42 and the backup RAM 46, advances to S2002, and judges whether or not the internal combustion engine 1 is in the operations top state.

The CPU 40, when judging in S2002 that the internal combustion engine 1 is not in the operation stop state, diverts to S2015 and resets a measuring timer t5 which will be explained later on, thus finishing the execution of this routine.

By contrast, the CPU 40, when judging in S2002 that the internal combustion engine 1 is in the operation stop state, advances to S2003, and inputs the output signal value T (temperature of the heat storage material 35) of the temperature sensor 47.

Subsequently, the CPU 40 goes forward to S2004, in which the CPU 40 reads from the RAM 42 a lower limit value Tmin in the change-of-phase temperature region of the heat storage material 35, and judges whether or not the output signal value T inputted in S2003 is less than Tmin, i.e., whether or not the temperature of the heat storage material 35 is lower than the change-of-phase temperature region.

The CPU 40, when judging in S2004 that the output signal value T is less than Tmin, infers that the heat storage material 35 is in a state after the change of phase, and advances to S2005.

In S2005, the CPU 40 starts up the measuring timer t5. This measuring timer t5 counts an elapse time since a point of time of detecting the temperature of the heat storage material 35.

Then, the CPU 40 goes forward to S2006, wherein the CPU 40 inputs the output signal value of the temperature sensor 47 and writes this output signal value to a predetermined region of the RAM 42.

Subsequently, the CPU 40 advances to S2007 and judges whether or not a count time t5 of the measuring timer t5 is over a predetermined time tE.

The CPU 40, when judging in S2007 that the count time t5 of the measuring timer t5 is less than the predetermined time tE, repeatedly executes the processes from S2006 onward till the count time t5 of the measuring timer t5 becomes over the predetermined time tE. The RAM 42 is thereby stored with a plurality of temperatures of the heat storage material.

Then, the CPU 40, when judging in S2007 that the count time t5 of the measuring timer t5 is over the predetermined time tE, advances to S2008 and judges whether or not the operation stop state of the internal combustion engine 1 continues.

The CPU, when judging in S2008 that the operation stop state of the internal combustion engine 1 does not continue, diverts to S2015 and resets the measuring timer t5, thus finishing the execution of the present routine.

While on the other hand, the CPU, when judging in S2008 that the operation stop state of the internal combustion engine 1 continues, moves to S2009 and calculates the temperature decrease rate X of the heat storage material 35 within the predetermined time tD from the plurality of heat storage material temperatures written to the RAM 42 within the predetermined time tE.

Then, the CPU 40 goes forward to S2010, in which the CPU 40 reads the judgement value K from the RAM 42 and judges whether or not the temperature decrease rate X calculated in S2009 is larger than the judgement value K.

The CPU, when judging in S2010 that the temperature decrease rate X is larger than the judgement value X, infers that an abnormal state occurs in the vacuum layer 36 or in the heat storage material 35 and that the catalyst device 27 is faulted, and advances to S2011.

In S2011, the CPU 40 writes "1" to the fault judgement flag storage region of the RAM 42, and subsequently writes in S2012 "1" to the fault judgement flag storage region of the backup RAM 46.

Then, the CPU 40 advances to S2013 and outputs the control signal in order to light up the alarm lamp 30, and finishes executing the present routine. The control signal is transmitted via the output port 44 to the alarm lamp 30, with the result that the alarm lamp 30 is lit up. The driver is thereby able to recognize the fault in the catalyst device 27.

The CPU 40, whereas if the temperature decrease rate X is judged in S2010 to be under the judgement value K, infers that the catalyst device 27 is normal, and advances to S2014.

In S2014, the CPU 40 writes "0" to the fault judgement flag storage regions of the RAM 42 and of the backup RAM 46.

Then, the CPU 40 having finished executing the process in S2013 or S2014 resets the measuring timer t5 in S2015 and thereafter finishes the execution of the present routine.

As discussed above, according to the exhaust gas purifying apparatus in the embodiment 5, in the catalyst device 27 including the heat storage material 35 composed of the change-of-phase substance, it is feasible to diagnose the catalyst device 27 about the fault in terms of the heat storage function and in the adiabatic function thereof on the basis of the temperature decrease rate before or after the change of phase of the heat storage material 35. Then, if the catalyst device 27 is judged to be faulted in terms of its adiabatic function, it is possible to let the driver recognize the fault in the catalyst device 27 by lighting up the alarm lamp 30 and prompt the driver to repair or replace the catalyst device.

It is to be noted that the embodiment 5 has exemplified the case where the present invention is applied to the catalyst device 27 including the vacuum layer 36 but may also be applied to a catalyst device including no vacuum layer and, in short, applicable to catalyst devices having any sort of structures on condition that these catalyst devices each include the heat storage material.

Further, the embodiment 5 has also exemplified the catalyst device 27 including the heat storage material 35 composed of the change-of-phase substance. In the case of the catalyst device having a heat storage material composed of a substance excluding the change-of-phase substance, in the exhaust gas purifying apparatus in the fourth embodiment discussed above, the fault can be diagnosed by using a temperature of the heat storage material as a substitute for the catalyst bed temperature.

Embodiment 6

A sixth embodiment of the exhaust gas purifying apparatus according to the present invention will be described with reference to FIGS. 21 and 22. Herein, the explanation is concentrated upon a construction different from the one in the fifth embodiment discussed above, and the description of the like components is omitted.

The fifth embodiment described above has dealt with the example of diagnosing the fault in the catalyst device on the basis of the temperature decrease rate of the heat storage material 35. The sixth embodiment will, however, exemplify a fault-diagnosis in the catalyst device 27 on the basis of a period of time for which the heat storage material 35 remains in the change-of-phase state (which will hereinafter be termed a change-of-phase time).

A temperature region where the heat storage material 35 assumes the change-of-phase state, is different depending on a material of which the heat storage material 35 is composed (which is called a change-of-phase substance). Temperature regions where the individual change-of-phase substances become the change-of-phase state are, however, substantially fixed. Further, the change-of-phase time of each individual change-of-phase substance is, as shown in FIG. 21, substantially fixed when the catalyst device 27 is normal and, if the catalyst device 27 is faulted, shorter than in the normal state.

This being the case, in accordance with the embodiment 6, the ROM 41 is stored with the upper limit value Tmax and the lower limit value Tmin in the temperature region where the change-of-phase substance constituting the heat storage material 35 assumes the change-of-phase state. The ROM 41 is stored also with a judgement value u0 determined based on the change-of-phase time of the change-of-phase substance and on the initial tolerance etc of the temperature sensor 47.

Then, the CPU 40 monitors the output signal value (temperature of the heat storage material 35) of the temperature sensor 47 after the end of the operation of the internal combustion engine 1, and counts a time, a so-called change-of-phase time till the heat storage material 35 decreases down to a temperature less than the lower limit value Tmin since a point of time when the heat storage material 35 decreases down to a temperature equal to the upper limit value Tmax.

Subsequently, the CPU 40, if the change-of-phase time is less than the judgement value u0, judges that the catalyst device 27 is faulted, and, if the change-of-phase time is over the judgement value u0, judges that the catalyst device 27 is normal.

Thus, the ECU 15 actualizes a fault judging means according to the present invention.

Other constructions are the same as those in the fifth embodiment described above.

The operation and the effect in the embodiment 6 will be explained.

Figure 22:
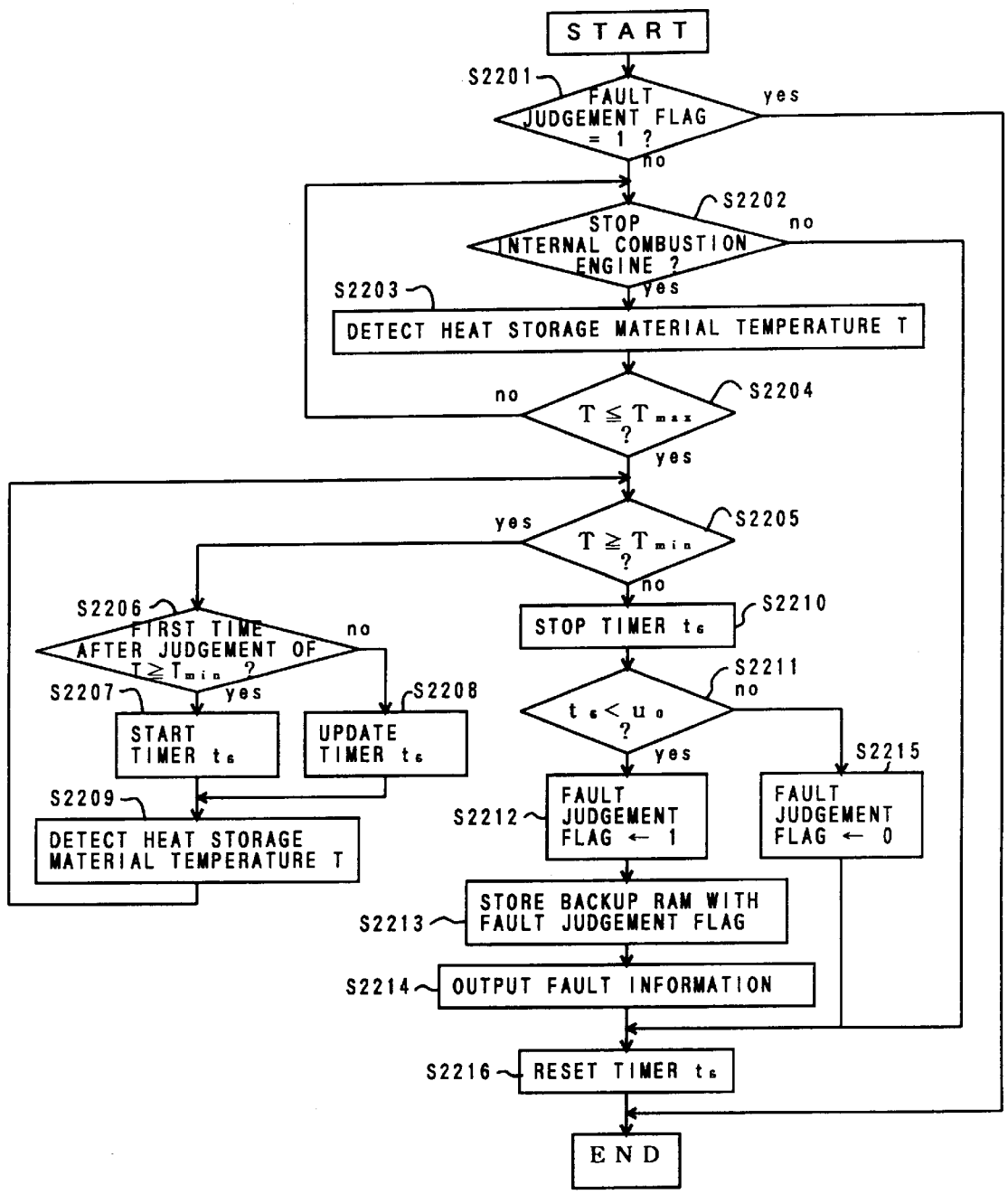
FIG. 22 is a flowchart showing a fault judgement control routine in a sixth embodiment.

The CPU 40 executes a fault diagnostic control routine as shown in FIG. 22, thereby diagnosing the fault in the catalyst device 27. Note that the above fault diagnostic control routine is repeatedly executed at an interval of a predetermined time during the operation of the internal combustion engine 1 and executed only once after the operation of the internal combustion engine 1 has been stopped.

In the fault diagnostic control routine, the CPU 40 accesses the fault judgement flag storage regions of the RAM 42 and of the backup RAM 46 in S2201, and judges whether "1" is stored therein or not.

The CPU 40, when judging in S2201 that "1" is stored in the fault judgement flag storage region of at least one of the RAM 42 and the backup RAM 46, infers that the catalyst device 27 has already been judged to be faulted, and finishes executing this fault diagnostic control routine.

While on the other hand, the CPU 40, when judging in S2201 that "0" is stored in the fault judgement flag storage regions of the RAM 42 and the backup RAM 46, advances to S2202, wherein the CPU 40 judges whether or not the internal combustion engine 1 is in the operation stop state.

The CPU 40, when judging in S2202 that the internal combustion engine 1 is in the operation state, diverts to S2215 and resets a measuring timer t6 which will be mentioned later on, thus finishing the execution of this routine.

While on the other hand, the CPU 40, when judging in S2202 that the internal combustion engine 1 is in the operation stop state, advances to S2203 and inputs the output signal value (temperature of the heat storage material 35) T of the temperature sensor 47.

Subsequently, the CPU 40 goes forward to S2204, in which the CPU 40 reads the upper limit value Tmax stored in the ROM 41, and judges whether or not the heat storage material temperature T inputted in S2203 is under the upper limit value Tmax.

The CPU 40, when judging in S2204 that the heat storage material temperature T is larger than the upper limit value Tmax, repeatedly executes the processes from S2202 onward till the heat storage material temperature T decreases under the upper limit value Tmax.

Then, the CPU 40, when judging in S2204 that the heat storage material temperature T is under the upper limit value Tmax, advances to S2205, in which the CPU 40 reads the lower limit value Tmin stored in the ROM 41 and judges whether or not the heat storage material temperature T is over the lower limit value Tmin.

The CPU 40, when judging in S2205 that the heat storage material temperature T is over the lower limit value Tmin, infers that the heat storage material 35 is in the change-of-phase state, and advances to S2206.

In S2206, the CPU 40 judges whether or not the number of executions of the process in S2206 is the first time, i.e., whether or not the process in S2206 is executed for the first time. Then, the CPU 40, if the number of the executions of the process in S2206 is the first time, advances to S2207 and starts up the measuring timer t6. The CPU 40, if the number of executions of the process in S2206 is the second time or thereafter, advances to S2208 and updates a value of the measuring timer t6.

Herein, the measuring timer t6 counts an elapse time since a point of time when the change of phase of the heat storage material 35 begins (when the heat storage material 35 decreases down to a temperature equal to the upper limit value Tmax).

The CPU 40 having finished executing the process in S2207 or S2208 advances to S2209, wherein the CPU inputs the output signal value (heat storage material temperature) of the temperature sensor 47 and subsequently re-executes the process from S2205 onward. On this occasion, the CPU 40, when judging in S2205 that the heat storage material temperature T inputted in S2209 is less than the lower limit value Tmin, infers that the change of phase of the heat storage material 35 is ended, and halts the measuring timer t6 in S2210.

Subsequently, the CPU 40 goes forward to S2211, in which the CPU 40 reads the judgement value u0 stored in the ROM 41, and judges whether or not a count time t6 of the measuring timer t6 is less than the judgement value u0.

The CPU 40, when judging in S2211 that the count time t6 is less than the judgement value u0, infers that an abnormal state occurs in the vacuum layer 36 or the heat storage material 35 and that the catalyst device 27 is faulted, and advances to S2212.

In S2212, the CPU 40 writes "1" to the fault judgement flag storage region of the RAM 42, and subsequently writes in S2213 "1" to the fault judgement flag storage region of the backup RAM 46.

Then, the CPU 40 advances to S2214 and outputs the control signal in order to light up the alarm lamp 30, and finishes executing the present routine. The control signal is transmitted via the output port 44 to the alarm lamp 30, with the result that the alarm lamp 30 is lit up. The driver is thereby able to recognize the fault in the catalyst device 27.

The CPU 40, whereas if the count time t6 is judged in S2211 to be over the judgement value u0, infers that the catalyst device 27 is normal, and advances to S2215.

In S2215, the CPU 40 writes "0" to the fault judgement flag storage regions of the RAM 42 and of the backup RAM 46.

The CPU 40 having finished executing the process in S2217 or S2218 resets the measuring timer t6 in S2222 and finishes the execution of the present routine.

As discussed above, according to the exhaust gas purifying apparatus in the embodiment 6, in the catalyst device 27 including the heat storage material 35 composed of the change-of-phase substance, it is feasible to diagnose the catalyst device 27 with respect to the fault in terms of the heat storage function and in the adiabatic function thereof by measuring the change-of-phase time of the heat storage material 35 after stopping the operation of the internal combustion engine 1. Then, if the catalyst device 27 is judged to be faulted in terms of its adiabatic function, it is possible to let the driver recognize the fault in the catalyst device 27 by lighting up the alarm lamp 30 and prompt the driver to repair or replace the catalyst device.

It is to be noted that the embodiment 6 has exemplified the case where the present invention is applied to the catalyst device 27 including the vacuum layer 36 but may also be applied to a catalyst device including no vacuum layer and, in short, applicable to catalyst devices having any sort of structures on condition that these catalyst devices each include the heat storage material.

Embodiment 7

A seventh embodiment of the exhaust gas purifying apparatus according to the present invention will be described with reference to FIGS. 23–26. Herein, the explanation is concentrated upon a construction different from the one in the first embodiment discussed above, and the description of the like components is omitted.

Figure 23:
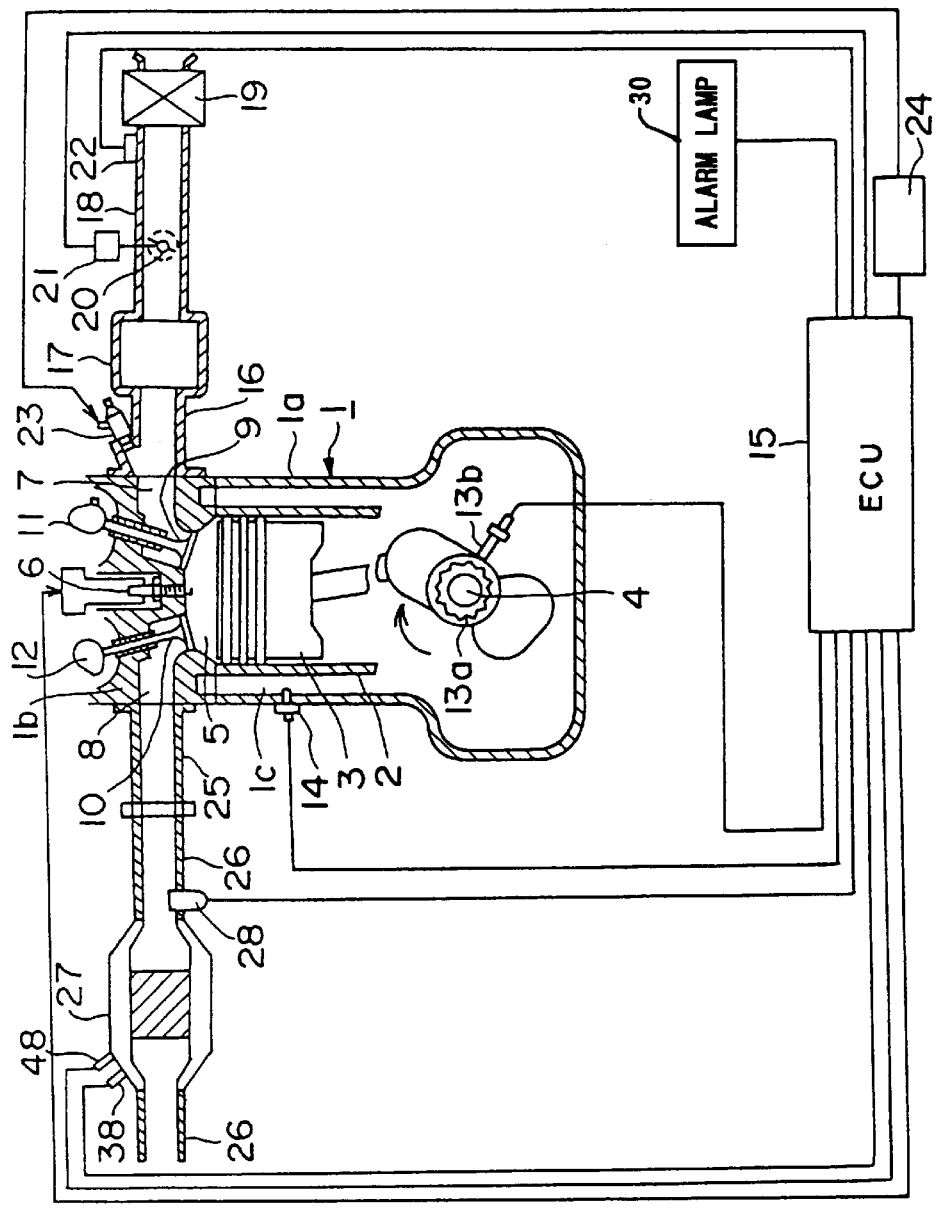
FIG. 23 is a view schematically illustrating a construction of the internal combustion engine to which the exhaust gas purifying apparatus in a seventh embodiment is applied.
Figure 24:
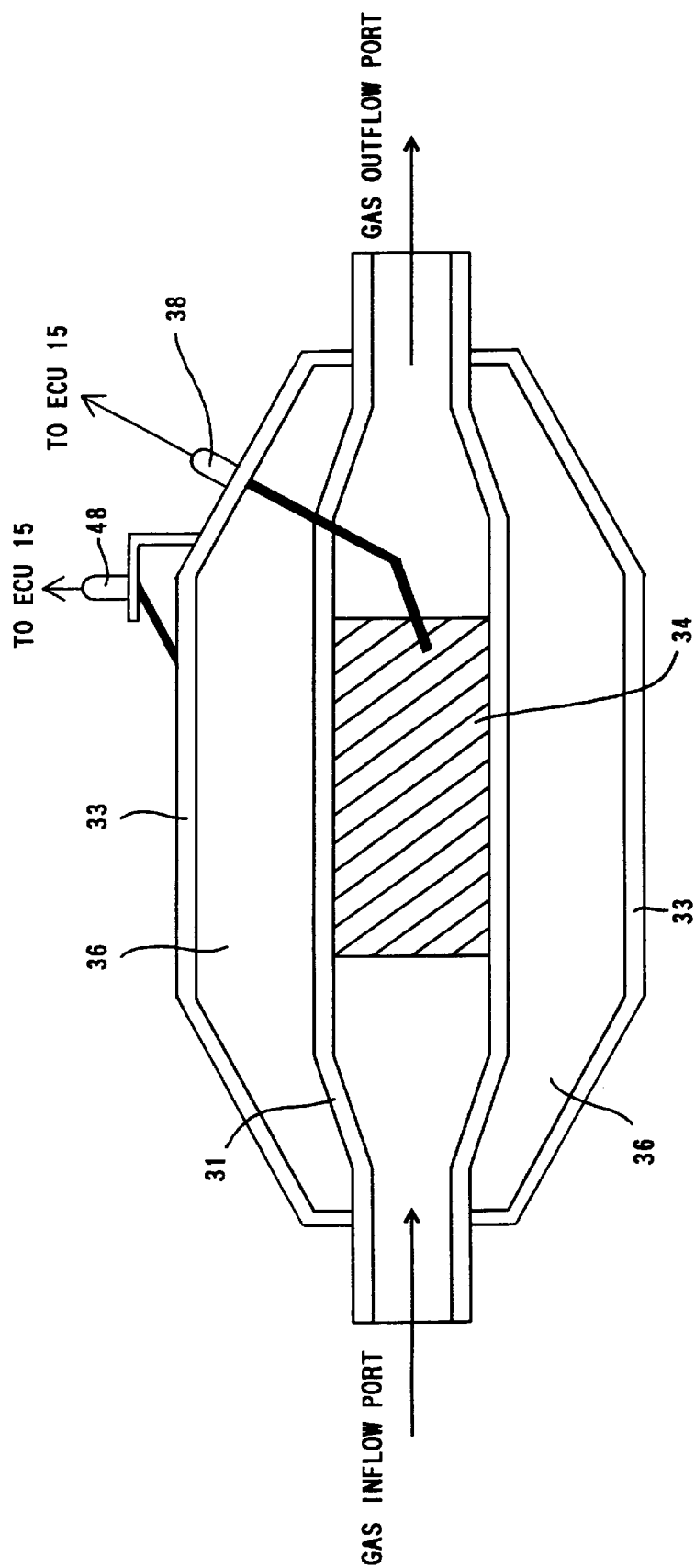
FIG. 24 is a vertical sectional view showing a construction of the catalyst device in the seventh embodiment.

The catalyst device 27 in the seventh embodiment is, as shown in FIGS. 23 and 24, constructed of a double-structured cylindrical body including the flame tube 31 and the outer casing 33, the flame tube 31 incorporates the exhaust gas purifying catalyst 34, and the vacuum layer 36 is formed between the flame tube 31 and the outer casing 33.

Then, the catalyst device 27 is fitted with a first temperature sensor 38 for outputting an electric signal corresponding to a bed temperature of the exhaust gas purifying catalyst 34, and a second temperature sensor 48 for outputting an electric signal corresponding to a temperature of the outer casing 33. The first temperature sensor 38 actualizes a first temperature detecting means according to the present invention, and the second temperature sensor 48 actualizes a second temperature detecting means according to the present invention.

Figure 25:
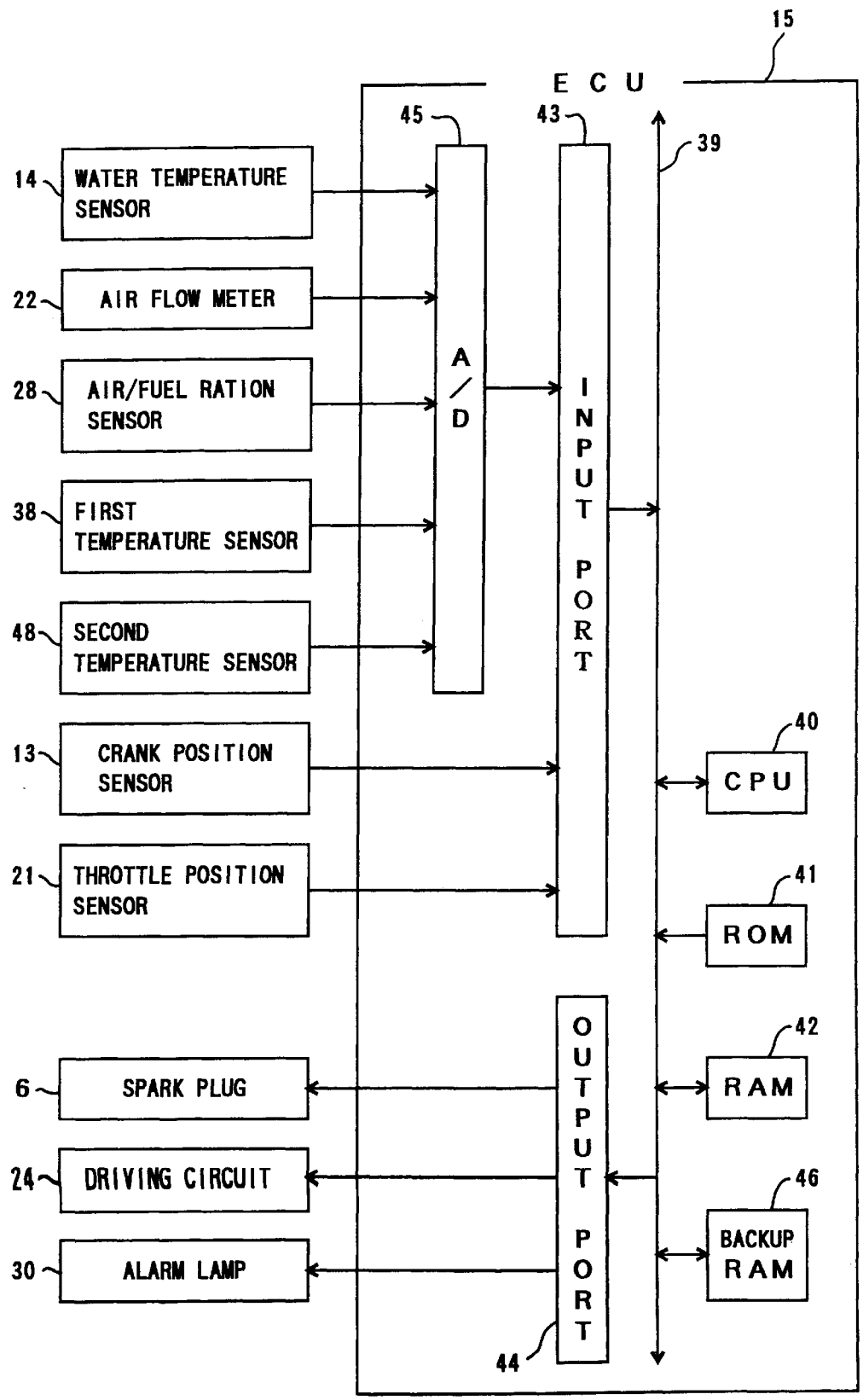
FIG. 25 is a diagram showing an internal construction of the ECU in the seventh embodiment.

Subsequently, the first and second temperature sensors 38, 48 are, as illustrated in FIG. 25, connected via the electric wires to the A/D converter 45 of the ECU 15. Then, the output signals of the first and second temperature sensors 38, 48 are, after being converted from the analog signals into the digital signals by the A/D converter 45, inputted to the input port 43 and then to the CPU 40 and the RAM 42 etc.

The CPU 40 of the ECU 15 diagnoses the fault based on a difference between the output signal value (catalyst bed temperature) of the first temperature sensor 38 and the output signal value (outer casing temperature) of the second temperature sensor 48.

Herein, if the adiabatic function of the catalyst device 27 is normal, the heat radiation from the exhaust gas purifying catalyst 34 is cut off, and the heat of the exhaust gas purifying catalyst 34 is not transmitted to the outer casing 33. Hence, there is produced a temperature difference over a predetermined value between the catalyst bed temperature and the outer casing temperature.

By contrast, if the adiabatic function of the vacuum layer 36 declines, the heat radiated from the exhaust gas purifying catalyst 34 is not cut off by the vacuum layer 36 and is transmitted to the outer casing 33, and therefore the temperature difference between the exhaust gas purifying catalyst 34 and the outer casing 33 becomes smaller than at the normal time.

Such being the case, in accordance with the seventh embodiment, there is previously obtained a judgement value T1 taking into consideration the temperature difference between the exhaust gas purifying catalyst 34 and the outer casing 33 at the normal time and the initial tolerances of the first and second temperature sensors 38, 48, and the ROM 41 is stored with this judgement value T1.

Then, the CPU 40, when executing the fault diagnostic process, inputs an output signal value (catalyst bed temperature) TC of the first temperature sensor 38 and an output signal value (outer casing temperature) TG of the second temperature sensor 48, and calculates a difference $\Delta T$ between the catalyst bed temperature TC and the outer casing temperature TG. Subsequently, the CPU 40 compares the difference $\Delta T$ with the judgement value T1. The CPU 40, if the difference $\Delta T$ is smaller than the judgement value T1, judges that the catalyst device 27 is faulted, and, if the difference $\Delta T$ is over the judgement value T1, judges that the catalyst device 27 is normal.

Thus, the ECU 15 actualizes a fault judging means according to the present invention.

Other constructions are the same as those in the first embodiment described above.

The operation and the effect in the embodiment 4 will be explained.

Figure 26:
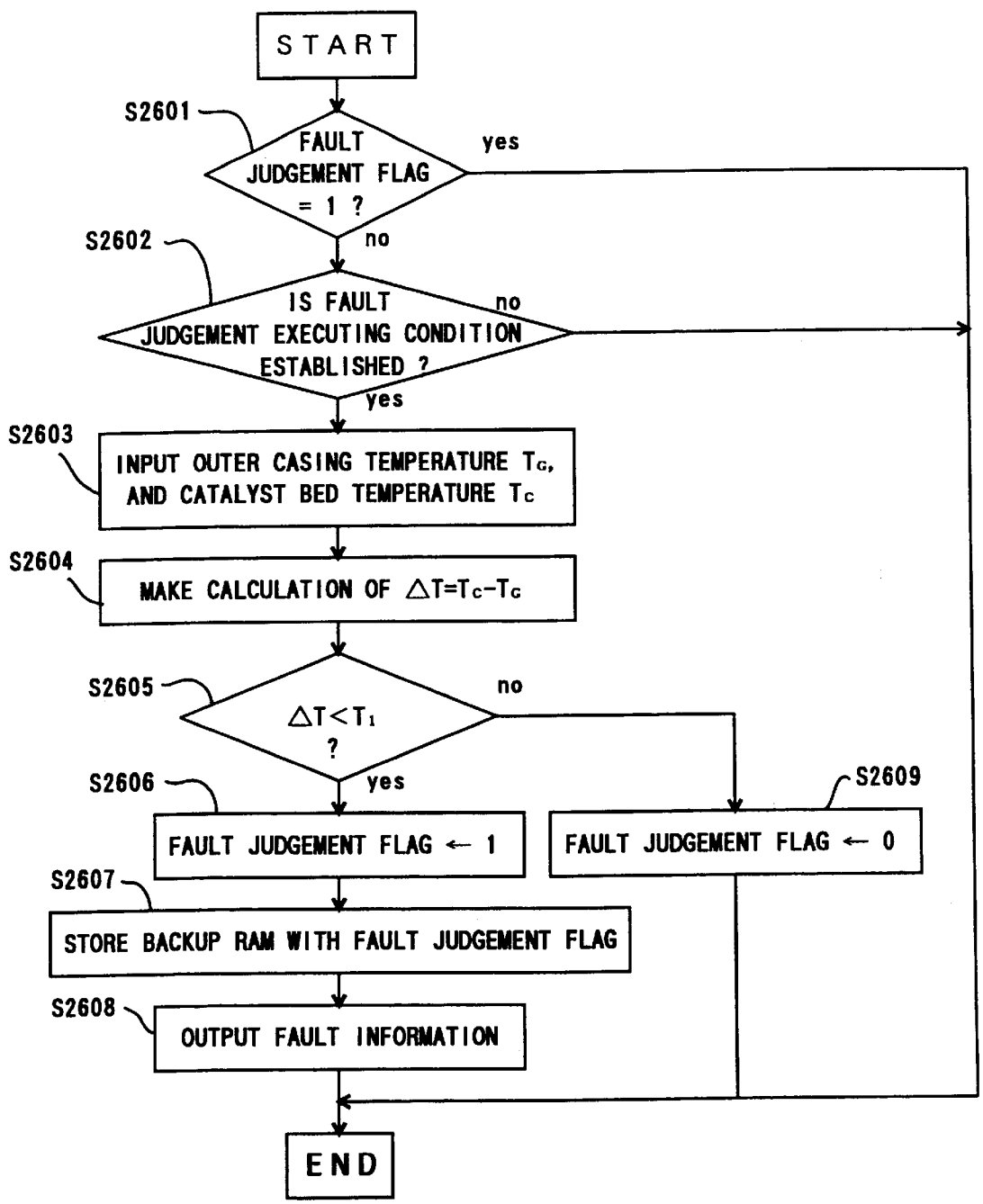
FIG. 26 is a flowchart showing a fault judgement control routine in the seventh embodiment.

The CPU 40 repeatedly executes a fault diagnostic control routine as shown in FIG. 26 at an interval of a predetermined time during the operation of the internal combustion engine 1.

In the fault diagnostic control routine, the CPU 40 accesses the fault judgement flag storage regions of the RAM 42 and of the backup RAM 46 in S2601, and judges whether "1" is stored therein or not.

The CPU 40, when judging in S2601 that "1" is stored in the fault judgement flag storage region of at least one of the RAM 42 and the backup RAM 46, infers that the catalyst device 27 has already been judged to be faulted, and finishes executing this fault diagnostic control routine.

While on the other hand, the CPU 40, when judging in S2601 that "0" is stored in the fault judgement flag storage regions of the RAM 42 and the backup RAM 46, advances to S2602, wherein the CPU 40 judges whether or not a fault judgement executing condition is established, e.g., whether or not the exhaust gas purifying catalyst 34 is activated (whether or not the catalyst bed temperature is over an activation temperature).

The CPU 40, when judging in S2602 that the fault judgement executing condition is not established, finishes the execution of the present routine.

By contrast, the CPU, when judging in S2602 that the fault judgement executing condition is established, advances to S2603 and inputs an output signal value (catalyst bed temperature) TC of the first temperature sensor 38 and an output signal value (outer casing temperature) TG of the second temperature sensor 48.

Subsequently, the CPU 40 calculates a difference ΔT by subtracting the outer casing temperature TG from the catalyst bed temperature TC.

Then, in S2605, the CPU 40 reads the judgement value T1 stored in the ROM 41 and judges whether or not the difference ΔT calculated in S2604 is less than the judgement value T1.

The CPU 40, when judging in S2605 that the difference ΔT is smaller than the judgement value T1, infers that the adiabatic performance of the vacuum layer 36 declines and that the catalyst device 27 is faulted, and advances to S2606.

In S2606, the CPU 40 writes "1" to the fault judgement flag storage region of the RAM 42 and subsequently in S2607 writes "1" to the fault judgement flag storage region of the backup RAM 46.

Then, the CPU 40 advances to S2608 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up.

While on the other hand, the CPU 40, when judging in S2605 that the difference ΔT is over the judgement value T1, infers that the catalyst device 27 is normal, and advances to S2609.

In S2609, the CPU 40 writes "0" to the fault judgement flag storage regions of the RAM 42 and of the backup RAM 46, thus finishing the execution of this routine.

As explained above, according to the exhaust gas purifying apparatus in the embodiment 7 discussed above, in the catalyst device 27 constructed such that the heat radiation from the exhaust gas purifying catalyst 34 is cut off by the vacuum layer 36, it is feasible to make the judgement about the fault in the adiabatic function of the vacuum layer 36 on the basis of the difference between the catalyst bed temperature and the outer casing temperature. Then, if the catalyst device 27 is judged to be faulted in its adiabatic function, the driver is made to recognize the fault in the catalyst device 27 by lighting up the alarm lamp 30, and is prompted to repair and replace the catalyst device.

Note that the embodiment 7 has exemplified the case of executing the fault diagnostic control routine during the operation of the internal combustion engine 1, however, the fault diagnostic control routine may also be executed during the halt of the operation of the internal combustion engine 1.

Further, the embodiment 7 has been explained so far by exemplifying the catalyst device in which the heat radiation from the exhaust gas purifying catalyst 34 is cut off by the vacuum layer 36, however, the present invention is not limited to this type of catalyst device and may be applied to catalyst devices having, in short, an means for cutting off the heat radiation from the exhaust gas purifying catalyst.

Embodiment 8

An eighth embodiment of the exhaust gas purifying apparatus according to the present invention will be described with reference to FIGS. 27 and 28. Herein, the explanation is concentrated upon a construction different from the one in the first embodiment discussed above, and the description of the like components is omitted.

Figure 27:
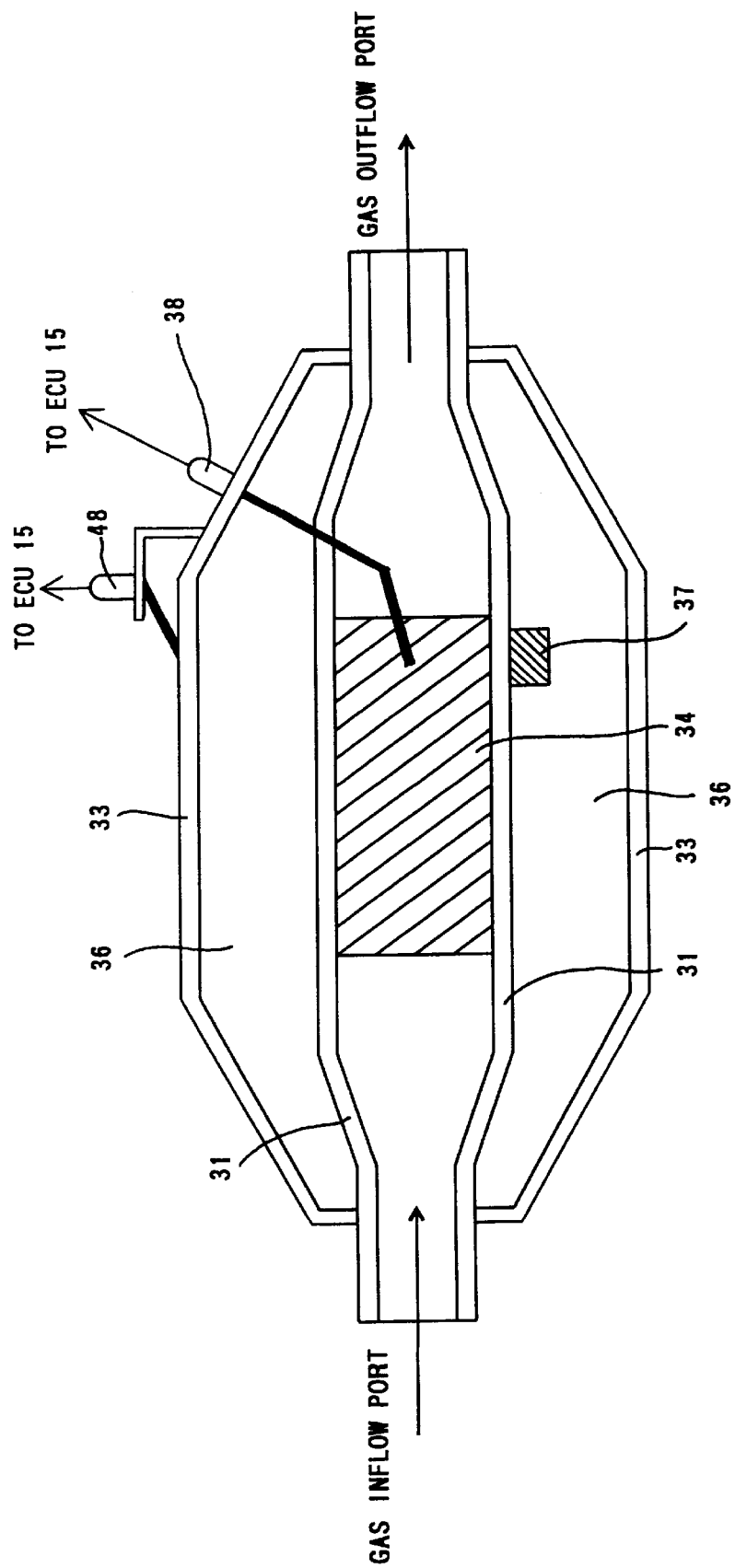
FIG. 27 is a vertical sectional view showing a construction of the catalyst device in an eighth embodiment.

The catalyst devise 27 in the eighth embodiment includes, as shown in FIG. 27, in addition to the construction explained in the seventh embodiment, the hydrogen absorbing alloy 37 which absorbs the hydrogen when lower than a predetermined temperature and emits the hydrogen when over the predetermined temperature described above. This hydrogen absorbing alloy 37 is incorporated into the vacuum layer 36 and substantially disposed in the vicinity of the exhaust gas purifying catalyst 34.

In the thus constructed catalyst device 27, the hydrogen absorbing alloy 37, when lower than the predetermined temperature, absorbs the hydrogen, and the vacuum layer 36 is brought into the vacuum state. Hence, the heat of the exhaust gas purifying catalyst 34 is not transmitted to the outer casing 33, and the temperature of the exhaust gas purifying catalyst 34 is restrained from decreasing.

By contrast, the hydrogen absorbing alloy 37, when over the predetermined temperature, emits the hydrogen, and the vacuum layer 36 is brought into the non-vacuum state. Therefore, the heat of the exhaust gas purifying catalyst 34 is transmitted via the hydrogen to the outer casing 33, thereby restraining an excessive rise in temperature of the exhaust gas purifying catalyst 34.

Thus, the vacuum layer 36 and the hydrogen absorbing alloy 37 actualize a heat radiation/isolation switching means.

Next, the CPU 40 of the ECU 15, as in the seventh embodiment discussed above, diagnoses the fault based on the difference between the output signal value (catalyst bed temperature) of the first temperature sensor 38 and the output signal value (outer casing temperature) of the second temperature sensor 48. It is, however, required that an execution timing of the fault diagnosing process be specified because of the temperature difference between the exhaust gas purifying catalyst 34 and the outer casing 33 being different depending on when the hydrogen absorbing alloy 37 absorbs the hydrogen and when emitting the hydrogen.

Explained in the eighth embodiment is an example of executing the fault diagnosing process at a timing when the hydrogen should be absorbed by the hydrogen absorbing alloy 37, i.e., when the hydrogen absorbing alloy 37 is lower than the predetermined temperature.

Then, the ROM 41 of the ECU 15 is stored with a judgement value T2 taking into consideration the temperature difference between the exhaust gas purifying catalyst 34 and the outer casing 33 when the catalyst device 27 is normal and the hydrogen absorbing alloy 37 absorbs the hydrogen, and also the initial tolerances of the first and second temperature sensors 38, 48.

Subsequently, the CPU 40 of the ECU 15, when the bed temperature of the exhaust gas purifying catalyst 34 is lower than the predetermined temperature, executes the fault diagnosing process by use of the bed temperature (output signal value of the first temperature sensor 38) of the exhaust gas purifying catalyst 34 as a parameter for estimating the temperature of the hydrogen absorbing alloy 37.

Other constructions are the same as those in the seventh embodiment discussed above.

The operation and the effect in the eighth embodiment will hereinafter be explained.

Figure 28:
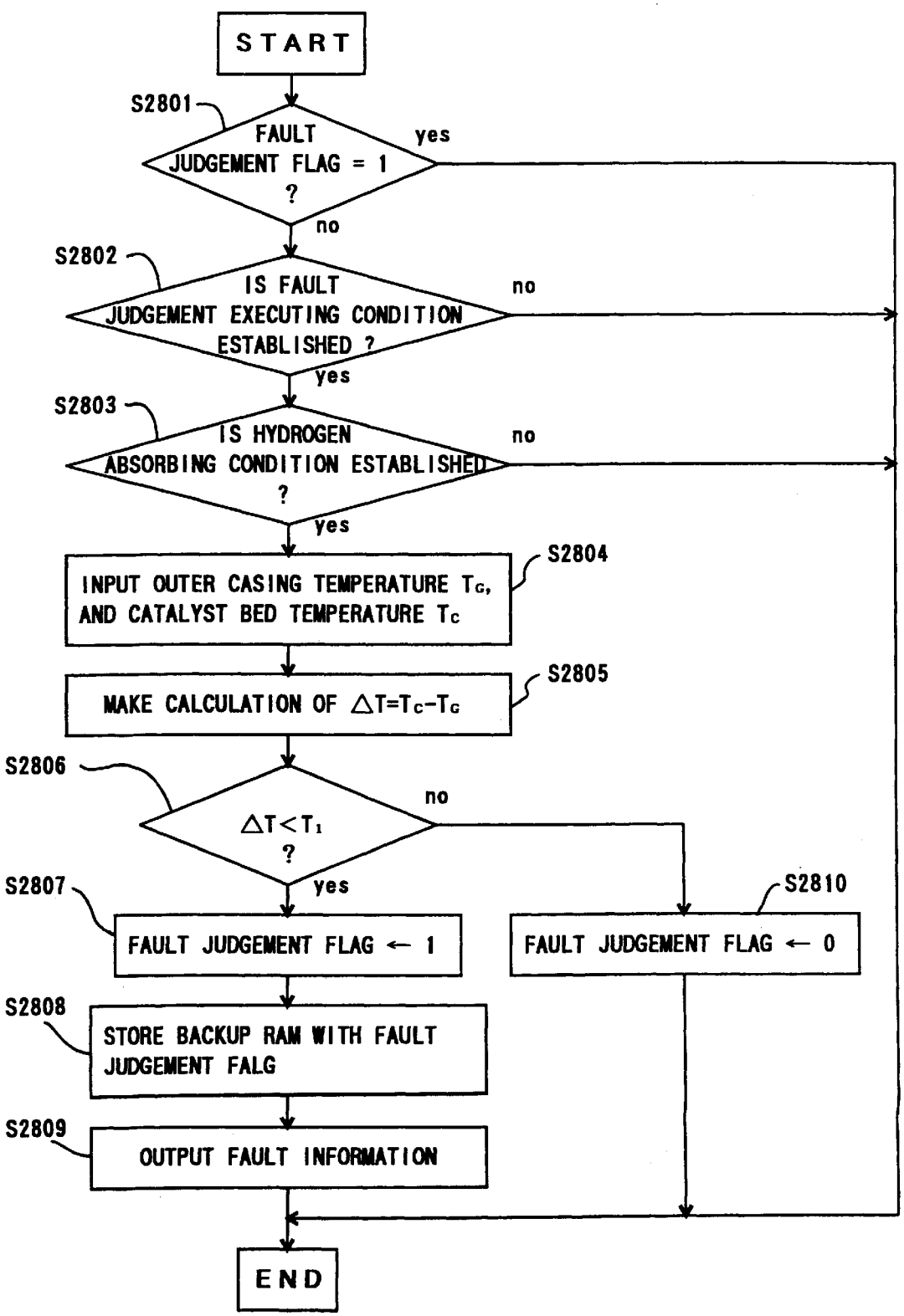
FIG. 28 is a flowchart showing a fault judgement control routine in the eighth embodiment.

The CPU 40 repeatedly executes a fault diagnostic control routine as shown in FIG. 28 at an interval of a predetermined time during the operation of the internal combustion engine 1.

In the fault diagnostic control routine, the CPU 40 accesses the fault judgement flag storage regions of the RAM 42 and of the backup RAM 46 in S2801, and judges whether "1" is stored therein or not.

The CPU 40, when judging in S2801 that "1" is stored in the fault judgement flag storage region of at least one of the RAM 42 and the backup RAM 46, infers that the catalyst device 27 has already been judged to be faulted, and finishes executing the fault diagnostic control routine.

While on the other hand, the CPU 40, when judging in S2801 that "0" is stored in the fault judgement flag storage regions of the RAM 42 and the backup RAM 46, advances to S2802 and judges whether or not the fault judgement executing condition is established, e.g., whether or not the exhaust gas purifying catalyst 34 is activated (whether or not the catalyst bed temperature is over the activation temperature).

The CPU 40, when judging in 2802 that the fault judgement executing condition is not established, finishes the execution of this fault diagnostic control routine.

By contrast, the CPU 40, when judging in S2802 that the fault judgement executing condition is established, advances to S2803 and judges whether or not a condition on which the hydrogen is absorbed by the hydrogen absorbing alloy 37 is established, i.e., whether or not the output signal value (catalyst bed temperature) of the first temperature sensor 38 is less than a predetermined temperature (at which the hydrogen is emitted from the hydrogen absorbing alloy 37).

The CPU 40, when judging in S2803 that the hydrogen absorbing condition is not established, finishes the execution of this routine.

While on the other hand, the CPU 40, when judging in S2803 that the hydrogen absorbing condition is established, advances to S2804 and inputs the output signal value (catalyst bed temperature) TC of the first temperature sensor 38 and the output signal value (outer casing temperature) TG of the second temperature sensor 48.

Subsequently, the CPU 40 goes forward to S2805 and calculates a difference ΔT by subtracting the outer casing temperature TG from the catalyst bed temperature TC.

Then, in S2806, the CPU 40 reads the judgement value T1 stored in the ROM 41 and judges whether or not the difference ΔT calculated in S2805 is less than the judgement value T1.

The CPU 40, when judging in S2806 that the difference ΔT is smaller than the judgement value T1, infers that the adiabatic performance of the vacuum layer 36 declines and that the catalyst device 27 is faulted, and advances to S2807.

In S2807, the CPU 40 writes "1" to the fault judgement flag storage region of the RAM 42 and subsequently in S2808 writes "1" to the fault judgement flag storage region of the backup RAM 46.

Then, the CPU 40 advances to S2809 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up.

While on the other hand, the CPU 40, when judging in S2806 that the difference ΔT is over the judgement value T1, infers that the catalyst device 27 is normal, and advances to S2810.

In S2810, the CPU 40 writes "0" to the fault judgement flag storage regions of the RAM 42 and of the backup RAM 46, thus finishing the execution of this routine.

As explained above, according to the exhaust gas purifying apparatus in the embodiment 8 discussed above, in the catalyst device 27 constructed such that the heat insulation and the heat radiation of the exhaust gas purifying catalyst 34 are switched over by the vacuum layer 36 and the hydrogen absorbing alloy 37, the fault diagnostic process is executed on condition that the hydrogen absorbing alloy 37 absorbs the hydrogen, whereby it is feasible to accurately judge that the adiabatic performance of the vacuum layer 36 declines and that the hydrogen absorbing alloy 37 is faulted.

Note that the embodiment 8 has exemplified the catalyst device 27 in which the heat insulation and the heat radiation of the exhaust gas purifying catalyst 34 are switched over by the vacuum layer 36 and the hydrogen absorbing alloy 37, however, the present invention is not limited to this catalyst device and may also be applied to catalyst devices having, in short, a mechanism for switching over the heat radiation and the heat insulation of the exhaust gas purifying catalyst.

Embodiment 9

A ninth embodiment of the exhaust gas purifying apparatus according to the present invention will be described with reference to FIG. 29. Herein, the explanation is concentrated upon a construction different from the one in the eighth embodiment discussed above, and the description of the like components is omitted.

The eighth embodiment discussed above has dealt with the example of executing the fault diagnosing process at the timing when the hydrogen should be absorbed by the hydrogen absorbing alloy 37 in the catalyst device 27 including the hydrogen absorbing alloy 37. In accordance with the ninth embodiment, however, there will be explained an example of executing the fault diagnosing process at the timing when the hydrogen should be emitted from the hydrogen absorbing alloy 37, i.e., when the hydrogen absorbing alloy 37 is over the predetermined temperature.

Herein, it is assumed that the catalyst device 27 is normal and the hydrogen is emitted from the hydrogen absorbing alloy 37, in which case the heat of the exhaust gas purifying catalyst 34 is transmitted via the hydrogen to the outer casing 33. Therefore, the temperature difference between the exhaust gas purifying catalyst 34 and the outer casing 33 is less than the predetermined value.

Whereas if the catalyst device 27 is faulted, the heat of the exhaust gas purifying catalyst 34 is not sufficiently transmitted to the outer casing 33, and hence the temperature difference between the exhaust gas purifying catalyst 34 and the outer casing 33 becomes larger than the predetermined value.

Such being the case, in the embodiment 9, there is obtained a judgement value T2 taking into consideration the temperature difference between the exhaust gas purifying catalyst 34 and the outer casing 33 when the catalyst device 27 is normal and the hydrogen absorbing alloy 37 emits the hydrogen, and also the initial tolerances of the first and second temperature sensors 38, 48, and the ROM 41 is stored with this judgement value T2.

Then, the CPU 40, when the bed temperature of the exhaust gas purifying catalyst 34 is over the predetermined temperature, executes the fault diagnosing process by use of the bed temperature (output signal value of the first temperature sensor 38) of the exhaust gas purifying catalyst 34 as a parameter for estimating the temperature of the hydrogen absorbing alloy 37.

In the fault diagnosing process described above, the CPU 40 inputs the output signal values of the first and second temperature sensors 38, 48, and calculates the difference ΔT between these output signal values. Subsequently, the CPU 40 compares the difference ΔT with the judgement value T2 and, if the difference ΔT is larger than the judgement value T2, judges that the catalyst device 27 is faulted.

Other constructions are the same as those in the eighth embodiment discussed above.

The operation and the effect in the ninth embodiment will hereinafter be explained.

Figure 29:
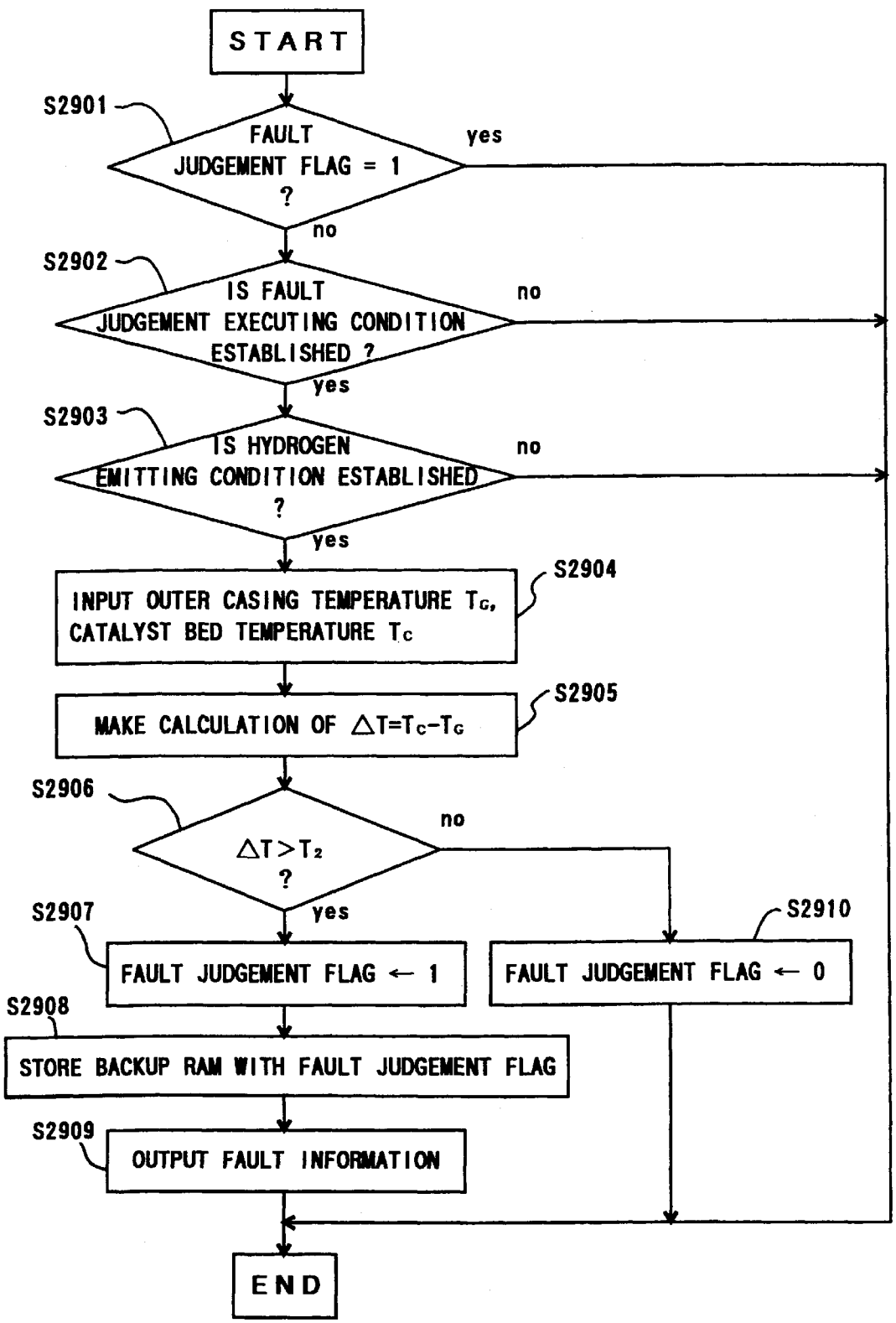
FIG. 29 is a flowchart showing a fault judgement control routine in a ninth eighth embodiment.

The CPU 40 repeatedly executes a fault diagnostic control routine as shown in FIG. 29 at an interval of a predetermined time during the operation of the internal combustion engine 1.

In the fault diagnostic control routine, the CPU 40 accesses the fault judgement flag storage regions of the RAM 42 and of the backup RAM 46 in S2901, and judges whether "1" is stored therein or not.

The CPU 40, when judging in S2901 that "1" is stored in the fault judgement flag storage region of at least one of the RAM 42 and the backup RAM 46, infers that the catalyst device 27 has already been judged to be faulted, and finishes executing the fault diagnostic control routine.

While on the other hand, the CPU 40, when judging in S2901 that "0" is stored in the fault judgement flag storage regions of the RAM 42 and the backup RAM 46, advances to S2902 and judges whether or not the fault judgement executing condition is established, e.g., whether or not the exhaust gas purifying catalyst 34 is activated (whether or not the catalyst bed temperature is over the activation temperature).

The CPU 40, when judging S2902 that the fault judgement executing condition is not established, finishes the execution of this fault diagnostic control routine.

By contrast, the CPU 40, when judging in S2902 that the fault judgement executing condition is established, advances to S2903 and judges whether or not the condition on which the hydrogen is absorbed by the hydrogen absorbing alloy 37 is established, i.e., whether or not the output signal value (catalyst bed temperature) of the first temperature sensor 38 is over the predetermined temperature (at which the hydrogen is emitted from the hydrogen absorbing alloy 37).

The CPU 40, when judging in S2903 that the hydrogen absorbing condition is not established, finishes the execution of this routine.

While on the other hand, the CPU 40, when judging in S2903 that the hydrogen absorbing condition is established, advances to S2904 and inputs the output signal value (catalyst bed temperature) TC of the first temperature sensor 38 and the output signal value (outer casing temperature) TG of the second temperature sensor 48.

Subsequently, the CPU 40 goes forward to S2905 and calculates a difference ΔT by subtracting the outer casing temperature TG from the catalyst bed temperature TC.

Then, in S2906, the CPU 40 reads a judgement value T2 stored in the ROM 41 and judges whether or not the difference ΔT calculated in S2905 is larger than the judgement value T2.

The CPU 40, when judging in S2906 that the difference ΔT is larger than the judgement value T2, infers that the adiabatic performance of the vacuum layer 36 declines and that the catalyst device 27 is faulted with an occurrence of abnormal state in the hydrogen absorbing alloy 37, and advances to S2907.

In S2907, the CPU 40 writes "1" to the fault judgement flag storage region of the RAM 42 and subsequently in S2908 writes "1" to the fault judgement flag storage region of the backup RAM 46.

Then, the CPU 40 advances to S2909 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up.

While on the other hand, the CPU 40, when judging in S2906 that the difference ΔT is under the judgement value T2, infers that the catalyst device 27 is normal, and advances to S2910.

In S2910, the CPU 40 writes "0" to the fault judgement flag storage regions of the RAM 42 and of the backup RAM 46, thus finishing the execution of this routine.

As explained above, according to the exhaust gas purifying apparatus in the embodiment 9 discussed above, in the catalyst device 27 constructed such that the heat insulation and the heat radiation of the exhaust gas purifying catalyst 34 are switched over by the vacuum layer 36 and the hydrogen absorbing alloy 37, the fault diagnostic process is executed on condition that the hydrogen absorbing alloy 37 emits the hydrogen, whereby it is feasible to accurately judge that the hydrogen absorbing alloy 37 is faulted.

Note that the embodiment 9 has exemplified the catalyst device 27 in which the heat insulation and the heat radiation of the exhaust gas purifying catalyst 34 are switched over by the vacuum layer 36 and the hydrogen absorbing alloy 37, however, the present invention is not limited to this catalyst device and may also be applied to catalyst devices having, in short, a mechanism for switching over the heat radiation and the heat insulation of the exhaust gas purifying catalyst.

Embodiment 10

A tenth embodiment of the exhaust gas purifying apparatus according to the present invention will be described with reference to FIGS. 30 and 31. Herein, the explanation is concentrated upon a construction different from the one in the seventh embodiment discussed above, and the description of the like components is omitted.

Figure 30:
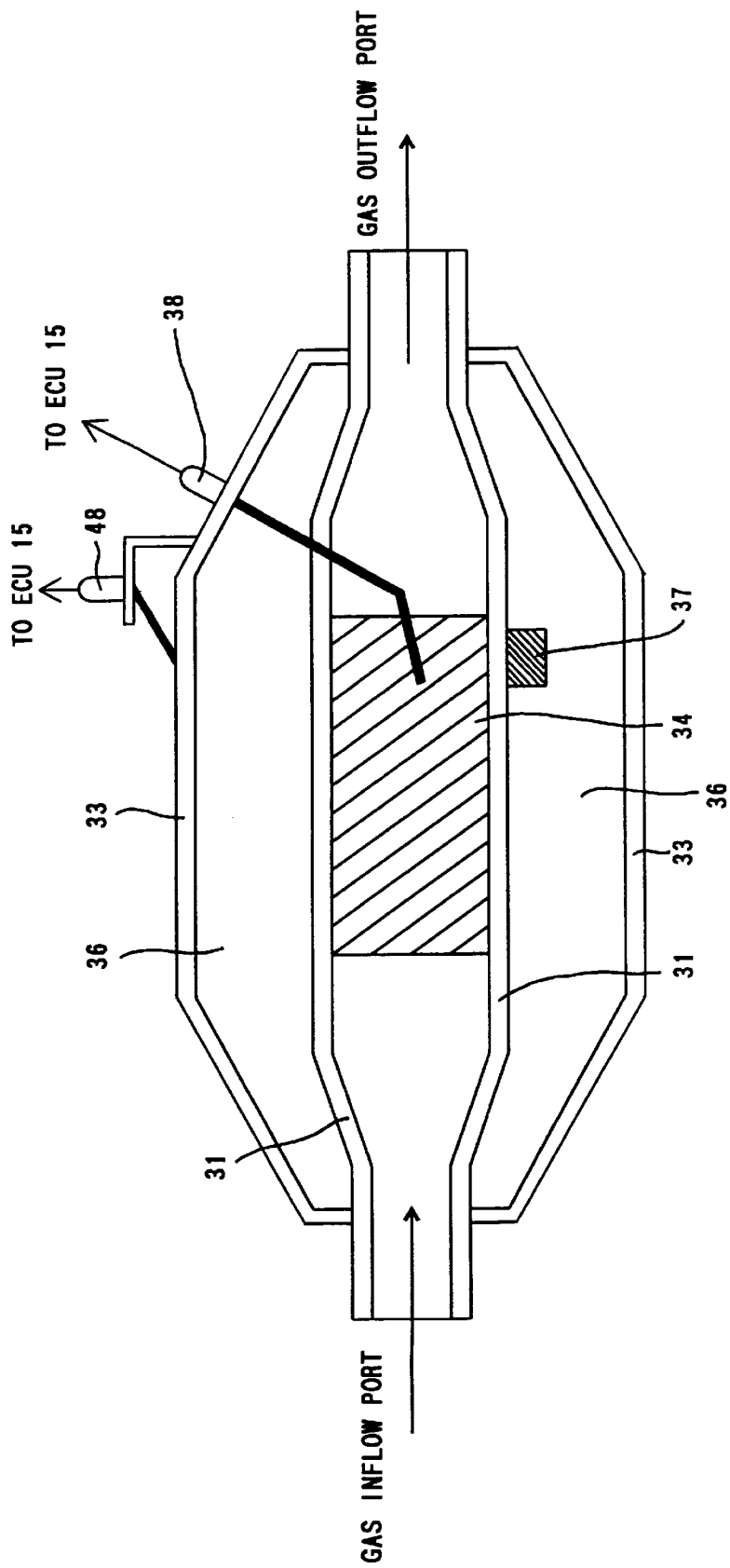
FIG. 30 is a vertical sectional view showing a construction of the catalyst device in a tenth embodiment.

The catalyst device 27 in the tenth embodiment includes, as shown in FIG. 30, in addition to the construction explained in the seventh embodiment described above, the hydrogen absorbing alloy 37 which absorbs the hydrogen when less than a predetermined temperature and emits the hydrogen when over the predetermined temperature. This hydrogen absorbing alloy 37 is incorporated into the vacuum layer 36 and substantially disposed in the vicinity of the exhaust gas purifying catalyst 34.

In the thus constructed catalyst device 27, the hydrogen absorbing alloy 37, when lower than the predetermined temperature, absorbs the hydrogen, and the vacuum layer 36 is brought into the vacuum state. Hence, the heat of the exhaust gas purifying catalyst 34 is not transmitted to the outer casing 33, and the temperature of the exhaust gas purifying catalyst 34 is restrained from decreasing.

By contrast, the hydrogen absorbing alloy 37, when over the predetermined temperature, emits the hydrogen, and the vacuum layer 36 is brought into the non-vacuum state. Therefore, the heat of the exhaust gas purifying catalyst 34 is transmitted via the hydrogen to the outer casing 33, thereby restraining an excessive rise in temperature of the exhaust gas purifying catalyst 34.

Next, the CPU 40 of the ECU 15, as in the seventh embodiment discussed above, diagnoses the fault based on the difference between the output signal value (catalyst bed temperature) of the first temperature sensor 38 and the output signal value (outer casing temperature) of the second temperature sensor 48. It is, however, necessary to set a judgement value corresponding to a state of the hydrogen absorbing alloy 37 because of the temperature difference between the exhaust gas purifying catalyst 34 and the outer casing 33 being different depending on when the hydrogen absorbing alloy 37 absorbs the hydrogen and when emitting the hydrogen.

Such being the case, in accordance with the embodiment 10, there are obtained a first judgement value T1 taking into consideration the temperature difference between the exhaust gas purifying catalyst 34 and the outer casing 33 when the catalyst device 27 is normal and the hydrogen absorbing alloy 37 absorbs the hydrogen, and also the initial tolerances of the first and second temperature sensors 38, 48, and also a second judgement value T2 taking into consideration the temperature difference between the exhaust gas purifying catalyst 34 and the outer casing 33 when the catalyst device 27 is normal and the hydrogen absorbing alloy 37 emits the hydrogen, and also the initial tolerances of the first and second temperature sensors 38, 48. These first and second judgement values T1, T2 are stored in a predetermined region of the ROM 41.

Then, the CPU 40, when diagnosing the fault in the catalyst device 27, judges whether or not the bed temperature of the exhaust gas purifying catalyst 34 is lower than the predetermined temperature by using the bed temperature (output signal value of the first temperature sensor 38) of the exhaust gas purifying catalyst 34 as a parameter for estimating the temperature of the hydrogen absorbing alloy 37.

If the bed temperature of the exhaust gas purifying catalyst 34 is lower than the predetermine temperature, the CPU infers that the hydrogen is absorbed by the hydrogen absorbing alloy 37. Then, the CPU 40 inputs the output signal values (catalyst bed temperature TC, outer casing temperature TG) of the first and second temperature sensor 38, 48, and calculates a differenceΔT (=TC−TG) between these output signal values. The CPU 40 also reads the first judgement value T1 from the ROM 41 and compares the difference ΔT with the first judgement value T1. On this occasion, the CPU 40, if the difference ΔT is smaller than the first judgement value T1, judges that the catalyst device 27 falls into the fault and, if the difference ΔT is over the first judgement value T1, judges that the catalyst device 27 is normal.

Further, if the bed temperature of the exhaust gas purifying catalyst 34 is over the predetermined temperature, the CPU 40 infers that the hydrogen is emitted from the hydrogen absorbing alloy 37. Then, the CPU 40 inputs the output signal values (catalyst bed temperature TC, outer casing temperature TG) of the first and second temperature sensor 38, 48, and calculates a differenceΔT (=TC−TG) between these output signal values. The CPU 40 also reads the second judgement value T2 from the ROM 41 and compares the difference ΔT with the second judgement value T2.

On this occasion, the CPU 40, if the difference ΔT is larger than the second judgement value T2, judges that the catalyst device 27 is faulted and, if the difference ΔT is under the second judgement value T2, judges that the catalyst device 27 is normal.

Other constructions are the same as those in the seventh embodiment discussed above.

The operation and the effect in the tenth embodiment will hereinafter be explained.

Figure 31:
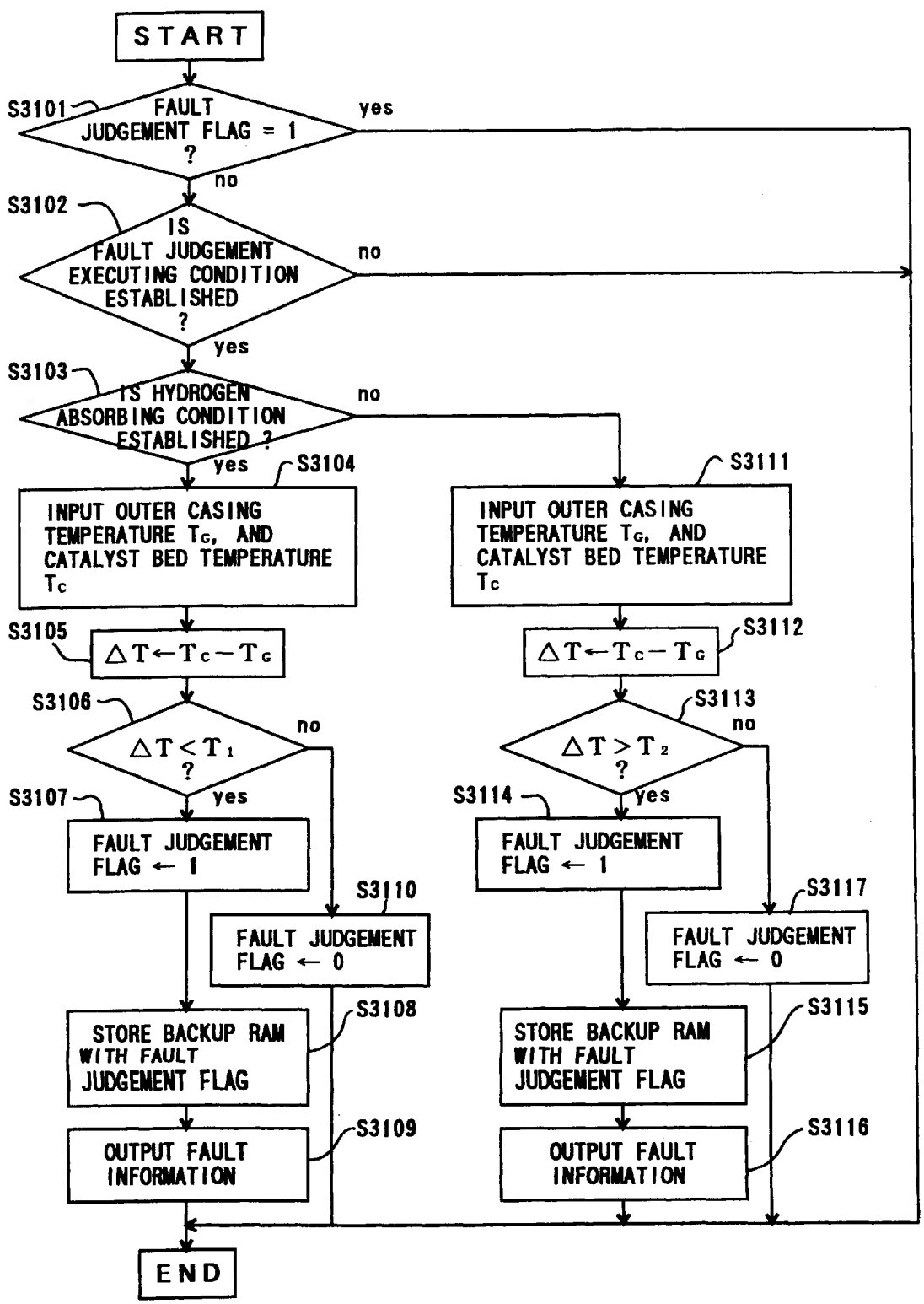
FIG. 31 is a flowchart showing a fault judgement control routine in the tenth embodiment.

The CPU 40 repeatedly executes a fault diagnostic control routine as shown in FIG. 31 at an interval of a predetermined time during the operation of the internal combustion engine 1.

In the fault diagnostic control routine, the CPU 40 accesses the fault judgement flag storage regions of the RAM 42 and of the backup RAM 46 in S3101, and judges whether "1" is stored therein or not.

The CPU 40, when judging in S3101 that "1" is stored in the fault judgement flag storage region of at least one of the RAM 42 and the backup RAM 46, infers that the catalyst device 27 has already been judged to be faulted, and finishes executing the fault diagnostic control routine.

While on the other hand, the CPU 40, when judging in S3101 that "0" is stored in the fault judgement flag storage regions of the RAM 42 and the backup RAM 46, advances to S3102 and judges whether or not the fault judgement executing condition is established, e.g., whether or not the exhaust gas purifying catalyst 34 is activated (whether or not the catalyst bed temperature is over the activation temperature).

The CPU 40, when judging in 3102 that the fault judgement executing condition is not established, finishes the execution of this fault diagnostic control routine.

By contrast, the CPU 40, when judging in S3102 that the fault judgement executing condition is established, advances to S3103 and judges whether or not the hydrogen absorbing condition is established.

The CPU 40, when judging in S3103 that the hydrogen absorbing condition is established, advances to S3104 and inputs the output signal value (catalyst bed temperature) TC of the first temperature sensor 38 and the output signal value (outer casing temperature) TG of the second temperature sensor 48.

Subsequently, the CPU 40 goes forward to S3105 and calculates a difference ΔT by subtracting the temperature TG of the outer casing 33 from the bed temperature TC of the exhaust gas purifying catalyst 34.

Then, in S3106, the CPU 40 reads the first judgement value T1 stored in the ROM 41 and judges whether or not the difference ΔT calculated in S3105 is less than the first judgement value T1.

The CPU 40, when judging in S3106 that the difference ΔT is smaller than the first judgement value T1, infers that the adiabatic performance of the vacuum layer 36 declines and that the catalyst device 27 is faulted, and advances to S3107.

In S3107, the CPU 40 writes "1" to the fault judgement flag storage region of the RAM 42 and subsequently in S3108 writes "1" to the fault judgement flag storage region of the backup RAM 46.

Then, the CPU 40 advances to S3109 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up.

While on the other hand, the CPU 40, when judging in S3106 that the difference ΔT is over the first judgement value T1, infers that the catalyst device 27 is normal, and advances to S3110.

In S3110, the CPU 40 writes "0" to the fault judgement flag storage regions of the RAM 42 and of the backup RAM 46, thus finishing the execution of this routine.

Further, the CPU 40, when judging in S3103 that the hydrogen absorbing condition is not established, i.e., that a hydrogen emitting condition of the hydrogen absorbing alloy 37 is established, advances to S3111 and inputs the output signal value (catalyst bed temperature) TC of the first temperature sensor 38 and the output signal value (outer casing temperature) TG of the second temperature sensor 48.

Subsequently, the CPU 40 goes forward to S3112 and calculates a difference ΔT by subtracting the temperature TG of the outer casing 33 from the bed temperature TC of the exhaust gas purifying catalyst 34.

Then, in S3113, the CPU 40 reads the second judgement value T1 stored in the ROM 41 and judges whether or not the difference ΔT calculated in S3112 is larger than the second judgement value T2.

The CPU 40, when judging in S3113 that the difference ΔT is larger than the second judgement value T2, infers that the heat radiating performance of the catalyst device 27 declines and that the catalyst device 27 is faulted, and advances to S3114.

In S3114, the CPU 40 writes "1" to the fault judgement flag storage region of the RAM 42 and subsequently in S3115 writes "1" to the fault judgement flag storage region of the backup RAM 46.

Then, the CPU 40 advances to S3116 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up.

While on the other hand, the CPU 40, when judging in S3113 that the difference ΔT is under the second judgement value T2, infers that the catalyst device 27 is normal, and advances to S3117.

In S3117, the CPU 40 writes "0" to the fault judgement flag storage regions of the RAM 42 and of the backup RAM 46, thus finishing the execution of this routine.

As explained above, according to the exhaust gas purifying apparatus in the embodiment 10 discussed above, in the catalyst device 27 constructed such that the heat insulation and the heat radiation of the exhaust gas purifying catalyst 34 are switched over by the vacuum layer 36 and the hydrogen absorbing alloy 37, the fault diagnostic process corresponding to the state of the hydrogen absorbing alloy 37 is executed, whereby it is feasible to make accurate judgements about the fault in the vacuum layer 36 and the fault in the hydrogen absorbing alloy 37.

Embodiment 11

An eleventh embodiment of the exhaust gas purifying apparatus according to the present invention will be described with reference to FIGS. 32–34. Herein, the explanation is concentrated upon a construction different from the one in the seventh embodiment discussed above, and the description of the like components is omitted.

Figure 32:
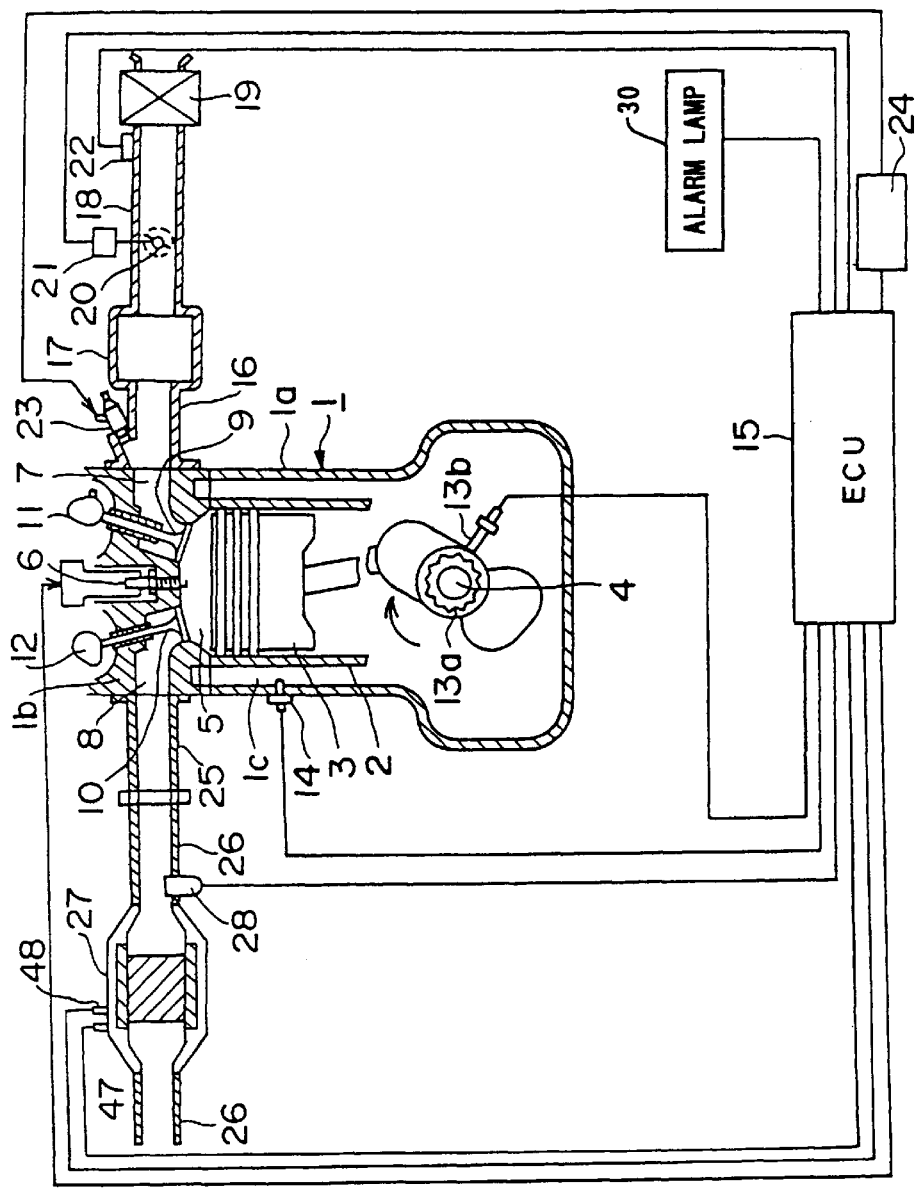
FIG. 32 is a view schematically illustrating a construction of the internal combustion engine to which the exhaust gas purifying apparatus in an eleventh embodiment is applied.
Figure 33:
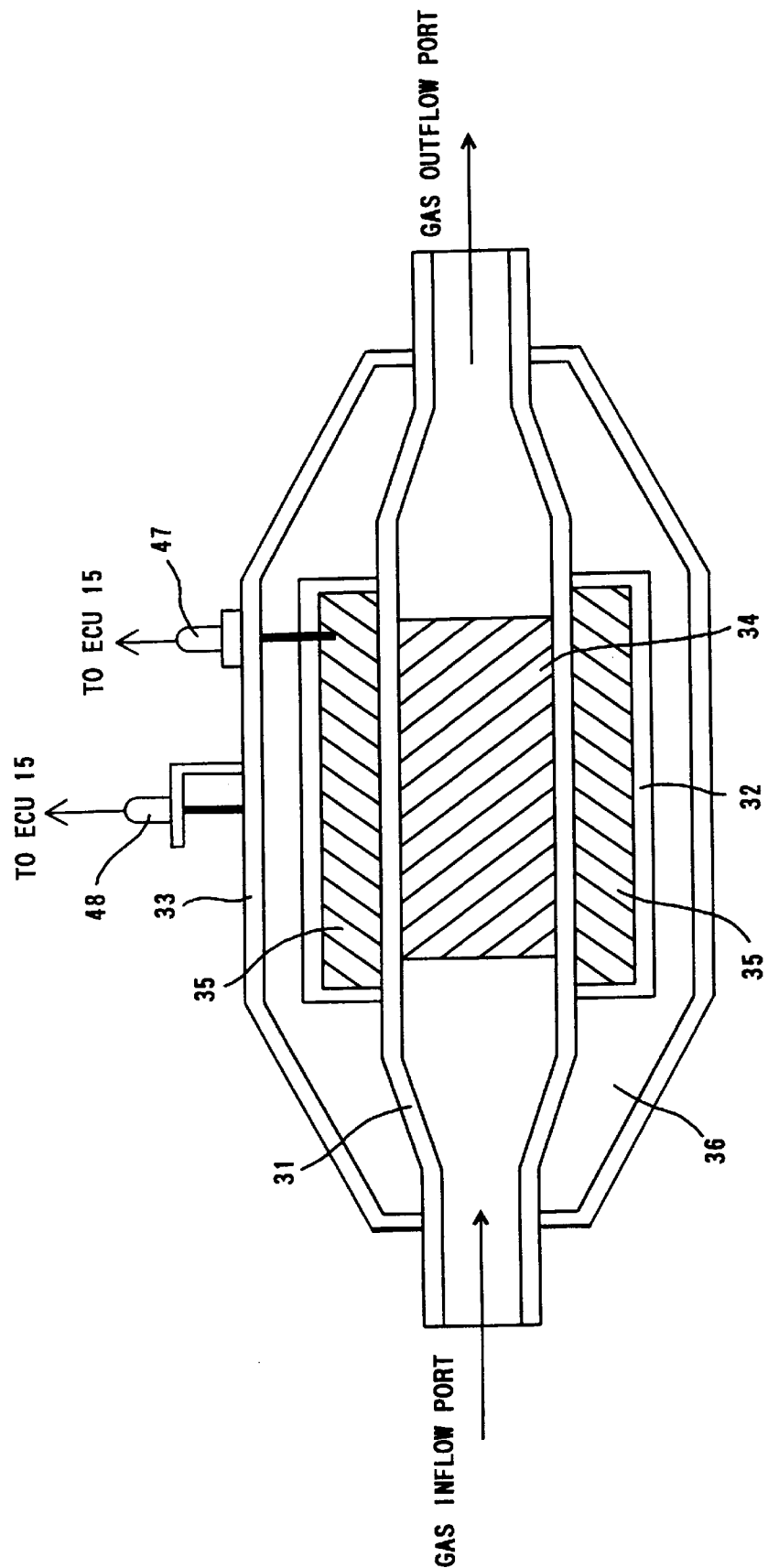
FIG. 33 is a vertical sectional view showing a construction of the catalyst device in the eleventh embodiment.

The catalyst device 27 in the eleventh embodiment is, as shown in FIGS. 32 and 33, constructed of a triple-structured cylindrical body, wherein the exhaust gas purifying catalyst 34 is incorporated into the flame tube 31, the heat storage material 35 fills between the flame tube 31 and the intermediate tube 32, and the vacuum layer 36 is formed between the flame tube 31 and the outer casing 33. Then, a space between the flame tube 31, the intermediate tube 32 and the outer casing 33.

Then, the outer casing 33 is fitted with a second temperature sensor 48 for outputting an electric signal corresponding to a temperature of outer casing 33, and with a third temperature sensor 47 for outputting an electric signal corresponding to a temperature of the heat storage material 35. The second temperature sensor 48 actualizes a second temperature detecting means according to the present invention, and the third temperature sensor 47 actualizes a third temperature detecting means according to the present invention.

Figure 34:
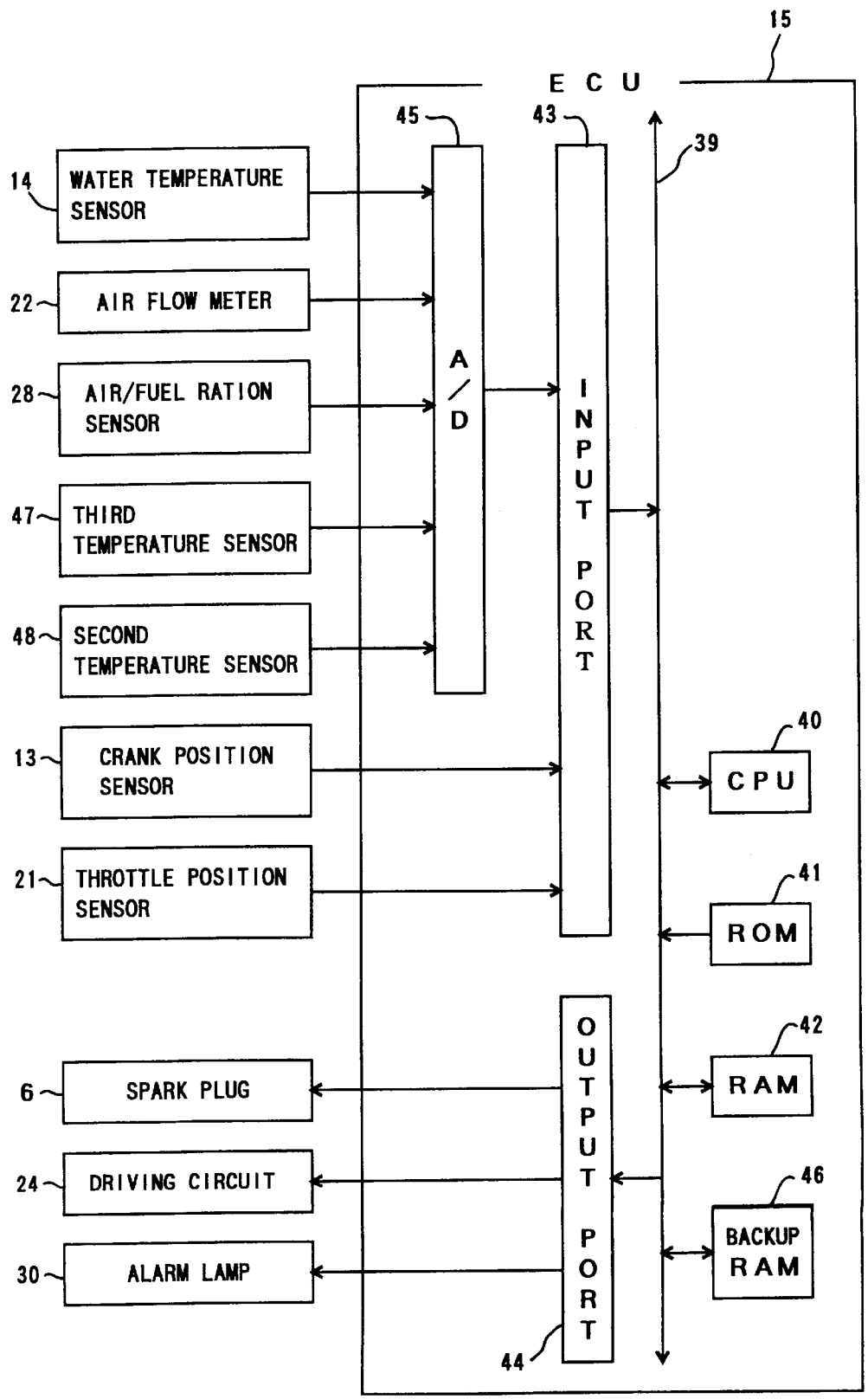
FIG. 34 is a diagram showing an internal construction of the ECU in the eleventh embodiment.

The second and third temperature sensors 48, 47 are, as illustrated in FIG. 34, connected via the electric wire to the A/D converter 45 of the ECU 15, and the output signals of the second and third temperature sensors 48, 47 are, after being converted from the analog signals into the digital signals by the A/D converter 45, inputted to the input port 43 and next to the CPU 40 and the RAM 42 etc.

Next, the CPU 40 of the ECU 15, as compared with the seventh embodiment discussed above, uses the temperature of the heat storage material 35 as a substitute for the temperature of the exhaust gas purifying catalyst 34, and diagnoses the fault based on a difference between the temperature (output signal value of the second temperature sensor 48) of the outer casing 33 and the temperature (output signal value of the third temperature sensor 47) of the heat storage material 35.

Herein, if the adiabatic function of the catalyst device 27 is normal, the heat radiation from the heat storage material 35 is cut off, and the heat of the heat storage material 35 is not transmitted to the outer casing 33. Hence, there is produced a temperature difference over a predetermined value between the heat storage material temperature and the outer casing temperature.

By contrast, if the adiabatic function of the vacuum layer 36 declines, the heat radiated from the heat storage material 35 is not cut off by the vacuum layer 36 and is transmitted to the outer casing 33, and therefore the temperature difference between the heat storage material 35 and the outer casing 33 becomes smaller than at the normal time.

Such being the case, in accordance with the eleventh embodiment, there is previously obtained a judgement value T3 taking into consideration the temperature difference between the heat storage material 35 and the outer casing 33 at the normal time and the initial tolerances of the second and third temperature sensors 48, 47, and the ROM 41 is stored with this judgement value T3.

Then, the CPU 40, when executing the fault diagnostic process, inputs an output signal value (outer casing temperature) TG of the second temperature sensor 48 and an output signal value (heat storage material temperature) TS of the third temperature sensor 47, and calculates a difference ΔT between the heat storage material TS and the outer casing temperature TG. Subsequently, the CPU 40 compares the difference ΔT with the judgement value T3. The CPU 40, if the difference ΔT is smaller than the judgement value T3, judges that the catalyst device 27 is faulted, and, if the difference ΔT is over the judgement value T3, judges that the catalyst device 27 is normal.

Other constructions are the same as those in the seventh embodiment described above.

The operation and the effect in the embodiment 11 will be explained.

Figure 35:
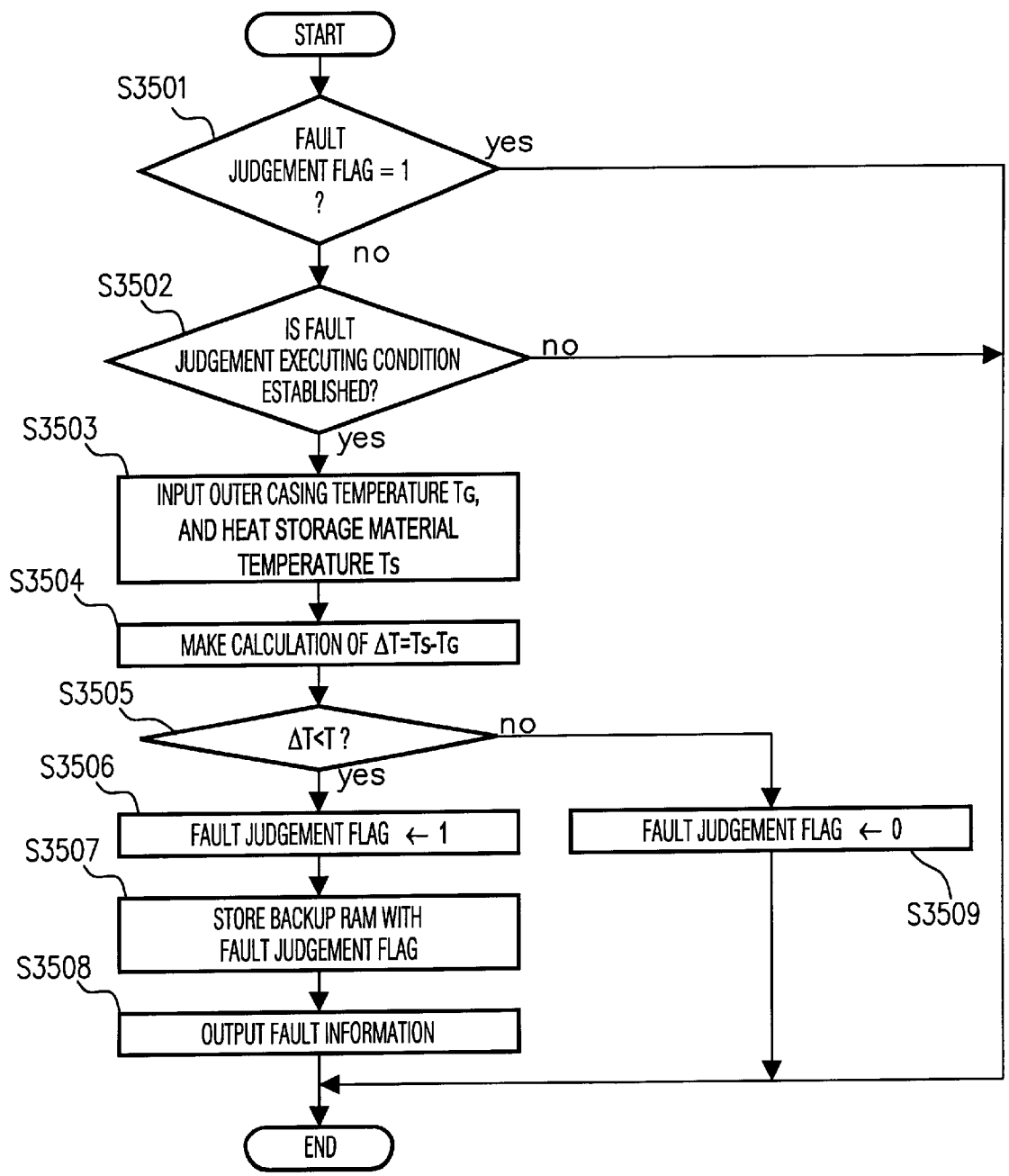
FIG. 35 is a flowchart showing a fault judgement control routine in the eleventh embodiment.

The CPU 40 repeatedly executes a fault diagnostic control routine as shown in FIG. 35 at an interval of a predetermined time during the operation of the internal combustion engine 1.

In the fault diagnostic control routine, the CPU 40 accesses the fault judgement flag storage regions of the RAM 42 and of the backup RAM 46 in S3501, and judges whether "1" is stored therein or not.

The CPU 40, when judging in S3501 that "1" is stored in the fault judgement flag storage region of at least one of the RAM 42 and the backup RAM 46, infers that the catalyst device 27 has already been judged to be faulted, and finishes executing this fault diagnostic control routine.

While on the other hand, the CPU 40, when judging in S3501 that "0" is stored in the fault judgement flag storage regions of the RAM 42 and the backup RAM 46, advances to S3502, wherein the CPU 40 judges whether or not the fault judgement executing condition is established.

The CPU 40, when judging in S3502 that the fault judgement executing condition is not established, finishes the execution of the present routine.

By contrast, the CPU, when judging in S3502 that the fault judgement executing condition is established, advances to S3503 and inputs an output signal value (heat storage material temperature) TS of the third temperature sensor 47 and an output signal value (outer casing temperature) TG of the second temperature sensor 48.

Subsequently, the CPU 40 calculates a difference $\Delta T$ by subtracting the outer casing temperature TG from the heat storage material temperature TS.

Then, in S3505, the CPU 40 reads the judgement value T3 stored in the ROM 41 and judges whether or not the difference $\Delta T$ calculated in S3504 is less than the judgement value T3.

The CPU 40, when judging in S3505 that the difference $\Delta T$ is smaller than the judgement value T3, infers that the adiabatic performance of the vacuum layer 36 declines and that the catalyst device 27 is faulted, and advances to S3506.

In S3506, the CPU 40 writes "1" to the fault judgement flag storage region of the RAM 42 and subsequently in S3507 writes "1" to the fault judgement flag storage region of the backup RAM 46.

Then, the CPU 40 advances to S3508 and outputs the control signal in order to light up the alarm lamp 30. Then, the CPU 40 finishes executing the present routine. The control signal outputted from the CPU 40 is transmitted via the output port 44 to the alarm lamp 30, with the result that the alarm lamp 30 is lit up.

While on the other hand, the CPU 40, when judging in S3505 that the difference $\Delta T$ is over the judgement value T3, infers that the catalyst device 27 is normal, and advances to S3509.

In S3509, the CPU 40 writes "0" to the fault judgement flag storage regions of the RAM 42 and of the backup RAM 46, thus finishing the execution of this routine.

As described above, according to the exhaust gas purifying apparatus in the embodiment 11 discussed above, in the catalyst device 27 constructed such that the heat radiation from the exhaust gas purifying catalyst 34 as well as from the heat storage material 35 is cut off by the vacuum layer 36, it is feasible to obtain the same effect as the one in the seventh embodiment discussed above by using also the heat storage material temperature in place of the catalyst bed temperature.

Note that the embodiment 11 has exemplified the case of executing the fault diagnostic control routine during the operation of the internal combustion engine 1, however, the fault diagnostic control routine may also be executed during the halt of the operation of the internal combustion engine 1.

Further, the embodiment 11 has been explained so far by exemplifying the catalyst device 27 including no hydrogen absorbing alloy, however, the catalyst device having the hydrogen absorbing alloy may also be used, in which case the heat storage material temperatures may be used as a substitute for the catalyst bed temperature in the exhaust gas purifying apparatuses in the eighth, ninth and tenth embodiments.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An exhaust gas purifying apparatus for an internal combustion engine, comprising:

an exhaust gas purifying catalyst provided in an exhaust passageway of the internal combustion engine;

temperature control means disposed around the exhaust gas purifying catalyst for controlling a temperature thereof, thereby to maintain the temperature of said exhaust gas purifying catalyst within a predetermined temperature range;

state detecting means for detecting at least one of a state of said exhaust gas purifying catalyst and a state of said temperature control means; and fault judging means for making a judgement about a fault in said temperature control means on the basis of the state detected by said state detecting means.

2. An exhaust gas purifying apparatus for an internal combustion engine according to claim 1, wherein said temperature control means utilizes a heat contained in the exhaust gas discharged from the internal combustion engine to maintain the temperature of the exhaust gas purifying catalyst within a predetermined temperature range.

3. An exhaust gas purifying apparatus for an internal combustion engine according to claim 1, wherein said state detecting means detects a state relating to a pressure of said temperature control means; and said fault judging means makes a judgment of fault of said temperature control means based on the pressure state detected by said state detecting means.

4. An exhaust gas purifying apparatus for an internal combustion engine according to claim 3, wherein said temperature control means includes an outer casing for covering said exhaust gas purifying catalyst, and a vacuum spatial portion formed between said exhaust gas purifying catalyst and said outer casing for cutting off a heat transmission from said exhaust gas purifying catalyst to said outer casing;

said sate detecting means includes pressure detecting means for detecting a pressure in said vacuum spatial portion; and said fault judging means makes a judgement about a fault on the basis of a detected value by said pressure detecting means.

5. An exhaust gas purifying apparatus for an internal combustion engine according to claim 4, wherein said temperature control means includes heat radiation/insulation control means for cutting off a heat radiation from said exhaust gas purifying catalyst by setting said vacuum spatial portion in a vacuum state, and for permitting the heat radiation from said exhaust gas purifying catalyst by setting said vacuum spatial portion in a non-vacuum state; and said fault judging means makes the judgement about the fault at a timing when said heat radiation/insulation control means should set said vacuum spatial potion in the vacuum state.

6. An exhaust gas purifying apparatus for an internal combustion engine according to claim 1, wherein said state detecting means detects at least one of a state of temperature of said exhaust gas purifying catalyst and said temperature control means; and said fault judging means makes a judgment of fault in said temperature control means based on the temperature state detected by said state detecting means.

7. An exhaust gas purifying apparatus for an internal combustion engine according to claim 6, wherein said state detecting means includes temperature detecting means for detecting a temperature of said exhaust gas purifying catalyst; and said fault judging means calculates a rate of change of temperature of said exhaust gas purifying catalyst from a detected value of said temperature detecting means and makes a judgment of fault in an temperature control function based on the rate of temperature change.

8. An exhaust gas purifying apparatus for an internal combustion engine according to claim 6, wherein said temperature control means includes adiabatic means for cutting off a heat radiation from said exhaust gas purifying catalyst;

said state detecting means includes temperature detecting means for detecting a temperature of said exhaust gas purifying catalyst; and said fault judging means calculates, from a detected value of said temperature detecting means, a temperature decrease rate per predetermined time after a halt of said internal combustion engine, and makes a judgement about a fault in an adiabatic function on the basis of a magnitude of the temperature decrease rate.

9. An exhaust gas purifying apparatus for an internal combustion engine according to claim 6, wherein said temperature control means includes a heat storage member for supplying a heat to said exhaust gas purifying catalyst;

said state detecting means include temperature detecting means for detecting a temperature of said exhaust gas purifying catalyst; and said fault judging means calculates, from a detected value of said temperature detecting means, a temperature decrease rate per predetermined time after a halt of said internal combustion engine, and makes a judgement about a fault in a heat storage function on the basis of a magnitude of the temperature decrease rate.

10. An exhaust gas purifying apparatus for an internal combustion engine according to claim 6, wherein said temperature control means includes a heat storage member for supplying a heat to said exhaust gas purifying catalyst, and adiabatic means for cutting off heat radiations from said exhaust gas purifying catalyst and said heat storage member;

said state detecting means includes temperature detecting means for detecting a temperature of said heat storage member; and said fault judging means calculates, from a detected value of said temperature detecting means, a temperature decrease rate per predetermined time after a halt of said internal combustion engine, and makes a judgement about a fault in an adiabatic function on the basis of a magnitude of the temperature decrease rate.

11. An exhaust gas purifying apparatus for an internal combustion engine according to claim 10, wherein said heat storage means is composed of a change-of-phase substance; and said fault judging means makes a fault-judgement before a start of a change-of-phase state or after an end of the change-of-phase state in which the temperature of said heat storage member is fixed.

12. An exhaust gas purifying apparatus for an internal combustion engine according to claim 6, wherein said temperature control means includes a heat storage member formed by a change-of-phase substance for supplying a heat to said exhaust gas purifying catalyst;

said state detecting means includes temperature detecting means for detecting a temperature of said heat storage member; and said fault judging means counts, from a detected value of said temperature detecting means, a duration of the change-of-phase state in which the temperature of said heat storage member is fixed, and makes a judgement about a fault on the basis of a length of said counted duration.

13. An exhaust gas purifying apparatus for an internal combustion engine according to claim 6, wherein said temperature control means includes an outer casing for covering said exhaust gas purifying catalyst, and adiabatic means disposed between said exhaust gas purifying catalyst and said outer casing for cutting off a heat transmission from said exhaust gas purifying catalyst to said outer casing;

said state detecting means includes first temperature detecting means for detecting a temperature of said exhaust gas purifying catalyst and second temperature detecting means for detecting a temperature of said outer casing; and said fault judging means makes a judgement about a fault of an adiabatic function on the basis of a difference between a detected value of said first temperature detecting means and a detected value of said second temperature detecting means.

14. An exhaust gas purifying apparatus for an internal combustion engine according to claim 6, wherein said temperature control means includes an outer casing for covering said exhaust gas purifying catalyst, and heat radiation/insulation switching means, disposed between said exhaust gas purifying catalyst and said outer casing, for cutting off a heat transmission from said exhaust gas purifying catalyst to said outer casing when a temperature of said exhaust gas purifying catalyst is lower than a predetermined temperature, and for permitting the heat transmission from said exhaust gas purifying catalyst to said outer casing when the temperature of said exhaust gas purifying catalyst is over the predetermined temperature;

said state detecting means includes first temperature detecting means for detecting a temperature of said exhaust gas purifying catalyst and second temperature detecting means for detecting a temperature of said outer casing; and said fault judging means makes, at a timing when said heat radiation/insulation switching means should cut off the heat transmission from said exhaust gas purifying catalyst to said outer casing, a judgement about a fault of an adiabatic function on the basis of a difference between a detected value of said first temperature detecting means and a detected value of said second temperature detecting means.

15. An exhaust gas purifying apparatus for an internal combustion engine according to claim 6, wherein said temperature control means includes an outer casing for covering said exhaust gas purifying catalyst, and heat radiation/insulation switching means, disposed between said exhaust gas purifying catalyst and said outer casing, for cutting off a heat transmission from said exhaust gas purifying catalyst to said outer casing when a temperature of said exhaust gas purifying catalyst is lower than a predetermined temperature, and for permitting the heat transmission from said exhaust gas purifying catalyst to said outer casing when the temperature of said exhaust gas purifying catalyst is over the predetermined temperature;

said state detecting means includes first temperature detecting means for detecting a temperature of said exhaust gas purifying catalyst and second temperature detecting means for detecting a temperature of said outer casing; and said fault judging means makes, at a timing when said heat radiation/insulation switching means should permit the heat transmission from said exhaust gas purifying catalyst to said outer casing, a judgement about a fault of a heat radiating function on the basis of a difference between a detected value of said first temperature detecting means and a detected value of said second temperature detecting means.

16. An exhaust gas purifying apparatus for an internal combustion engine according to claim 6, wherein said temperature control means includes a heat storage member for supplying said exhaust gas purifying catalyst with heat, an outer casing for covering said exhaust gas purifying catalyst and said heat storage member, and adiabatic means, disposed between said outer casing and said exhaust gas purifying catalyst or said heat storage member, for cutting off heat radiations from said exhaust gas purifying catalyst and from said heat storage member;

said state detecting means includes second temperature detecting means for detecting a temperature of said outer casing, and third temperature detecting means for detecting a temperature of said heat storage member; and said fault judging means makes a judgement about a fault of an adiabatic function on the basis of a difference between a detected value of said second temperature detecting means and a detected value of said third temperature detecting means.

17. An exhaust gas purifying apparatus for an internal combustion engine according to claim 6, wherein said temperature control means includes a heat storage member for supplying said exhaust gas purifying catalyst with heat, an outer casing for covering said exhaust gas purifying catalyst and said heat storage member, and heat radiation/insulation switching means, disposed between said outer casing and said exhaust gas purifying catalyst or said heat storage member, for cutting off heat transmissions from said exhaust gas purifying catalyst and from said heat storage member to said outer casing when a temperature of said exhaust gas purifying catalyst is lower than a predetermined temperature, and for permitting the heat transmissions from said exhaust gas purifying catalyst and from said heat storage member to said outer casing when the temperature of said exhaust gas purifying catalyst is over the predetermined temperature;

said state detecting means includes second temperature detecting means for detecting a temperature of said outer casing, and third temperature detecting means for detecting a temperature of said heat storage member; and said fault judging means makes, at a timing when said heat radiation/insulation switching means should cut off the heat transmissions from said exhaust gas purifying catalyst and from said heat storage member to said outer casing, a judgement about a fault of an adiabatic function on the basis of a difference between a detected value of said second temperature detecting means and a detected value of said third temperature detecting means.

18. An exhaust gas purifying apparatus for an internal combustion engine according to claim 6, wherein said temperature control means includes a heat storage member for supplying said exhaust gas purifying catalyst with heat, an outer casing for covering said exhaust gas purifying catalyst and said heat storage member, and heat radiation/insulation switching means, disposed between said outer casing and said exhaust gas purifying catalyst or said heat storage member, for cutting off heat transmissions from said exhaust gas purifying catalyst and from said heat storage member to said outer casing when a temperature of said exhaust gas purifying catalyst is lower than a predetermined temperature, and for permitting the heat transmissions from said exhaust gas purifying catalyst and from said heat storage member to said outer casing when the temperature of said exhaust gas purifying catalyst is over the predetermined temperature;

said state detecting means includes second temperature detecting means for detecting a temperature of said outer casing, and third temperature detecting means for detecting a temperature of said heat storage member; and said fault judging means makes, at a timing when said heat radiation/insulation switching means should permit the heat transmissions from said exhaust gas purifying catalyst and from said heat storage member to said outer casing, a judgement about a fault of a heat radiating function on the basis of a difference between a detected value of said second temperature detecting means and a detected value of said third temperature detecting means.

19. An exhaust gas purifying apparatus for an internal combustion engine according to claim 1, further comprising fault information outputting means for outputting, when said fault judging means judges that said exhaust gas purifying apparatus is faulted, information for indicating the fault in said exhaust gas purifying apparatus.

20. An exhaust gas purifying apparatus for an internal combustion engine according to claim 6, wherein said fault judging means corrects a judgement criterion in accordance with a temperature of the outside air.

* * * * *